· US009755444B2

(12) United States Patent
To et al.

(10) Patent No.: US 9,755,444 B2
(45) Date of Patent: Sep. 5, 2017

(54) PROTECTIVE CASE WITH SWITCH COVER

(71) Applicant: Mophie, Inc., Tustin, CA (US)

(72) Inventors: Nguyen To, Corona, CA (US); Hien Nguyen, Westminster, CA (US); William Benjamin Hasbrook, Tualatin, OR (US); Sean Michael Stuck, Portland, OR (US)

(73) Assignee: MOPHIE, INC., Tustin, CA (US)

( * ) Notice: Subject to any disclaimer, the term of this patent is extended or adjusted under 35 U.S.C. 154(b) by 42 days.

(21) Appl. No.: 14/187,046

(22) Filed: Feb. 21, 2014

(65) Prior Publication Data

US 2014/0239916 A1 Aug. 28, 2014

Related U.S. Application Data

(60) Provisional application No. 61/768,538, filed on Feb. 25, 2013, provisional application No. 61/923,590, filed on Jan. 3, 2014.

(51) Int. Cl.
*H02J 7/00* (2006.01)
*H01H 9/00* (2006.01)
(Continued)

(52) U.S. Cl.
CPC ......... *H02J 7/0042* (2013.01); *H01H 9/0214* (2013.01); *H04B 1/3888* (2013.01);
(Continued)

(58) Field of Classification Search
CPC ........ H02J 7/0042; H02J 7/0054; H02B 1/00; H02B 1/04; G06F 1/16; H05K 5/00;
(Continued)

(56) References Cited

U.S. PATENT DOCUMENTS 3,851,126 A * 11/1974 Keller ................ H01H 15/102
200/302.1
4,028,515 A * 6/1977 Desio .................... H01H 1/242
200/276.1
(Continued)

FOREIGN PATENT DOCUMENTS

CN 201252577 Y 6/2009
CN 202364273 U 8/2012
(Continued)

OTHER PUBLICATIONS

Reexamination Control No. 90/013,319 including its prosecution history, filed Sep. 18, 2014, Huang et al.
(Continued)

*Primary Examiner* — Phallaka Kik
(74) *Attorney, Agent, or Firm* — Knobbe, Martens, Olson & Bear, LLP

(57) ABSTRACT

A protective case can house a portable electronic device. The portable electronic device can have a switch (e.g., for switching an operational mode of the portable electronic device). The protective case can have a switch cover that engages the switch of the portable electronic device when the portable electronic device is in the protective case. The switch cover can be moved between positions corresponding to positions of the switch of the portable electronic device. As the switch cover is moved, the switch cover correspondingly moves the switch.

30 Claims, 24 Drawing Sheets

(51) Int. Cl.

| | | |
|---|---|---|
| *H04B 1/00* | (2006.01) | |
| *H04M 1/00* | (2006.01) | |
| *H04W 52/00* | (2009.01) | |
| *H01H 9/02* | (2006.01) | |
| *H04B 1/3888* | (2015.01) | |
| *H04M 1/18* | (2006.01) | |
| *H04M 1/23* | (2006.01) | |
| *A45C 11/00* | (2006.01) | |
| *H04W 52/02* | (2009.01) | |

(52) U.S. Cl.
CPC ....... *H04M 1/185* (2013.01); *A45C 2011/002* (2013.01); *H01H 2221/014* (2013.01); *H01H 2221/082* (2013.01); *H01H 2231/022* (2013.01); *H02J 7/0054* (2013.01); *H04M 1/236* (2013.01); *H04W 52/0296* (2013.01)

(58) Field of Classification Search
CPC .......... H05K 7/00; H05K 1/14; H01H 9/0214; H01H 2221/014; H01H 2221/082; H01H 2231/022; H04B 1/3888; H04M 1/185; H04M 1/236; A45C 2011/002; H04W 52/0296
USPC ........ 320/137, 107, 114, 115; 361/600, 631, 361/679, 679.02, 679.3, 679.56, 741, 756
See application file for complete search history.

(56) References Cited

U.S. PATENT DOCUMENTS

| | | |
|---|---|---|
| D267,795 S | 2/1983 | Mallon |
| 4,479,596 A | 10/1984 | Swanson |
| 4,515,272 A | 5/1985 | Newhouse |
| D284,372 S | 6/1986 | Carpenter |
| 4,951,817 A | 8/1990 | Barletta et al. |
| D312,534 S | 12/1990 | Nelson et al. |
| 5,001,772 A | 3/1991 | Holcomb et al. |
| D322,719 S | 12/1991 | Jayez |
| D327,868 S | 7/1992 | Oka |
| 5,360,108 A | 11/1994 | Alagia |
| 5,368,159 A | 11/1994 | Doria |
| 5,383,091 A | 1/1995 | Snell |
| 5,386,084 A | 1/1995 | Risko |
| 5,508,123 A | 4/1996 | Fan |
| D372,896 S | 8/1996 | Nagele et al. |
| 5,586,002 A | 12/1996 | Notarianni |
| 5,604,050 A | 2/1997 | Brunette et al. |
| 5,610,979 A | 3/1997 | Yu |
| D384,327 S | 9/1997 | Nakui |
| 5,708,707 A | 1/1998 | Halttlunen et al. |
| 5,711,013 A | 1/1998 | Collett et al. |
| D392,248 S | 3/1998 | Johansson |
| D392,939 S | 3/1998 | Finke-Anlauff |
| 5,786,106 A | 7/1998 | Armani |
| 5,816,459 A | 10/1998 | Armistead |
| D400,495 S | 11/1998 | Deslyper et al. |
| D400,496 S | 11/1998 | Barber et al. |
| 5,859,481 A | 1/1999 | Banyas |
| 5,864,766 A | 1/1999 | Chiang |
| D405,801 S | 2/1999 | Nagele et al. |
| D407,063 S | 3/1999 | Reis et al. |
| 5,876,351 A | 3/1999 | Rohde |
| D407,708 S | 4/1999 | Nagele et al. |
| 5,896,277 A | 4/1999 | Leon et al. |
| 5,932,855 A * | 8/1999 | Wang ................... G06F 1/1626 200/50.04 |
| 5,959,433 A | 9/1999 | Rohde |
| 5,973,477 A | 10/1999 | Chang |
| D417,189 S | 11/1999 | Amero, Jr. et al. |
| 6,043,626 A | 3/2000 | Snyder et al. |
| D424,512 S | 5/2000 | Ho |
| 6,069,332 A * | 5/2000 | Suchanek ................ H01H 9/02 200/293 |
| 6,081,595 A | 6/2000 | Picaud |
| D428,019 S | 7/2000 | Amron |
| 6,082,535 A | 7/2000 | Mitchell |
| 6,171,138 B1 | 1/2001 | Lefebvre et al. |
| D438,004 S | 2/2001 | Watson et al. |
| 6,184,654 B1 | 2/2001 | Bachner, III et al. |
| D439,218 S | 3/2001 | Yu |
| 6,201,867 B1 | 3/2001 | Koike |
| 6,208,115 B1 | 3/2001 | Binder |
| 6,266,539 B1 | 7/2001 | Pardo |
| D446,497 S | 8/2001 | Yu |
| 6,273,252 B1 | 8/2001 | Mitchell |
| D447,462 S | 9/2001 | Kosiba |
| 6,313,982 B1 | 11/2001 | Hino |
| 6,317,313 B1 | 11/2001 | Mosgrove et al. |
| 6,324,380 B1 | 11/2001 | Kiuchi et al. |
| 6,346,791 B1 | 2/2002 | Barguirdjian |
| 6,377,811 B1 * | 4/2002 | Sood ................ H04M 1/72502 455/455 |
| 6,405,056 B1 | 6/2002 | Altschul et al. |
| D460,411 S | 7/2002 | Wang |
| D460,761 S | 7/2002 | Croley |
| 6,415,138 B2 | 7/2002 | Sirola et al. |
| 6,434,371 B1 * | 8/2002 | Claxton ............... H04M 1/0214 379/433.01 |
| 6,434,404 B1 * | 8/2002 | Claxton ............... H04M 1/0214 455/575.3 |
| 6,445,577 B1 | 9/2002 | Madsen et al. |
| 6,471,056 B1 | 10/2002 | Tzeng |
| D469,427 S | 1/2003 | Ma et al. |
| 6,536,589 B2 | 3/2003 | Chang |
| 6,538,413 B1 | 3/2003 | Beard et al. |
| D472,384 S | 4/2003 | Richardson |
| 6,552,513 B1 | 4/2003 | Li |
| 6,555,990 B1 | 4/2003 | Yang |
| 6,583,601 B2 | 6/2003 | Simoes et al. |
| 6,594,472 B1 | 7/2003 | Curtis et al. |
| 6,614,722 B2 | 9/2003 | Polany et al. |
| 6,626,362 B1 | 9/2003 | Steiner et al. |
| D481,716 S | 11/2003 | He et al. |
| D482,529 S | 11/2003 | Hardigg et al. |
| 6,646,864 B2 | 11/2003 | Richardson |
| D484,874 S | 1/2004 | Chang et al. |
| D485,834 S | 1/2004 | Davetas |
| 6,681,003 B2 | 1/2004 | Linder et al. |
| 6,701,159 B1 | 3/2004 | Powell |
| 6,708,887 B1 | 3/2004 | Garrett et al. |
| 6,714,802 B1 | 3/2004 | Barvesten |
| 6,785,566 B1 | 8/2004 | Irizarry |
| 6,819,549 B1 | 11/2004 | Lammers-Meis et al. |
| D500,041 S | 12/2004 | Tsujimoto |
| D506,612 S | 6/2005 | Rosa et al. |
| D508,495 S | 8/2005 | Bone et al. |
| D513,123 S | 12/2005 | Richardson et al. |
| 6,980,777 B2 | 12/2005 | Shepherd et al. |
| D513,451 S | 1/2006 | Richardson et al. |
| 6,992,461 B2 | 1/2006 | Liang et al. |
| D514,808 S | 2/2006 | Morine et al. |
| D516,309 S | 3/2006 | Richardson et al. |
| D516,553 S | 3/2006 | Richardson et al. |
| D516,554 S | 3/2006 | Richardson et al. |
| D516,807 S | 3/2006 | Richardson et al. |
| D517,007 S | 3/2006 | Yong-Jian et al. |
| D520,744 S | 5/2006 | Pangerc et al. |
| 7,050,841 B1 | 5/2006 | Onda |
| 7,069,063 B2 | 6/2006 | Halkosaari et al. |
| D525,582 S | 7/2006 | Chan |
| 7,072,699 B2 | 7/2006 | Eiden |
| 7,079,879 B1 | 7/2006 | Sylvester et al. |
| 7,081,736 B2 | 7/2006 | Seil et al. |
| D526,780 S | 8/2006 | Richardson et al. |
| D526,958 S | 8/2006 | Shimizu |
| D530,079 S | 10/2006 | Thomas et al. |
| D535,252 S | 1/2007 | Sandnes |
| 7,158,376 B2 | 1/2007 | Richardson et al. |
| 7,166,987 B2 | 1/2007 | Lee et al. |
| D537,063 S | 2/2007 | Kim et al. |
| 7,180,735 B2 | 2/2007 | Thomas et al. |
| 7,180,754 B2 | 2/2007 | Qin et al. |

(56) References Cited

U.S. PATENT DOCUMENTS

| | | |
|---|---|---|
| 7,194,291 B2 | 3/2007 | Peng |
| D540,539 S | 4/2007 | Gutierrez |
| 7,203,467 B2 | 4/2007 | Siddiqui |
| D542,286 S | 5/2007 | Taniyama et al. |
| D542,524 S | 5/2007 | Richardson et al. |
| D543,541 S | 5/2007 | Chung et al. |
| D544,486 S | 6/2007 | Hussaini et al. |
| 7,230,823 B2 | 6/2007 | Richardson et al. |
| D547,056 S | 7/2007 | Griffin et al. |
| D547,057 S | 7/2007 | Griffin et al. |
| D550,455 S | 9/2007 | Barnhart |
| D551,252 S | 9/2007 | Andre et al. |
| 7,266,391 B2 | 9/2007 | Warren |
| D551,856 S | 10/2007 | Ko et al. |
| D553,857 S | 10/2007 | Pendergraph et al. |
| D556,679 S | 12/2007 | Weinstein et al. |
| D556,681 S | 12/2007 | Kim |
| D557,205 S | 12/2007 | Kim |
| D557,264 S | 12/2007 | Richardson et al. |
| D557,494 S | 12/2007 | Mayette et al. |
| D557,897 S | 12/2007 | Richardson et al. |
| 7,312,984 B2 | 12/2007 | Richardson et al. |
| D558,667 S | 1/2008 | Park et al. |
| D558,757 S | 1/2008 | Andre et al. |
| D558,972 S | 1/2008 | Oh |
| D558,973 S | 1/2008 | Hussaini et al. |
| D559,267 S | 1/2008 | Griffin |
| D560,229 S | 1/2008 | Yagi |
| D561,092 S | 2/2008 | Kim |
| 7,336,973 B2 | 2/2008 | Goldthwaite et al. |
| D563,093 S | 3/2008 | Nussberger |
| 7,343,184 B2 | 3/2008 | Rostami |
| D565,291 S | 4/2008 | Brandenburg et al. |
| 7,397,658 B2 | 7/2008 | Finke-Anlauff et al. |
| 7,400,917 B2 | 7/2008 | Wood et al. |
| D574,326 S | 8/2008 | Lim |
| D574,819 S | 8/2008 | Andre et al. |
| D575,056 S | 8/2008 | Tan |
| 7,428,427 B2 | 9/2008 | Brunstrom et al. |
| D577,904 S | 10/2008 | Sasaki |
| D581,151 S | 11/2008 | Aipa |
| D581,155 S | 11/2008 | Richardson et al. |
| D581,421 S | 11/2008 | Richardson et al. |
| D582,149 S | 12/2008 | Tan |
| 7,464,814 B2 | 12/2008 | Carnevali |
| D584,732 S | 1/2009 | Cho et al. |
| 7,479,759 B2 | 1/2009 | Vilanov et al. |
| D587,008 S | 2/2009 | Richardson et al. |
| D587,896 S | 3/2009 | Aipa |
| D589,016 S | 3/2009 | Richardson et al. |
| D589,953 S | 4/2009 | Turner |
| 7,536,099 B2 | 5/2009 | Dalby et al. |
| D593,319 S | 6/2009 | Richardson et al. |
| D593,746 S | 6/2009 | Richardson et al. |
| D594,849 S | 6/2009 | Ko |
| 7,555,325 B2 | 6/2009 | Goros |
| D597,089 S | 7/2009 | Khan et al. |
| 7,562,813 B2 | 7/2009 | Humphrey et al. |
| D597,301 S | 8/2009 | Richardson et al. |
| D598,407 S | 8/2009 | Richardson et al. |
| 7,577,462 B2 | 8/2009 | Kumar |
| D600,640 S | 9/2009 | Stein et al. |
| D600,908 S | 9/2009 | Richardson et al. |
| D601,955 S | 10/2009 | Ekmekdje |
| D601,959 S | 10/2009 | Lee et al. |
| D601,960 S | 10/2009 | Dai |
| 7,609,512 B2 | 10/2009 | Richardson et al. |
| D603,602 S | 11/2009 | Richardson et al. |
| D603,603 S | 11/2009 | Laine et al. |
| 7,612,997 B1 | 11/2009 | Diebel et al. |
| D605,850 S | 12/2009 | Richardson et al. |
| D606,528 S | 12/2009 | Khan et al. |
| D606,529 S | 12/2009 | Ferrari et al. |
| 7,635,086 B2 | 12/2009 | Spencer, II |
| 7,638,969 B2 | 12/2009 | Woud |
| 7,647,082 B2 | 1/2010 | Holmberg |
| D609,228 S | 2/2010 | Ferrari et al. |
| D609,463 S | 2/2010 | Bullen |
| D610,538 S | 2/2010 | Wu et al. |
| 7,656,120 B2 | 2/2010 | Neu et al. |
| 7,663,878 B2 | 2/2010 | Swan et al. |
| 7,667,433 B1 | 2/2010 | Smith |
| D610,807 S | 3/2010 | Bau |
| D611,042 S | 3/2010 | Ferrari et al. |
| D611,478 S | 3/2010 | Richardson et al. |
| 7,669,829 B2 | 3/2010 | Ogatsu |
| D613,282 S | 4/2010 | Richardson et al. |
| D615,077 S | 5/2010 | Richardson et al. |
| D615,535 S | 5/2010 | Richardson et al. |
| D615,536 S | 5/2010 | Richardson et al. |
| D615,967 S | 5/2010 | Richardson et al. |
| D616,360 S | 5/2010 | Huang |
| D616,361 S | 5/2010 | Huang |
| D617,753 S | 6/2010 | Cheng |
| D617,784 S | 6/2010 | Richardson et al. |
| D617,785 S | 6/2010 | Richardson et al. |
| D617,786 S | 6/2010 | Richardson et al. |
| D617,787 S | 6/2010 | Richardson et al. |
| D618,231 S | 6/2010 | Fahrendorff et al. |
| 7,733,637 B1 | 6/2010 | Lam |
| D619,573 S | 7/2010 | Khan et al. |
| D619,574 S | 7/2010 | Richardson et al. |
| D619,991 S | 7/2010 | Huang |
| D620,000 S | 7/2010 | Bau |
| D620,487 S | 7/2010 | Richardson et al. |
| D621,394 S | 8/2010 | Richardson et al. |
| D621,395 S | 8/2010 | Richardson et al. |
| D621,821 S | 8/2010 | Richardson et al. |
| D621,822 S | 8/2010 | Richardson et al. |
| 7,778,023 B1 | 8/2010 | Mohoney |
| 7,782,610 B2 | 8/2010 | Diebel et al. |
| D623,179 S | 9/2010 | Richardson et al. |
| D623,180 S | 9/2010 | Diebel |
| D623,638 S | 9/2010 | Richardson et al. |
| D623,639 S | 9/2010 | Richardson et al. |
| D623,640 S | 9/2010 | Freeman |
| D624,317 S | 9/2010 | Wenchel et al. |
| D624,533 S | 9/2010 | Richardson et al. |
| D624,908 S | 10/2010 | Huskinson |
| D624,909 S | 10/2010 | Huskinson |
| D624,910 S | 10/2010 | Richardson et al. |
| D625,303 S | 10/2010 | Kim |
| D626,120 S | 10/2010 | Richardson et al. |
| D626,121 S | 10/2010 | Richardson et al. |
| D626,538 S | 11/2010 | Brown et al. |
| D626,539 S | 11/2010 | Brown et al. |
| D626,540 S | 11/2010 | Brown et al. |
| D626,964 S | 11/2010 | Richardson et al. |
| D628,568 S | 12/2010 | Richardson et al. |
| D628,994 S | 12/2010 | Griffin, Jr. et al. |
| 7,859,222 B2 | 12/2010 | Woud |
| D631,246 S | 1/2011 | Boettner |
| 7,863,856 B2 | 1/2011 | Sherman et al. |
| 7,863,862 B2 | 1/2011 | Idzik et al. |
| D631,877 S | 2/2011 | Rak et al. |
| D632,648 S | 2/2011 | Yang |
| D632,683 S | 2/2011 | Richardson et al. |
| D632,684 S | 2/2011 | Richardson et al. |
| D632,685 S | 2/2011 | Richardson et al. |
| D632,686 S | 2/2011 | Magness et al. |
| 7,889,489 B2 | 2/2011 | Richardson et al. |
| 7,889,498 B2 | 2/2011 | Diebel et al. |
| D634,704 S | 3/2011 | Tieleman et al. |
| D634,741 S | 3/2011 | Richardson et al. |
| 7,899,397 B2 | 3/2011 | Kumar |
| 7,907,394 B2 | 3/2011 | Richardson et al. |
| 7,911,530 B2 | 3/2011 | Sawachi |
| D636,386 S | 4/2011 | Richardson et al. |
| D636,387 S | 4/2011 | Willes et al. |
| 7,930,011 B2 | 4/2011 | Shi et al. |
| 7,933,122 B2 | 4/2011 | Richardson et al. |
| D637,588 S | 5/2011 | Richardson et al. |
| D637,589 S | 5/2011 | Willes et al. |
| D637,590 S | 5/2011 | Michie et al. |

(56) References Cited

U.S. PATENT DOCUMENTS

| | | |
|---|---|---|
| D637,591 S | 5/2011 | Willes et al. |
| D637,592 S | 5/2011 | Magness et al. |
| D637,952 S | 5/2011 | Tan |
| D638,005 S | 5/2011 | Richardson et al. |
| D638,411 S | 5/2011 | Willes et al. |
| D638,413 S | 5/2011 | Magness et al. |
| D638,414 S | 5/2011 | Magness et al. |
| D638,828 S | 5/2011 | Melanson et al. |
| D638,829 S | 5/2011 | Melanson et al. |
| D638,830 S | 5/2011 | Magness et al. |
| D639,731 S | 6/2011 | Sun |
| D640,679 S | 6/2011 | Willes et al. |
| D640,680 S | 6/2011 | Magness et al. |
| 7,957,524 B2 | 6/2011 | Chipping |
| D641,013 S | 7/2011 | Richardson et al. |
| D641,014 S | 7/2011 | Smith et al. |
| D641,974 S | 7/2011 | Stampfli |
| D642,170 S | 7/2011 | Johnson et al. |
| D642,171 S | 7/2011 | Melanson et al. |
| D642,558 S | 8/2011 | Magness et al. |
| D643,029 S | 8/2011 | Feng |
| D643,424 S | 8/2011 | Richardson et al. |
| D644,215 S | 8/2011 | Dong |
| D644,216 S | 8/2011 | Richardson et al. |
| D644,219 S | 8/2011 | Sawada |
| 7,988,010 B2 | 8/2011 | Yang et al. |
| 8,004,962 B2 | 8/2011 | Yang et al. |
| D644,635 S | 9/2011 | Richardson et al. |
| D644,639 S | 9/2011 | Weller et al. |
| D647,084 S | 10/2011 | Fathollahi |
| D647,108 S | 10/2011 | Lee |
| 8,028,794 B1 | 10/2011 | Freeman |
| 8,046,039 B2 | 10/2011 | Lee et al. |
| D648,714 S | 11/2011 | Jones, III et al. |
| D648,715 S | 11/2011 | Jones, III et al. |
| D648,716 S | 11/2011 | Jones, III et al. |
| D648,717 S | 11/2011 | Fahrendorff et al. |
| D649,143 S | 11/2011 | Jones, III et al. |
| D649,539 S | 11/2011 | Hong |
| D650,810 S | 12/2011 | Lemelman et al. |
| D652,827 S | 1/2012 | Fahrendorff et al. |
| D652,828 S | 1/2012 | Fahrendorff et al. |
| D653,202 S | 1/2012 | Hasbrook et al. |
| D653,659 S | 2/2012 | Fahrendorff et al. |
| D654,069 S | 2/2012 | Kwon |
| D654,483 S | 2/2012 | Richardson et al. |
| D654,931 S | 2/2012 | Lemelman et al. |
| D655,281 S | 3/2012 | Turocy |
| D655,699 S | 3/2012 | Bau |
| D656,495 S | 3/2012 | Andre et al. |
| D658,165 S | 4/2012 | Freeman |
| 8,150,485 B2 | 4/2012 | Lee |
| D658,643 S | 5/2012 | Fahrendorff et al. |
| 8,167,127 B2 | 5/2012 | Martin et al. |
| D662,923 S | 7/2012 | Piedra et al. |
| D663,263 S | 7/2012 | Gupta et al. |
| D663,319 S | 7/2012 | Chen et al. |
| D663,724 S | 7/2012 | Lee |
| D664,091 S | 7/2012 | Pliner et al. |
| 8,224,408 B2 | 7/2012 | Tomasini et al. |
| D665,386 S | 8/2012 | Fathollahi |
| D665,735 S | 8/2012 | Kang et al. |
| 8,245,842 B2 | 8/2012 | Bau |
| 8,247,102 B2 | 8/2012 | Hua |
| D667,783 S | 9/2012 | Zhang et al. |
| D670,281 S | 11/2012 | Corpuz et al. |
| D670,689 S | 11/2012 | Wang |
| D671,105 S | 11/2012 | Rothbaum et al. |
| D671,106 S | 11/2012 | Rothbaum et al. |
| D671,493 S | 11/2012 | Hasbrook et al. |
| 8,321,619 B2 | 11/2012 | Kular et al. |
| 8,328,008 B2 | 12/2012 | Diebel et al. |
| D674,394 S | 1/2013 | Kajimoto |
| 8,342,325 B2 | 1/2013 | Rayner |
| D675,603 S | 2/2013 | Melanson et al. |
| D676,032 S | 2/2013 | Stump et al. |
| D676,432 S | 2/2013 | Hasbrook et al. |
| 8,367,235 B2 | 2/2013 | Huang et al. |
| 8,380,264 B2 | 2/2013 | Hung et al. |
| D677,249 S | 3/2013 | Li et al. |
| D678,869 S | 3/2013 | Diebel |
| 8,390,255 B1 * | 3/2013 | Fathollahi .............. H02J 7/0045 206/308.3 |
| 8,393,466 B2 | 3/2013 | Rayner |
| D679,271 S | 4/2013 | Liu |
| D679,684 S | 4/2013 | Baker et al. |
| D679,699 S | 4/2013 | Piedra et al. |
| D681,020 S | 4/2013 | Magness et al. |
| D682,196 S | 5/2013 | Leung |
| D682,815 S | 5/2013 | Chang |
| D683,338 S | 5/2013 | Wilson et al. |
| 8,439,191 B1 | 5/2013 | Lu |
| 8,452,242 B2 | 5/2013 | Spencer, II |
| D684,554 S | 6/2013 | Park |
| 8,457,701 B2 | 6/2013 | Diebel |
| D685,356 S | 7/2013 | Diebel |
| D686,152 S | 7/2013 | Lee et al. |
| D686,586 S | 7/2013 | Cho |
| D686,606 S | 7/2013 | Hong |
| 8,483,758 B2 | 7/2013 | Huang |
| D687,426 S | 8/2013 | Requa |
| D688,233 S | 8/2013 | Dong |
| 8,499,933 B2 | 8/2013 | Ziemba |
| 8,505,718 B2 | 8/2013 | Griffin, Jr. et al. |
| 8,509,864 B1 | 8/2013 | Diebel |
| 8,509,865 B1 | 8/2013 | LaColla et al. |
| 8,531,833 B2 | 9/2013 | Diebel et al. |
| D691,990 S | 10/2013 | Rayner |
| 8,560,014 B1 | 10/2013 | Hu et al. |
| D693,801 S | 11/2013 | Rayner |
| 8,579,172 B2 | 11/2013 | Monaco et al. |
| D696,234 S | 12/2013 | Wright |
| D697,502 S | 1/2014 | Chu et al. |
| D698,774 S | 2/2014 | Wardy |
| D703,652 S | 4/2014 | Melanson et al. |
| D704,182 S | 5/2014 | Smith |
| D704,688 S | 5/2014 | Reivo et al. |
| D706,255 S | 6/2014 | Akana et al. |
| D706,256 S | 6/2014 | Ward et al. |
| D706,272 S | 6/2014 | Poon |
| D709,058 S | 7/2014 | Hemesath et al. |
| D709,439 S | 7/2014 | Ferber et al. |
| D709,485 S | 7/2014 | Bishop |
| D710,344 S | 8/2014 | Smith et al. |
| D710,795 S | 8/2014 | Gupta et al. |
| D710,839 S | 8/2014 | Chang |
| D711,312 S | 8/2014 | Tien |
| D711,362 S | 8/2014 | Poon |
| D711,863 S | 8/2014 | Wen |
| D714,274 S | 9/2014 | Jung |
| D714,278 S | 9/2014 | Case et al. |
| 8,837,156 B2 | 9/2014 | Sun et al. |
| D716,784 S | 11/2014 | Wen |
| D716,785 S | 11/2014 | White |
| D718,291 S | 11/2014 | Hong |
| 8,917,506 B2 | 12/2014 | Diebel et al. |
| D720,738 S | 1/2015 | Rodriguez et al. |
| D720,740 S | 1/2015 | Wicks et al. |
| D722,312 S | 2/2015 | Tages et al. |
| D723,018 S | 2/2015 | White |
| 8,955,678 B2 | 2/2015 | Murphy et al. |
| D724,574 S | 3/2015 | Williams |
| D725,091 S | 3/2015 | Wen |
| 8,971,039 B2 | 3/2015 | Huang et al. |
| D728,468 S | 5/2015 | Ferber et al. |
| D738,365 S | 9/2015 | Melanson et al. |
| D739,394 S | 9/2015 | Rayner et al. |
| D740,797 S | 10/2015 | Daniel |
| D741,844 S | 10/2015 | Rayner et al. |
| 9,153,985 B1 | 10/2015 | GjøVik et al. |
| D744,472 S | 12/2015 | Lerenthal |
| D744,989 S | 12/2015 | Lee |
| D744,993 S | 12/2015 | Diebel |
| D744,995 S | 12/2015 | Lerenthal |

(56) References Cited

U.S. PATENT DOCUMENTS

| | | | |
|---|---|---|---|
| D746,273 S | 12/2015 | Herbst | |
| D746,275 S | 12/2015 | Mohammad | |
| D746,801 S | 1/2016 | Pan | |
| D748,612 S | 2/2016 | Chan et al. | |
| D749,557 S | 2/2016 | Feng | |
| D751,058 S | 3/2016 | Cocchia et al. | |
| D751,059 S | 3/2016 | Cocchia et al. | |
| D751,542 S | 3/2016 | Daniel | |
| 9,313,305 B1* | 4/2016 | Diebel | G03B 17/02 |
| 9,576,178 B2* | 2/2017 | Pope | G06F 3/044 |
| 2001/0054148 A1 | 12/2001 | Hoornaert et al. | |
| 2002/0065054 A1 | 5/2002 | Humphreys et al. | |
| 2002/0111189 A1 | 8/2002 | Chou | |
| 2002/0147035 A1 | 10/2002 | Su | |
| 2002/0193136 A1 | 12/2002 | Halkosaari et al. | |
| 2002/0197965 A1 | 12/2002 | Peng | |
| 2003/0000984 A1 | 1/2003 | Vick, III | |
| 2003/0096642 A1 | 5/2003 | Bessa et al. | |
| 2003/0151890 A1 | 8/2003 | Huang et al. | |
| 2003/0217210 A1 | 11/2003 | Carau, Sr. | |
| 2003/0218445 A1 | 11/2003 | Behar | |
| 2003/0228866 A1 | 12/2003 | Pezeshki | |
| 2004/0096054 A1 | 5/2004 | Nuovo | |
| 2004/0097256 A1 | 5/2004 | Kujawski | |
| 2004/0104268 A1 | 6/2004 | Bailey | |
| 2004/0247113 A1* | 12/2004 | Akatsu | H04M 1/02 379/419 |
| 2004/0268005 A1 | 12/2004 | Dickie | |
| 2005/0049016 A1 | 3/2005 | Cho et al. | |
| 2005/0088141 A1 | 4/2005 | Lee et al. | |
| 2005/0090301 A1 | 4/2005 | Lange et al. | |
| 2005/0093510 A1 | 5/2005 | Seil et al. | |
| 2005/0116684 A1 | 6/2005 | Kim | |
| 2005/0130721 A1 | 6/2005 | Gartrell | |
| 2005/0231159 A1 | 10/2005 | Jones et al. | |
| 2005/0247787 A1 | 11/2005 | Von Mueller et al. | |
| 2005/0248312 A1 | 11/2005 | Cao et al. | |
| 2005/0286212 A1 | 12/2005 | Brignone et al. | |
| 2006/0003709 A1 | 1/2006 | Wood | |
| 2006/0010588 A1 | 1/2006 | Schuster et al. | |
| 2006/0052064 A1 | 3/2006 | Goradesky | |
| 2006/0058073 A1 | 3/2006 | Kim | |
| 2006/0063569 A1 | 3/2006 | Jacobs et al. | |
| 2006/0099999 A1 | 5/2006 | Park | |
| 2006/0105722 A1 | 5/2006 | Kumar | |
| 2006/0105824 A1 | 5/2006 | Kim et al. | |
| 2006/0125445 A1 | 6/2006 | Cao et al. | |
| 2006/0140461 A1* | 6/2006 | Kim | G06F 1/1613 382/126 |
| 2006/0197674 A1* | 9/2006 | Nakajima | H01H 13/705 340/4.3 |
| 2006/0205447 A1 | 9/2006 | Park et al. | |
| 2006/0255493 A1 | 11/2006 | Fouladpour | |
| 2007/0004450 A1 | 1/2007 | Parikh | |
| 2007/0019804 A1 | 1/2007 | Kramer | |
| 2007/0093140 A1 | 4/2007 | Begic et al. | |
| 2007/0123316 A1 | 5/2007 | Little | |
| 2007/0142097 A1 | 6/2007 | Hamasaki et al. | |
| 2007/0152633 A1 | 7/2007 | Lee | |
| 2007/0161404 A1 | 7/2007 | Yasujima et al. | |
| 2007/0167190 A1 | 7/2007 | Moosavi et al. | |
| 2007/0187563 A1 | 8/2007 | Ogatsu | |
| 2007/0223182 A1 | 9/2007 | Swan et al. | |
| 2007/0225031 A1 | 9/2007 | Bodkin et al. | |
| 2007/0236180 A1 | 10/2007 | Rodgers | |
| 2007/0261978 A1 | 11/2007 | Sanderson | |
| 2007/0297149 A1 | 12/2007 | Richardson et al. | |
| 2008/0007214 A1 | 1/2008 | Cheng | |
| 2008/0026794 A1 | 1/2008 | Warren | |
| 2008/0026803 A1 | 1/2008 | Demuynck | |
| 2008/0032758 A1 | 2/2008 | Rostami | |
| 2008/0053770 A1 | 3/2008 | Tynyk | |
| 2008/0058010 A1 | 3/2008 | Lee | |
| 2008/0096620 A1 | 4/2008 | Lee et al. | |
| 2008/0108395 A1 | 5/2008 | Lee et al. | |
| 2008/0119244 A1 | 5/2008 | Malhotra | |
| 2008/0123287 A1 | 5/2008 | Rossell et al. | |
| 2008/0132289 A1 | 6/2008 | Wood et al. | |
| 2008/0139258 A1 | 6/2008 | Park et al. | |
| 2008/0150367 A1 | 6/2008 | Oh et al. | |
| 2009/0009945 A1 | 1/2009 | Johnson et al. | |
| 2009/0017883 A1 | 1/2009 | Lin | |
| 2009/0051319 A1 | 2/2009 | Fang et al. | |
| 2009/0069050 A1 | 3/2009 | Jain et al. | |
| 2009/0073650 A1 | 3/2009 | Huang et al. | |
| 2009/0096417 A1 | 4/2009 | Idzik et al. | |
| 2009/0108800 A1 | 4/2009 | Woud | |
| 2009/0111543 A1 | 4/2009 | Tai et al. | |
| 2009/0114556 A1 | 5/2009 | Tai et al. | |
| 2009/0117955 A1 | 5/2009 | Lo | |
| 2009/0128092 A1 | 5/2009 | Woud | |
| 2009/0143104 A1 | 6/2009 | Loh et al. | |
| 2009/0144456 A1 | 6/2009 | Gelf et al. | |
| 2009/0146898 A1 | 6/2009 | Akiho et al. | |
| 2009/0152089 A1* | 6/2009 | Hanes | H01H 13/06 200/345 |
| 2009/0160399 A1 | 6/2009 | Woud | |
| 2009/0160400 A1 | 6/2009 | Woud | |
| 2009/0181729 A1 | 7/2009 | Griffin, Jr. et al. | |
| 2009/0205983 A1 | 8/2009 | Estlander | |
| 2009/0247244 A1 | 10/2009 | Mittleman et al. | |
| 2009/0284216 A1 | 11/2009 | Bessa et al. | |
| 2009/0301289 A1 | 12/2009 | Gynes | |
| 2009/0312058 A9 | 12/2009 | Wood et al. | |
| 2009/0314400 A1 | 12/2009 | Liu | |
| 2009/0325657 A1 | 12/2009 | Ramsdell et al. | |
| 2010/0005225 A1 | 1/2010 | Honda et al. | |
| 2010/0013431 A1 | 1/2010 | Liu | |
| 2010/0022277 A1 | 1/2010 | An et al. | |
| 2010/0026589 A1 | 2/2010 | Dou et al. | |
| 2010/0048267 A1 | 2/2010 | Lin | |
| 2010/0056054 A1 | 3/2010 | Yamato et al. | |
| 2010/0064883 A1 | 3/2010 | Gynes | |
| 2010/0078343 A1 | 4/2010 | Hoellwarth et al. | |
| 2010/0088439 A1 | 4/2010 | Ang et al. | |
| 2010/0093412 A1 | 4/2010 | Serra et al. | |
| 2010/0096284 A1 | 4/2010 | Bau | |
| 2010/0113106 A1 | 5/2010 | Supran | |
| 2010/0132724 A1 | 6/2010 | Seidel et al. | |
| 2010/0154062 A1 | 6/2010 | Baram et al. | |
| 2010/0195279 A1 | 8/2010 | Michael | |
| 2010/0200456 A1 | 8/2010 | Parkinson | |
| 2010/0203931 A1 | 8/2010 | Hynecek et al. | |
| 2010/0224519 A1 | 9/2010 | Kao | |
| 2010/0243516 A1 | 9/2010 | Martin et al. | |
| 2010/0302716 A1 | 12/2010 | Gandhi | |
| 2010/0328203 A1 | 12/2010 | Hsu | |
| 2011/0021255 A1 | 1/2011 | Kim et al. | |
| 2011/0034221 A1 | 2/2011 | Hung et al. | |
| 2011/0049005 A1 | 3/2011 | Wilson et al. | |
| 2011/0050164 A1 | 3/2011 | Partovi et al. | |
| 2011/0055447 A1 | 3/2011 | Costa | |
| 2011/0084081 A1 | 4/2011 | Chung et al. | |
| 2011/0090626 A1 | 4/2011 | Hoellwarth et al. | |
| 2011/0117974 A1 | 5/2011 | Spitalnik et al. | |
| 2011/0136555 A1 | 6/2011 | Ramies et al. | |
| 2011/0159324 A1 | 6/2011 | Huang et al. | |
| 2011/0199041 A1 | 8/2011 | Yang | |
| 2011/0253569 A1 | 10/2011 | Lord | |
| 2011/0259664 A1 | 10/2011 | Freeman | |
| 2011/0261511 A1* | 10/2011 | Alderson | H01H 13/86 361/679.01 |
| 2011/0287726 A1 | 11/2011 | Huang | |
| 2011/0297578 A1 | 12/2011 | Stiehl et al. | |
| 2011/0309728 A1 | 12/2011 | Diebel | |
| 2012/0013295 A1 | 1/2012 | Yeh | |
| 2012/0071214 A1 | 3/2012 | Ash, Jr. et al. | |
| 2012/0088555 A1 | 4/2012 | Hu | |
| 2012/0088558 A1 | 4/2012 | Song | |
| 2012/0106037 A1 | 5/2012 | Diebel et al. | |
| 2012/0115551 A1 | 5/2012 | Cho et al. | |
| 2012/0119695 A1* | 5/2012 | Pin | H02J 7/0052 320/107 |
| 2012/0122520 A1 | 5/2012 | Phillips | |

(56) References Cited

U.S. PATENT DOCUMENTS

| | | |
|---|---|---|
| 2012/0161696 A1 | 6/2012 | Cook et al. |
| 2012/0177967 A1* | 7/2012 | Wang .................. G06F 1/1632 429/100 |
| 2012/0209745 A1 | 8/2012 | Spencer, II |
| 2012/0282977 A1 | 11/2012 | Haleluk |
| 2012/0303520 A1 | 11/2012 | Huang |
| 2012/0305422 A1 | 12/2012 | Vandiver |
| 2012/0320501 A1 | 12/2012 | Ackloo |
| 2012/0325637 A1* | 12/2012 | Kikuchi .............. H01H 13/063 200/520 |
| 2013/0023313 A1 | 1/2013 | Kim |
| 2013/0045775 A1 | 2/2013 | Heywood |
| 2013/0082662 A1 | 4/2013 | Carre et al. |
| 2013/0084799 A1 | 4/2013 | Marholev et al. |
| 2013/0088815 A1 | 4/2013 | Hu et al. |
| 2013/0098790 A1 | 4/2013 | Hong et al. |
| 2013/0125251 A1 | 5/2013 | Johnson |
| 2013/0146491 A1 | 6/2013 | Ghali et al. |
| 2013/0189923 A1 | 7/2013 | Lewin |
| 2013/0210475 A1 | 8/2013 | Nylund |
| 2013/0248339 A1* | 9/2013 | Koepsell ................ H01H 13/20 200/524 |
| 2013/0273983 A1 | 10/2013 | Hsu |
| 2013/0307818 A1* | 11/2013 | Pope ....................... G06F 3/044 345/174 |
| 2013/0314030 A1 | 11/2013 | Fathollahi |
| 2013/0314880 A1 | 11/2013 | Sun et al. |
| 2013/0318282 A1 | 11/2013 | Wakutsu et al. |
| 2014/0035511 A1 | 2/2014 | Ferber et al. |
| 2014/0065948 A1 | 3/2014 | Huang |
| 2014/0069825 A1 | 3/2014 | Macrina et al. |
| 2014/0141838 A1 | 5/2014 | Cai et al. |
| 2014/0165379 A1 | 6/2014 | Diebel et al. |
| 2014/0239916 A1 | 8/2014 | To et al. |
| 2014/0268519 A1* | 9/2014 | Huang ................. H04B 1/3888 361/679.01 |
| 2014/0375182 A1 | 12/2014 | Li et al. |
| 2014/0375186 A1 | 12/2014 | Tarnow et al. |
| 2015/0072744 A1 | 3/2015 | Huang |
| 2015/0141090 A1 | 5/2015 | Hwan et al. |
| 2015/0148093 A1 | 5/2015 | Huang et al. |
| 2015/0194648 A1 | 7/2015 | Fathollahi et al. |
| 2015/0214993 A1 | 7/2015 | Huang |
| 2015/0281410 A1 | 10/2015 | Takahashi |
| 2015/0289615 A1 | 10/2015 | Welsch |
| 2015/0295439 A1 | 10/2015 | Huang et al. |
| 2015/0303722 A1 | 10/2015 | Li |
| 2015/0364875 A1 | 12/2015 | Ginsberg |
| 2015/0381226 A1 | 12/2015 | Mogol |
| 2016/0004896 A1* | 1/2016 | Pope ....................... G06F 3/044 382/124 |
| 2016/0064963 A1 | 3/2016 | Huang et al. |
| 2016/0064979 A1 | 3/2016 | Huang et al. |
| 2016/0112085 A1* | 4/2016 | Johnson ................. H04M 1/04 455/575.8 |
| 2016/0267313 A1* | 9/2016 | Pope ....................... G06F 3/044 |

FOREIGN PATENT DOCUMENTS

| | | | |
|---|---|---|---|
| CN | 202535667 U | 11/2012 | |
| CN | 302510329 S | 7/2013 | |
| CN | 302573150 S | 9/2013 | |
| DE | 102007021988 A1 * | 11/2008 | ........... G06F 1/1616 |
| EP | 1732291 A1 | 12/2006 | |
| JP | 62014133 A * | 1/1987 | |
| JP | 8-18637 | 1/1996 | |
| JP | 2000-175720 | 6/2000 | |
| KR | 10-2005-0027961 | 3/2005 | |
| KR | 10-2008-0017688 | 2/2008 | |
| KR | 10-2010-0132724 | 12/2010 | |
| KR | 20-2010-0005030 | 12/2010 | |
| KR | 10-2011-0005507 | 1/2011 | |
| KR | 10-2011-0062089 | 6/2011 | |
| KR | 30-0650361 | 7/2012 | |
| TW | D150044 | 11/2012 | |
| TW | D156538 | 10/2013 | |
| WO | WO 95/15619 | 6/1995 | |
| WO | WO 97/33497 | 9/1997 | |
| WO | WO 03/065227 A1 | 8/2003 | |
| WO | WO 2008/151362 A2 | 12/2008 | |

OTHER PUBLICATIONS

U.S. Appl. No. 14/494,348 including its ts prosecution history, filed Sep. 23, 2014, Huang et al.

U.S. Appl. No. 14/517,492 including its prosecution history, filed Oct. 17, 2014, Huang et al.

U.S. Appl. No. 14/517,428 including its prosecution history, filed Oct. 17, 2014, Huang et al.

U.S. Appl. No. 14/569,229 including its prosecution history, filed Dec. 12, 2014, Huang et al.

U.S. Appl. No. 14/547,060 including its prosecution history, Nov. 18, 2014, Huang.

U.S. Appl. No. 14/205,024 Including its prosecution history, filed Mar. 11, 2014, Huang et al.

U.S. Appl. No. 14/205,167 Including its prosecution history, filed Mar. 11, 2014, Huang et al.

U.S. Appl. No. 29/427,724 Including its prosecution history, filed Jul. 20, 2012, Brand et al.

U.S. Appl. No. 29/382,515 Including its prosecution history, filed Jan, 4, 2011, Gallouzi et al.

U.S. Appl. No. 29/423,032 Including its prosecution history, filed May 25, 2012, Hasbrook et al.

U.S. Appl. No. 29/406,346 Including its prosecution history, filed Nov. 11, 2011, Brand.

U.S. Appl. No. 29/423,026 Including its prosecution history, filed May 25, 2012, Hasbrook et al.

U.S. Appl. No. 29/433,665 Including its prosecution history, filed Oct. 3, 2012, Namminga et al.

U.S. Appl. No. 29/464,620, Including its prosecution history, filed Aug. 19, 2013, Tsai.

U.S. Appl. No. 29/438,697 Including its prosecution history, filed Date Nov. 30, 2012, Namminga et al.

U.S. Appl. No. 29/451,703 Including its prosecution history, filed Apr. 6, 2013, Tsai et al.

U.S. Appl. No. 29/435,908, Including its prosecution history, filed Oct. 30, 2012, To et al.

U.S. Appl. No. 29/435,907 Including its prosecution history, filed Oct. 30, 2012, To et al.

U.S. Appl. No. 29/438,877 Including its prosecution history, filed Dec. 4, 2012, To et al.

U.S. Appl. No. 29/440,062 Including its prosecution history, filed Dec. 18, 2012, To et al.

U.S. Appl. No. 29/478,391 Including its prosecution history, filed Jan. 3, 2014, Namminga et al.

U.S. Appl. No. 29/478,390 Including its prosecution history, filed Jan. 3, 2014, Dang et al.

U.S. Appl. No. 29/478,383 Including its prosecution history, filed Jan. 3, 2014, Dang et al.

U.S. Appl. No. 29/478,388 Including its prosecution history, filed Jan. 3, 2014, Kim et al.

U.S. Appl. No. 29/499,868 Including its prosecution history, filed Aug. 19, 2014, Mophie, Inc.

International Search Report and Written Opinion of the International Searching Authority for PCT/US2011/037244, dated Jul. 19, 2011.

International Preliminary Report on Patentability for PCT/US2011/037244, dated Nov. 29, 2012.

International Search Report and Written Opinion of the International Searching Authority for PCT/US2011/037249, dated Jul. 13, 2011.

International Preliminary Report on Patentability for PCT/US2011/037249, dated Nov. 29, 2012.

International Search Report and Written Opinion of the International Searching Authority for PCT/US2011/037254, dated Jul. 13, 2011.

(56) References Cited

OTHER PUBLICATIONS

International Preliminary Report on Patentability for PCT/US2011/037254, dated Nov. 29, 2012.
International Search Report and Written Opinion of the International Searching Authority for PCT/US2011/037257, dated Sep. 22, 2011.
International Preliminary Report on Patentability for PCT/US2011/037257, dated Nov. 29, 2012.
International Search Report and Written Opinion of the International Searching Authority for PCT/US2012/041768, dated Feb. 27, 2013.
International Preliminary Report on Patentability for PCT/US2012/041768, dated Dec. 27, 2013.
International Search Report and Written Opinion of the International Searching Authority for PCT/US2013/057276, dated Dec. 10, 2013.
International Search Report and Written Opinion of the International Searching Authority for PCT/US2014/017781, dated Jun. 8, 2014.
International Search Report and Written Opinion of the International Searching Authority for PCT/US2014/023592, dated Aug. 28, 2014.
Mophie Pulse for iPod Touch 4G, http://www.mophie.com/pulse-iPod-Touch-4th-Gen-vibrating-gaming-case-p/2015_PUL-T4-GRY.htm.
"Sandberg BatteryCase for iPhone 4/4S delivers more band for your buck," dated Mar. 15, 2012, http://www.gizmag.com/sanberg-batterycase-iphone/21839.
Shawn Brown, "Incase Power Slider battery doubles as a case," dated Nov. 19, 2008, http://www.iphonebuzz.com/incase-power-slider-battery-doubles-as-a-case-195224.php.
Nick Guy, "Incipio offGRID Battery Case for iPhone 5/5s," dated Oct. 9, 2013, http://www.ilounge.com/index.php/reviews/entry/incipio-offgrid-battery-case-for-iphone-5-5s/.
Jeremy Horwitz, "Mophie Juice Pack Plus for iPhone 5," dated May 21,2013, http://www.ilounge.com/index.php/reviews/entry/mophie-juice-pack-plus-for-iphone-5/.
Nick Guy, "RND Power Solutions Sync & Charge Dock with Lightning Connector," dated Nov. 18, 2013, http://www.ilounge.com/index.php/reviews/entry/tylt-energi-sl.
Jeremy Horwitz, "Kensington Mini Battery Pack and Charger for iPhone and iPod," dated May 16, 2008, http://www.ilounge.com/index.php/reviews/entry/kensington-mini-battery-pack-and-charger-for-iphone-and-ipod/.
Kensington Mini Battery Pack and Charger for iPhone and iPod, dated Sep. 30, 2008, 1 Page.
Sven Rafferty, "Mybat External Battery for iPhone and iPod," dated May 18, 2008, http://svenontech.com/reviews/?p=74.
Dave Rees, "Richard Solo Backup Battery for iPhone / iPod Review," dated Jun. 16, 2008, http://the-gadgeteer.com/2008/06/16/richard_solo_backup_battery_for_iphone_ipod/.
Devin Coldewey, "Combination iPhone battery pack and flash from FastMac," dated Nov. 4, 2008, http://crunchgear.com/2008/11/04/combination-iphone-battery-pack-and-flash-from-fastmac/.
"Cheap DIY iPhone External Battery," dated Jul. 22, 2008, http://fastdad.wordpress.com/2008/07/22/cheap-diy-iphone-external-battery/.
Jeremy Horwitz, "iLuv i603 / i604 Rechargeable Lithium Polymer Batteries with Silicone Skin," dated Jun. 27, 2006, http://www.ilounge.com/index.php/reviews/entry/iluv-i603-rechargeable-lithium-polymer-battery-with-silicone-skin/.
Julie Strietelmeier, "Seidio INNODock Desktop Cradle for Treo 650," dated Jul. 28, 2005, http://the-gadgeteer.com/2005/07/28/seidio_innodock_desktop_cradle_for_treo_650/.
Brian Nyhuis, "Mophie Juice Pack Battery Case for Samsung Galaxy S III Review," dated Nov. 28, 2012, http://www.legitreviews.com/mophie-juice-pack-battery-case-for-samsung-galaxy-s-iii-review_2084.

"PowerSkin Samsung Galaxy S3 Case with Backup Battery," dated Aug. 19, 2012, http://gadgetsin.com/powerskin-samsung-galaxy-s3-case-with-backup-battery.htm.
"iPhone 4 Case with Battery Pack," dated Sep. 28, 2010, http://gadgetsin.com/iphone-4-case-with-battery-pack.htm.
Jonathan Pena, "iPhone 5 Cases, Round 3," dated Sep. 16, 2012, http://www.technologytell.com/apple/103833/iphone-5-cases-round-3/.
Jeremy Horwitz, "Mophie Juice Pack for iPhone," dated Dec. 7, 2007, http://www.ilounge.com/index.php/reviews/entry/mophie-juice-pack-for-iphone/.
Dr. Macenstein, "Review: Mophie Juice Pack for iPhone," dated Apr. 27, 2008, http://macenstein.com/default/archives/1314.
Wayne Schulz, "iPhone Extended Battery Review—Mophie Juice Pack," dated Jun. 17, 2008, http://www.geardiary.com/2008/06/17/iphone-extended-battery-review-mophie-juice-pack/.
Mophie Juice Pack iPhone 1G Product—Figures 1-7—Retrieved from http://www.mophie.com/products/juice-pack on Apr. 10, 2009.
Mophie Juice Pack iPhone 1G Product—Figure 8—Retrieved from http://www.mophie.com/pages/information/ on Apr. 10, 2009.
Mophie Juice Pack iPhone 1G Product—Figures 9-14—Retrieved from http://www.mophie.com/blogs/Juice_Pack_FAQ on Apr. 10, 2009.
Mophie Juice Pack iPhone 1G Product—Figures 15-16—Retrieved from http://mophie.com/blogs/Juice_Pack_FAQ on Apr. 20, 2009. Figure 16 is dated May 1, 2008.
Tomas Ratas, "Mophie Juice Pack—iPhone 3G," dated Dec. 9, 2008, http://www.testfreaks.com/blog/review/mophie-juice-pack-iphone-3g/.
Dr. Macenstein, "Review: Mophie Juice Pack 3G for iPhone," dated Nov. 27, 2008, http://macenstein.com/default/archives/1820.
Ewdison Then, "Mophie Juice Pack iPhone 3G Review," dated Nov. 12, 2008, http://www.slashgear.com/mophie-juice-pack-iphone-3g-review-1222446/.
Mophie Juice Pack iPhone 3G Product—Figures 1-8—Retrieved from http://www.mophie.com/products/juice-pack-iphone-3g on Apr. 10, 2009.
Mophie Juice Pack iPhone 3G Product—Figures 9-10—Retrieved from http://www.mophie.com/pages/iphone-3g-details on Apr. 10, 2009.
Mophie Juice Pack iPhone 3G Product—Figures 11-14—Retrieved from http://mophie.com/blogs/Juice_Pack_3G_FAQ on Apr. 10, 2009.
Mophie Juice Pack iPhone 3G Product—Figures 15-16—Retrieved from http://mophie.com/blogs/press on Apr. 20, 2009. Figure 15 is dated Aug. 4, 2008, and Figure 16 is dated Nov. 10, 2008.
Mophie Juice Pack iPhone 3G User Manual—Retrieved from http://static3.shopify.com/s/files/1/0008/4942/assets/mophie_juice_pack_3G_manual_rl.pdf on Apr. 10, 2009.
Panasonic Lithium Ion Batteries Technical Handbook, dated 2007.
Chris Foresman, "Several Backup Batteries Can Extend Your Daily iPhone 3G Use," dated Jul. 18, 2008, http://arstechnica.com/apple/2008/07/several-backup-batteries-can-extend-your-daily-iphone-3g-use/.
Using Your Treo 650 Smartphone by palmOne, dated 2005.
Lisa Gade, "Palm Treo 750," dated Jan. 17, 2007, http://www.mobiletechreview.com/phones/Treo-750.htm.
Incase Power Slider 3G for iPhone 3G Product Reference, alleged by Incase to be available on Nov. 28, 2008.
iPhone User's Guide, 2007.
"Power Slider," Web Archive Date Dec. 4, 2008, https://web.archive.org/web/20081204105303/http://goincase.com/products/detail/power-slider-ec20003/?
Azadeh Ensha, "A Case for Filling the iPhone 3G's Power Vacuum," Dated Nov. 27, 2008.
Joseph Flatley, "Incase Power Slider for iPhone 3G Doubles the Juice, Lets You Sync," dated Nov. 17, 2008.
Darren Quick, "Mophie Juice Pack for iPhone 3G now shipping," dated Nov. 10, 2008, http://www.gizmag.com/mophie-juice-pack-iphone-3g/10342/.
Otterbox Catalog, 2006.

(56) References Cited

OTHER PUBLICATIONS

Jeremy Horowitz, "PhoneSuit MiLi Power Pack for iPhone," Jan. 29, 2009, http://www.ilounge.com/index.php/reviews/entry/phonesuit-mili-power-pack-for-iphone/.
Jeremy Horowitz, "FastMac TruePower iV Universal Battery Charger," Dec. 11, 2008, http://www.ilounge.com/index.php/reviews/entry/fastmac-truepower-iv-universal-battery-charger/.
Jeremy Horowitz, "Konnet PowerKZ Extended Power for iPhone," Apr. 2, 2009, http://www.ilounge.com/index.php/reviews/entry/konnet-powerkz-extended-power-for-iphone/.
"Test: Batterie iPhone SKPAD" with Machine English Translation, Feb. 2, 2009, http://iphonesofa.com/2009/02/02/test-batterie-iphone-skpad.
Kanamori et al., "USB battery-charger designs meet new industry standards," EDN pp. 63-70, dated Feb. 21, 2008.
AVR458: Charging Lithium-Ion Batteries with ATAVRBC100, which appear to include a date of Aug. 2008.
Battery Charging Specification, dated Apr. 15, 2009.
BCM2033 Product Brief, 2 pages, dated Nov. 1, 2002.
"USB battery charger detector intelligently powers mobiles," Dec. 17, 2007, http://www.eetasia.com/ART_8800493819_765245_NP_10b171b6.HTMce#.
Webpage Archive, Mophie.com, Nov. 25, 2007.
Ben Kaufman, "Behind the Invention: The mophie Juice Pack," dated Dec. 31, 2013, https://medium.com/@benkaufman/behind-the-invention-the-mophie-juice-pack-a0620f74efcf.
Mophie Relo Recharge, dated Feb. 7, 2006, http://songsling.com/recharge.html.
*Case-Ari, LLC v. mStation, Inc.*, Case No. 1:2010-CV-01874 in the United States District Court for the Northern District of Georgia, filed Jun. 17, 2010 (Docket).
*Daniel Huang v. GC Technology, LLC*, Case No. CV10-4705 CAS (VBKx) in the United States District Court for the Central District of California, filed Jun. 24, 2010 (Docket).
*Hali-Power, Inc. v. mStation Corp.*, Case No. 1:2010-CV-00773 in the United States District Court for the Northern District of New York, filed Jun. 30, 2010 (Docket).
*Mophie, Inc. v. Loza & Loza, LLP*, Case No. SACV11-00539 DOC (MLGx) in the United States District Court for the Central District of California, filed Apr. 7, 2011 (Docket).
Mophie's Complaint, filed Apr. 7, 2011 in *Mophie, Inc. v. Loza & Loza, LLP*, Case No. SACV11-00539 DOC (MLGx) in the United States District Court for the Central District of California.
*Mophie, Inc. v. Foreign Trade Corporation*, Case No. 8:12-CV-00292-JST-RNB in the United States District Court for the Central District of California, filed Feb. 24, 2012 (Docket).
*Mophie, Inc. v. Kdlinks Inc.*, Case No. 2:2012-CV-02639 in the United States District Court for the Central District of California, filed Mar. 27, 2012 (Docket).
*Otter Products, LLC v. Mophie, LLC*, Case No. 1:2012-CV-01969 in the United States District Court for the District of Colorado, filed Jul. 27, 2012 (Docket).
Mophie's Answer, filed Oct. 15, 2012 in *Otter Products, LLC v. Mophie, LLC*, Case No. 1:2012-CV-01969 in the United States District Court for the District of Colorado.
Otter's Motion for Summary Judgment of Infringement and Declaration in Support Thereof, filed May 13, 2013 in *Otter Products, LLC v. Mophie, LLC*, Case No. 1:2012-CV-01969 in the United States District Court for the District of Colorado.
Mophie's Opposition to Motion for Summary Judgment of Infringement, filed Jun. 6, 2013 in *Otter Products, LLC v. Mophie, LLC*, Case No. 1:2012-CV-01969 in the United States District Court for the District of Colorado.
Mophie's Claim Construction Brief, filed Jun. 14, 2013 in *Otter Products, LLC v. Mophie, LLC*, Case No. 1:2012-CV-01969 in the United States District Court for the District of Colorado.
Otter's Claim Construction Brief, filed Jun. 14, 2013 in *Otter Products, LLC v. Mophie, LLC*, Case No. 1:2012-CV-01969 in the United States District Court for the District of Colorado.

Mophie's Brief in Response to Otter's Claim Construction Brief, filed Jun. 24, 2013 in *Otter Products, LLC v. Mophie, LLC*, Case No. 1:2012-CV-01969 in the United States District Court for the District of Colorado.
Otter's Rebuttal Brief for Construction of Claim Terms and Declaration, filed Jun. 24, 2013 in *Otter Products, LLC v. Mophie, LLC*, Case No. 1:2012-CV-01969 in the United States District Court for the District of Colorado.
Otter's Reply in Support of Motion for Summary Judgment of Infringement, filed Jun. 24, 2013 in *Otter Products, LLC v. Mophie, LLC*, Case No. 1:2012-CV-01969 in the United States District Court for the District of Colorado.
Joint Claim Construction Statement, filed Jun. 26, 2013 in *Otter Products, LLC v. Mophie, LLC*, Case No. 1:2012-CV-01969 in the United States District Court for the District of Colorado.
*Incase Designs, Inc. v. Mophie, Inc.*, Case No. 3:2013-CV-00602 in the United States District Court for the Northern District of California, filed Feb. 12, 2013 (Docket).
Mophie's Amended Answer and Counterclaims, filed May 8, 2013 in *Incase Designs, Inc. v. Mophie, Inc.*, Case No. 3:2013-CV-00602 in the United States District Court for the Northern District of California.
Mophie's Opposition to Motion to Strike Amended Affirmative Defenses, Filed Jun. 12, 2013 in *Incase Designs, Inc. v. Mophie, Inc.*, Case No. 3:2013-CV-00602 in the United States District Court for the Northern District of California.
Mophie's Reply in Support of Motion to Stay and Supporting Declaration, filed Sep. 3, 2103 in *Incase Designs, Inc. v. Mophie, Inc.*, Case No. 3:2013-CV-00602 in the United States District Court for the Northern District of California.
*Incase Designs, Inc. v. Mophie, Inc.*, Case No. 3:2013-CV-03356 in the United States District Court for the Northern District of California, filed Jul. 18, 2013 (Docket).
*Incase Designs, Corp. v. Mophie, Inc.*, Case No. 3:2013-CV-04314 in the United States District Court for the Northern District of California, filed Sep. 18, 2013 (Docket).
Mophie Motion 1—To Be Accorded Benefit, filed Nov. 20, 2013 in Patent Interference No. 105,946(RES).
Declaration of John Feland, Ph.D, in Support of Mophie Motion 1 to Be Accorded Benefit, dated Nov. 20, 2013, in Patent Interference No. 105,946(RES).
Mophie Motion 2—For Judgment that Incase's Involved Claims Are Unpatentable, filed Nov. 20, 2013 in Patent Interference No. 105,946(RES).
Declaration of John Feland, Ph.D, in Support of Mophie Motion 2 for Judgement That Incase's Involved Claims Are Unpatentable, dated Nov. 20, 2013, in Patent Interference No. 105,946(RES).
Incase Motion 1—Motion for Benefit, filed Nov. 20, 2013 in Patent Interference No. 105,946(RES).
Incase Motion 2—Motion to Undesignate Claims, filed Nov. 20, 2013 in Patent Interference No. 105,946(RES).
Incase Motion 3—Motion for Judgment Based on Lack of Written Description, filed Nov. 20, 2013 in Patent Interference No. 105,946(RES).
Incase Motion 4—Motion for Unpatentability of Mophie Claims, filed Nov. 20, 2013 in Patent Interference No. 105,946(RES).
Declaration of Andrew Wolfe, filed Nov. 20, 2013 in Patent Interference No. 105,946(RES).
Declaration of Thomas Overthun, filed Nov. 20, 2013 in Patent Interference No. 105,946(RES).
Declaration of Gabriel Dan, filed Nov. 20, 2013 in Patent Interference No. 105,946(RES).
Mophie's Third Amended Complaint, filed Jun. 27, 2014, in *Mophie, Inc. v. Source Vista*, Case No. 8:13-CV-01321 in the United States District Court for the Central District of California.
LivingSocial's Answer to Mophie's Fifth Amended Complaint and Counterclaims, filed Sep. 24, 2014, in *Mophie, Inc. v. Source Vista*, Case No. 8:13-CV-01321 in the United States District Court for the Central District of California.
Shah's Answer, Affirmative Defenses, and Counterclaims to Plaintiffs Fifth Amended Complaint, filed Sep. 24, 2014, in *Mophie, Inc. v. Source Vista*, Case No. 8:13-CV-01321 in the United States District Court for the Central District of California.

(56) References Cited

OTHER PUBLICATIONS

Expert Report of Dr. David Munson, dated Aug. 28, 2014, in *Mophie, Inc.* v. *Source Vista,* Case No. 8:13-CV-01321 in the United States District Court for the Central District of California.
Expert Report of John Feland, Ph.D, dated Aug. 28, 2014, in *Mophie, Inc.* v. *Source Vista,* Case No. 8:13-CV-01321 in the United States District Court for the Central District of California.
Rebutal Expert Report of John Feland, Ph.D, dated Sep. 25, 2014, in *Mophie, Inc.* v. *Source Vista,* Case No. 8:13-CV-01321 in the United States District Court for the Central District of California.
Rebutal Expert Report of Dr. David Munson, dated Sep. 25, 2014, in *Mophie, Inc.* v. *Source Vista,* Case No. 8:13-CV-01321 in the United States District Court for the Central District of California.
Mophie's Second Amended Response to LivingSocial's Interrogatory No. 1[21], dated Aug. 28, 2014, in *Mophie, Inc.* v. *Source Vista,* Case No. 8:13-CV-01321 in the United States District Court for the Central District of California.
Mophie's Second Amended Response to Serve Global's Interrogatory No. 2, dated Aug. 28, 2014, in *Mophie, Inc.* v. *Source Vista,* Case No. 8:13-CV-01321 in the United States District Court for the Central District of California.
Defendant's Memorandum in Support of Motion for Partial Summary Judgement, dated Sep. 23, 2014, in *Mophie, Inc.* v. *Source Vista,* Case No. 8:13-CV-01321 in the United States District Court for the Central District of California.
Declaration of David Munson in Support of Defendant's Motion for Partial Summary Judgment, dated Sep. 22, 2014, in *Mophie, Inc.* v. *Source Vista,* Case No. 8:13-CV-01321 in the United States District Court for the Central District of California.
John Feland, Ph.D. Deposition Transcript, dated Sep. 30, 2014, in *Mophie, Inc.* v. *Source Vista,* Case No. 8:13-CV-01321 in the United States District Court for the Central District of California.
Matthew Brand Deposition Transcript, dated Jul. 23, 2014, in *Mophie, Inc.* v. *Source Vista,* Case No. 8:13-CV-01321 in the United States District Court for the Central District of California.
Dharmesh Shah Deposition Transcript, dated Jul. 11, 2014, in *Mophie, Inc.* v. *Source Vista,* Case No. 8:13-CV-01321 in the United States District Court for the Central District of California.
Defendants' Statement of Uncontroverted Material Fact and Contentions of Law, filed Sep. 22, 2014 in *Mophie, Inc.* v. *Source Vista,* Case No. 8:13-CV-01321 in the United States District Court for the Central District of California.
Memorandum of Points and Authorities in Support of Mophie's Motion for Summary Judgment, filed Sep. 22, 2014, in *Mophie, Inc.* v. *Source Vista,* Case No. 8:13-CV-01321 in the United States District Court for the Central District of California.
Statement of Uncontroverted Facts and Conclusions of Law in Support of Mophie's Motion for Summary Judgment, filed Sep. 22, 2014, in *Mophie, Inc.* v. *Source Vista,* Case No. 8:13-CV-01321 in the United States District Court for the Central District of California.
Mophie's Opposition to Shah and Serve Global's Motion for Partial Summary Judgment, dated Oct. 3, 2014, in *Mophie, Inc.* v. *Source Vista,* Case No. 8:13-CV-01321 in the United States District Court for the Central District of California.
Statement of Genuine Disputes of Material Fact in Opposition to Shah and Serve Global's Motion for Partial Summary Judgment, filed Oct. 3, 2014, in *Mophie, Inc.* v. *Source Vista,* Case No. 8:13-CV-01321 in the United States District Court for the Central District of California.
Opposition of LivingSocial to Mophie's Motion for Summary Judgment, dated Oct. 3, 2014, in *Mophie, Inc.* v. *Source Vista,* Case No. 8:13-CV-01321 in the United States District Court for the Central District of California.
Defendants' Opposition to Plaintiff's Motion for Summary Judgment, filed Oct. 3, 2014, in *Mophie, Inc.* v. *Source Vista,* Case No. 8:13-CV-01321 in the United States District Court for the Central District of California.
Defendants' Response to Plaintiffs Statement of Uncontroverted Material Fact and Contentions of Law, filed Oct. 3, 2014, in *Mophie,*

*Inc.* v. *Source Vista,* Case No. 8:13-CV-01321 in the United States District Court for the Central District of California.
David Munson Deposition Transcript, dated Sep. 29, 2014, in *Mophie, Inc.* v. *Source Vista,* Case No. 8:13-CV-01321 in the United States District Court for the Central District of California.
Mophie's First Amended Complaint, filed Jun. 25, 2014, in *Mophie, Inc.* v. *UNU Electronics Inc.,* Case No. 8:13-CV-01705 in the United States District Court for the Central District of California.
UNU's Answer and Counterclaims, filed Jul. 10, 2014, in *Mophie, Inc.* v. *UNU Electronics Inc.,* Case No. 8:13-CV-01705 in the United States District Court for the Central District of California.
Mophie's Responses to Defendant's Third Set of Interrogatories (No. 12), dated Aug. 21, 2014, in *Mophie, Inc.* v. *UNU Electronics Inc.,* Case No. 8:13-CV-01705 in the United States District Court for the Central District of California.
Mophie's Responses to Defendant's First set of Requests for Admissions (Nos. 1-46), dated Aug. 19, 2014, in *Mophie, Inc.* v. *UNU Electronics Inc.,* Case No. 8:13-CV-01705 in the United States District Court for the Central District of California.
Mophie's Responses to Defendant's Second set of Requests for Admissions (Nos. 47-109), dated Aug. 19, 2014, in *Mophie, Inc.* v. *UNU Electronics Inc.,* Case No. 8:13-CV-01705 in the United States District Court for the Central District of California.
Request for Ex Parte Reexamination of U.S. Pat. No. 8,367,235, filed Aug. 14, 2014.
Corrected Request for Ex Parte Reexamination of U.S. Pat. No. 8,367,235, filed Sep. 18, 2014.
Declaration of John Feland, Ph.D. In Support of Mophie's Opposition to Defendants Motion for Partial Summary Judgment, filed Oct. 3, 2014, in *Mophie, Inc.* v. *Source Vista,* Case No. 8:13-CV-01321 in the United States District Court for the Central District of California.
LivingSocial's Reply in Support of Motion for Summary Judgment, Filed Oct. 10, 2014, in *Mophie, Inc.* v. *Source Vista,* Case No. 8:13-CV-01321 in the United States District Court for the Central District of California.
Defendants' Reply in Support of Motion for Partial Summary Judgment, Filed Oct. 10, 2014, in *Mophie, Inc.* v. *Source Vista,* Case No. 8:13-CV-01321 in the United States District Court for the Central District of California.
Reply in Support of Mophie's Motion for Summary Judgment, Filed Oct. 10, 2014, in *Mophie, Inc.* v. *Source Vista,* Case No. 8:13-CV-01321 in the United States District Court for the Central District of California.
Mophie's Reply to Counterclaims of LivingSocial, filed Oct. 14, 2014, in *Mophie, Inc.* v. *Source Vista,* Case No. 8:13-CV-01321 in the United States District Court for the Central District of California.
Mophie's Reply to Counterclaims of Shah, filed Oct. 14, 2014, in *Mophie, Inc.* v. *Source Vista,* Case No. 8:13-CV-01321 in the United States District Court for the Central District of California.
Defendant's Response to Mophie's Fourth Set of Interrogatories, dated Sep. 23, 2014, in *Mophie, Inc.* v. *UNU Electronics Inc.,* Case No. 8:13-CV-01705 in the United States District Court for the Central District of California.
Plaintiff Mophie's Preliminary Claim Constructions and Identification of Extrinsic Evidence, dated Oct. 14, 2014, in *Mophie, Inc.* v. *UNU Electronics Inc.,* Case No. 8:13-CV-01705 in the United States District Court for the Central District of California.
Defendant's Preliminary Claim Constructions and Extrinsic Evicence, dated Oct. 14, 2014, in *Mophie, Inc.* v. *UNU Electronics Inc.,* Case No. 8:13-CV-01705 in the United States District Court for the Central District of California.
Plaintiff Mophie's Opening Brief on Claim Construction, filed Oct. 29, 2014, in *Mophie, Inc.* v. *UNU Electronics Inc.,* Case No. 8:13-CV-01705 in the United States District Court for the Central District of California.
Declaration of John Feland, Ph.D. In Support of Plaintiff's Preliminary Claim Constructions, filed Oct. 29, 2014, in *Mophie, Inc.* v. *UNU Electronics Inc.,* Case No. 8:13-CV-01705 in the United States District Court for the Central District of California.
Supplemental Declaration of John Feland, Ph.D. In Support of Plaintiff's Claim Constructions, filed Oct. 29, 2014, in *Mophie, Inc.*

(56) References Cited

OTHER PUBLICATIONS v. *UNU Electronics Inc.*, Case No. 8:13-CV-01705 in the United States District Court for the Central District of California.
Declaration of Sheila N. Swaroop in Support of Mophie's Opening Claim Construction Brief, filed Oct. 29, 2014, in *Mophie, Inc.* v. *UNU Electronics Inc.*, Case No. 8:13-CV-01705 in the United States District Court for the Central District of California.
Transcript of Deposition of John Feland, dated Oct. 21, 2014, in *Mophie, Inc.* v. *UNU Electronics Inc.*, Case No. 8:13-CV-01705 in the United States District Court for the Central District of California.
Defendant's Opening Claim Construction Brief, dated Oct. 29, 2014, in *Mophie, Inc.* v. *UNU Electronics Inc.*, Case No. 8:13-CV-01705 in the United States District Court for the Central District of California.
Order Granting Request for Ex Parte Reexamination of U.S. Pat. No. 8,367,235, in Reexamination Control No. 90/013,319, dated Oct. 24, 2014.
Order Re LivingSocial's Motion for Summary Judgment, Mophie's Motion for Summary Judgment, Source Vista and Shah's Motion for Partial Summary Judgment, and Mophie's Motion to Bifurcate, dated Nov. 12, 2014, in *Mophie, Inc.* v. *Source Vista*, Case No. 8:13-CV-01321 in the United States District Court for the Central District of California.
Mophie's Memorandum in Support of its Motion for Reconsideration, filed Nov. 19, 2014, in *Mophie, Inc.* v. *Source Vista*, Case No. 8:13-CV-01321 in the United States District Court for the Central District of California.
Declaration of Sheila N. Swaroop in Support of Mophie's Motion for Reconsideration, filed Nov. 19, 2014, in *Mophie, Inc.* v. *Source Vista*, Case No. 8:13-CV-01321 in the United States District Court for the Central District of California.
Order Denying Plantiff's Motion for Reconsideration, dated Nov. 21, 2014, in *Mophie, Inc.* v. *Source Vista*, Case No. 8:13-CV-01321 in the United States District Court for the Central District of California.
U.S. Appl. No. 14/800,530 Including its prosecution history, filed Oct. 15, 2015, Huang et al.
U.S. Appl. No. 14/675,067 Including its prosecution history, filed Mar. 31, 2015.
U.S. Appl. No. 29/539,419 Including its prosecution history, filed Sep. 14, 2015, Dang et al.
U.S. Appl. No. 29/510,154 Including its prosecution history, filed Nov. 25, 2014, Mophie, Inc.
U.S. Appl. No. 29/510,153 Including its prosecution history, filed Nov. 25, 2014, Mophie, Inc.
U.S. Appl. No. 29/522,987 Including its prosecution history, filed Apr. 6, 2015, Gjøvik et al.
U.S. Appl. No. 29/510,839 Including its prosecution history, filed Dec. 3, 2014, Mophie, Inc.
U.S. Appl. No. 29/523,211 Including its prosecution history, filed Apr. 7, 2015, To et al.
U.S. Appl. No. 29/523,209 Including its prosecution history, filed Apr. 7, 2015, Mophie, Inc.
U.S. Appl. No. 29/528,266 Including its prosecution history, filed May 27, 2015, Gjøvik et al.
U.S. Appl. No. 29/534,901 Including its prosecution history, filed Jul. 31, 2015, Dang et al.
International Preliminary Report on Patentability for PCT/US2013/057276, dated Mar. 3, 2015.
International Preliminary Report on Patentability for PCT/US2014/017781, dated Aug. 25, 2015.
International Preliminary Report on Patentability for PCT/US2014/023592, dated Sep. 15, 2015.
International Search Report and Written Opinion for PCT/US2014/067470, dated Mar. 31, 2015.
Defendants Dharmesh Shah and Serve Global, LLC's Memorandum of Points and Authorities in Support of Defendants's Motion for Attorney's Fees, filed Mar. 21, 2015, in *Mophie, Inc.* v. *Source Vista*, Case No. 8:13-CV-01321 in the United States District Court for the Central District of California.
Memorandum of Points and Authorities in Support of Livingsocial, Inc.'s Motion for Legal Fees and Costs, filed Mar. 20, 2015, in *Mophie, Inc.* v. *Source Vista*, Case No. 8:13-CV-01321 in the United States District Court for the Central District of California.
Plaintiff Mophie, Inc.'s Opposition to Defendants Dharmesh Shah and Serve Global, LLC's Motion for Attorneys' Fees, filed Apr. 3, 2015, in *Mophie, Inc.* v. *Source Vista*, Case No. 8:13-CV-01321 in the United States District Court for the Central District of California.
Plaintiff Mophie, Inc.'s Opposition to Defendant Livingsocial, Inc.'s Motion for Attorneys' Fees, filed Apr. 3, 2015, in *Mophie, Inc.* v. *Source Vista*, Case No. 8:13-CV-01321 in the United States District Court for the Central District of California.
Reply to Plaintiff's Opposition to Defendants Dharmesh Shah and Serve Global, LLC's Motion for Attorney's Fees, filed Apr. 10, 2015, in *Mophie, Inc.* v. *Source Vista*, Case No. 8:13-CV-01321 in the United States District Court for the Central District of California.
Reply in Support of Livingsocial, Inc.'s Motion for Legal Fees and Costs, filed Apr. 10, 2015, in *Mophie, Inc.* v. *Source Vista*, Case No. 8:13-CV-01321 in the United States District Court for the Central District of California.
Amended Final Judgment and Permanent Injunction, dated Dec. 11, 2015, in *Mophie, Inc.* v. *Source Vista*, Case No. 8:13-CV-01321 in the United States District Court for the Central District of California.
Order Re Motions for Attorneys' Fees, Motion to Amend Permanent Injunction, Motions for Judgment as a Matter of Law, Motion for Relief From Judgment, and Motion for New Trial, dated Dec. 11, 2015, in *Mophie, Inc.* v. *Source Vista*, Case No. 8:13-CV-01321 in the United States District Court for the Central District of California.
Daniel Huang Deposition Transcript (Redacted) with Exhibit 121, dated Aug. 21, 2014, in *Mophie, Inc.* v. *Source Vista*, Case No. 8:13-CV-01321 in the United States District Court for the Central District of California.
Mophie's Complaint, filed Dec. 16, 2015, in *Mophie, Inc.* v. *Cute Mobile Inc.*, Case No. 8:15-cv-02086 in the United States District Court for the Central District of California.
U.S. Appl. No. 15/130,196, including its prosecution history, filed Apr. 15, 2016, Huang.
U.S. Appl. No. 15/223,683 Including its prosecution history, filed Jul. 29, 2016, Huang et al.
U.S. Appl. No. 15/223,735, Including its prosecution history, filed Jul. 29, 2016, Diebel et al.
International Preliminary Report of Patentability for PCT/US2014/067470, dated Jun. 9, 2016.
International Search Report and Written Opinion for PCT/US2015/065800, dated Apr. 21, 2016.
Amazon.com, "Galaxy S6 Battery Case, i-Blason External Protective Battery Case/Cover for Samsung Galaxy S6 2015 Release." Customer Review published Mar. 29, 2015. Retrieved from internet at <http://www.amazon.com/Case-i-Blason-External-Protective-Versions/dp/B00SNS4LME>, Accessed on Apr. 28, 2016. 7 pages.
Mophie's First Amended Complaint, filed May 25, 2016 in *Mophie, Inc.* v. *Cute Mobile Inc.*, Case No. 8:15-cv-02086 in the United States District Court for the Central District of California.
U.S. Appl. No. 29/556,805, filed Mar. 3, 2016, Dang et al.
U.S. Appl. No. 29/556,807, filed Mar. 3, 2016, Dang et al.
U.S. Appl. No. 29/556,809, filed Mar. 3, 2016, Dang et al.

\* cited by examiner

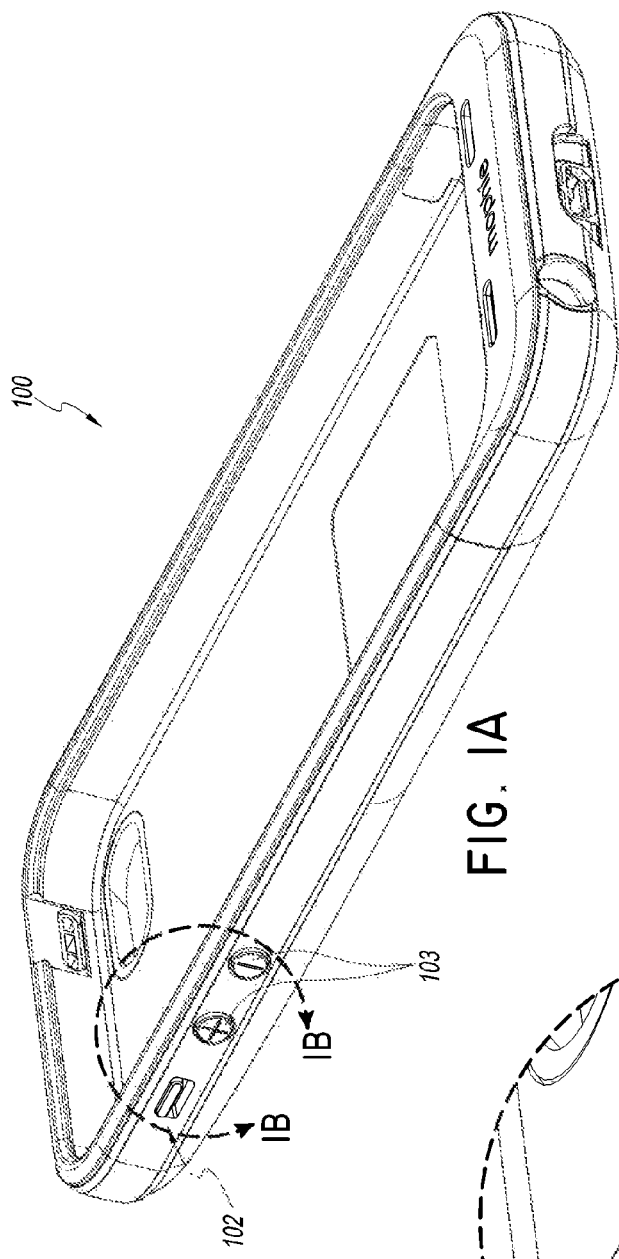
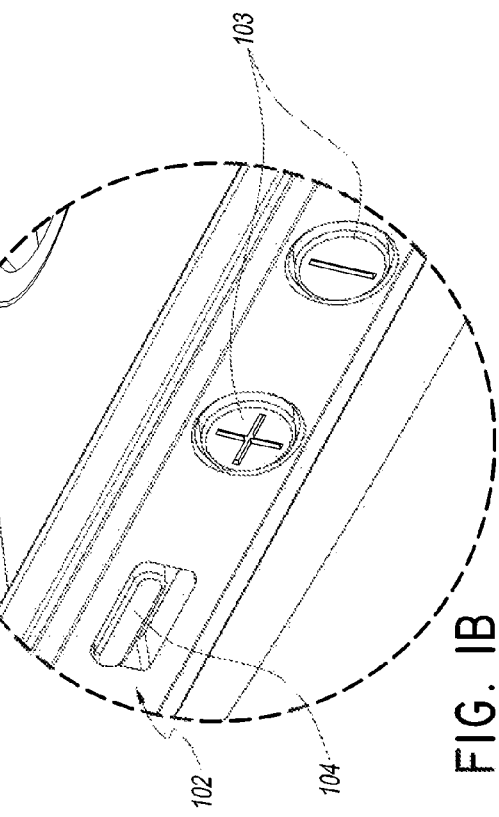
FIG. 1A
FIG. 1B

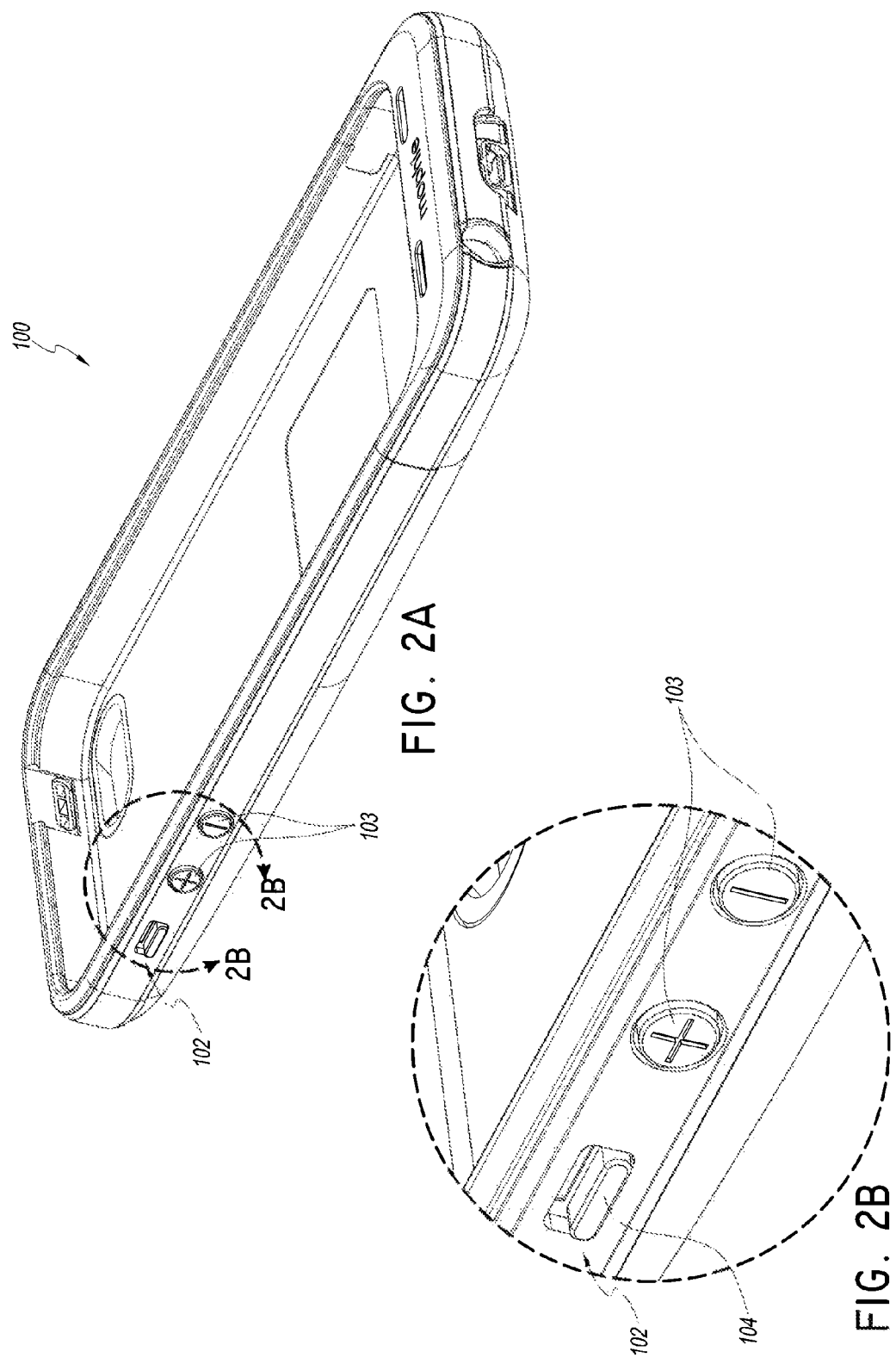

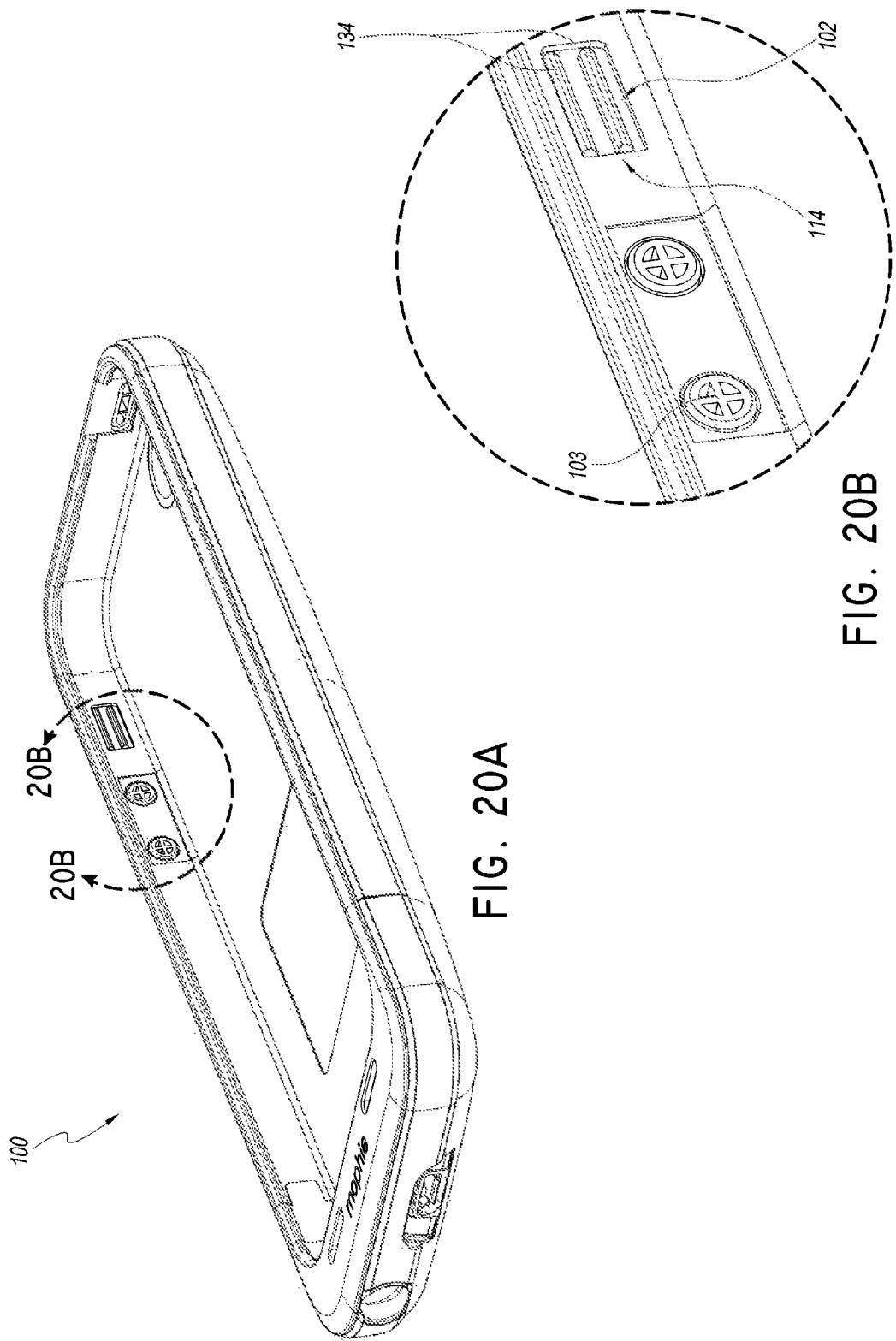

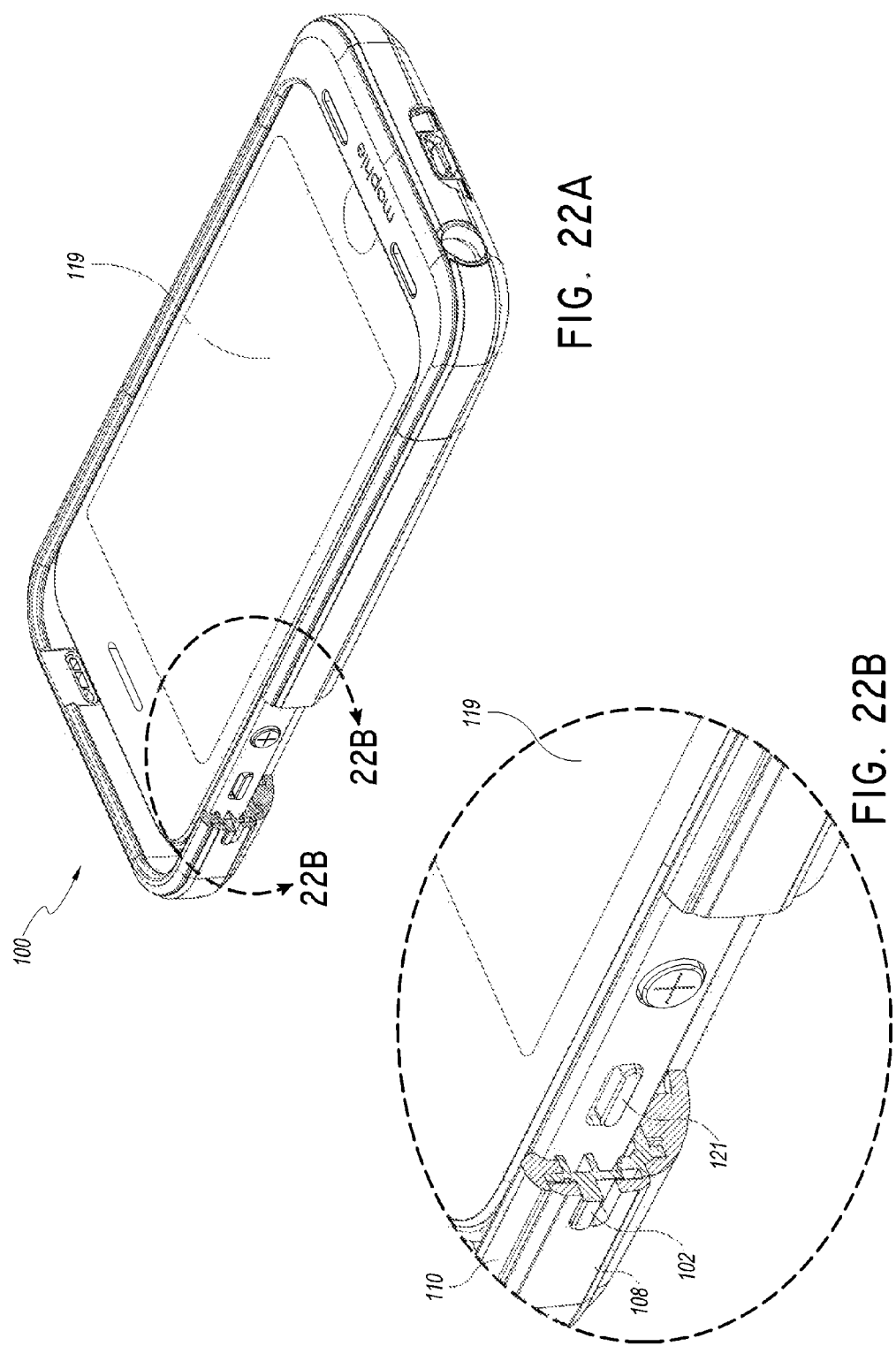

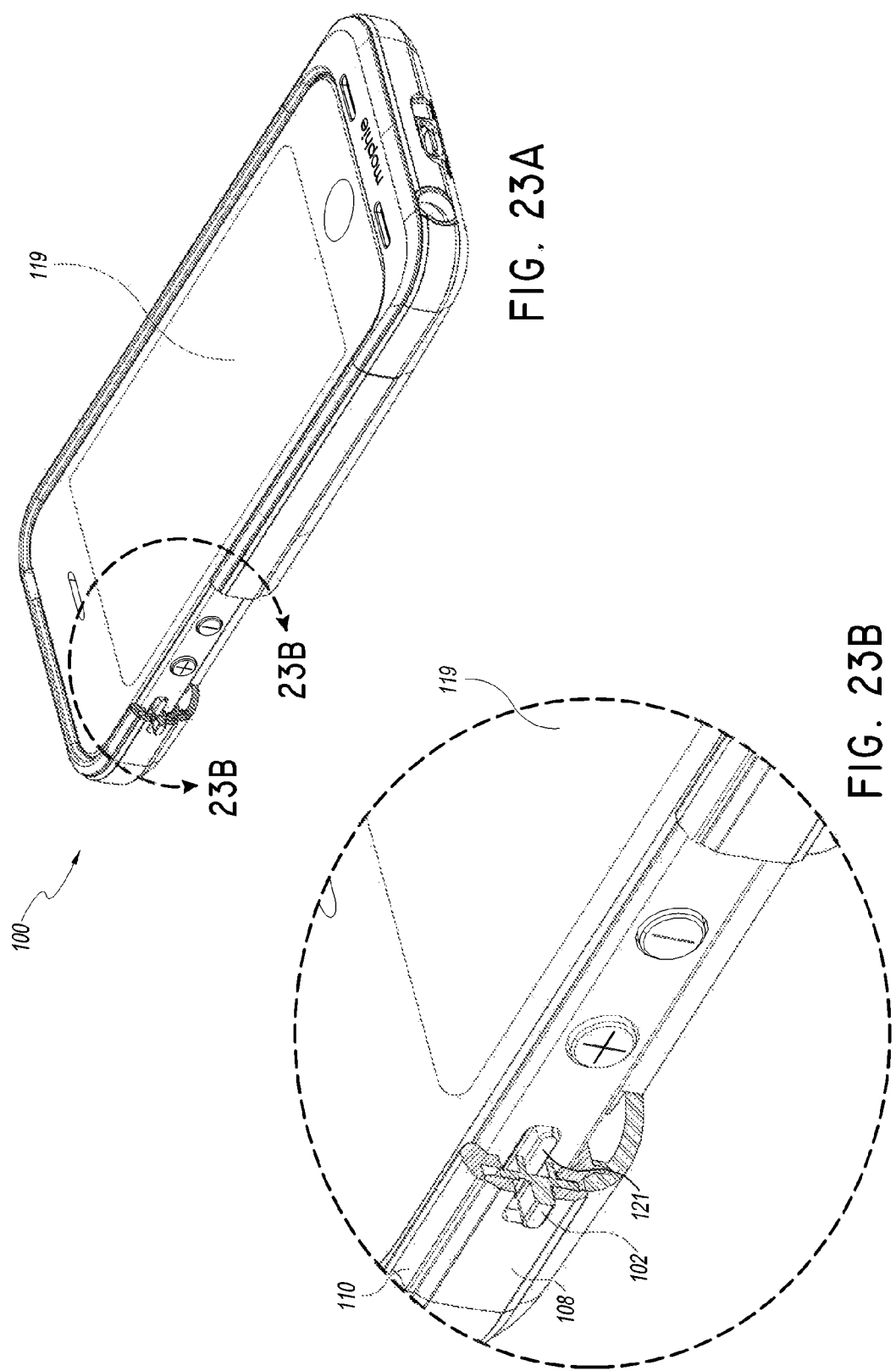

PROTECTIVE CASE WITH SWITCH COVER

CROSS-REFERENCE TO RELATED APPLICATIONS

This application claims the benefit under 35 U.S.C. §119(e) of U.S. Provisional Patent Application No. 61/768,538, filed on Feb. 25, 2013, and titled "SWITCH COVER AND EXTERNAL CASE INCORPORATING A SWITCH COVER," and U.S. Provisional Patent Application No. 61/923,590, filed on Jan. 3, 2014, and titled "PROTECTIVE CASE WITH SWITCH COVER." Each of the above-identified patent application is incorporated by reference in their entirety and made a part of this specification for all that they disclose.

INCORPORATION BY REFERENCE

The following U.S. Patent Applications are incorporated by reference in their entirety and made a part of this specification for all that they disclose: U.S. patent application Ser. No. 12/357,262, titled "Battery Pack, Holster, and Extendible Processing and Interface Platform for Mobile Devices," and filed Jan. 21, 2009, now U.S. Pat. No. 8,367,235; U.S. Provisional Patent Application No. 61/021,897, titled "Battery Pack and Holster for Mobile Devices," and filed Jan. 18, 2008; U.S. Provisional Patent Application No. 61/495,848, titled "Near Field Communication Accessory for a Mobile Device," and filed Jun. 10, 2011; U.S. patent application Ser. No. 13/492,785, titled "Wireless Communication Accessory for a Mobile Device," and filed Jun. 8, 2012; U.S. Design patent application No. 29/435,908, titled "High Capacity Banded Battery Case for a Mobile Device," and filed Oct. 30, 2012; U.S. Design patent application No. 29/435,907, titled "Thin Banded Snap Battery Case for a Mobile Device," and filed Oct. 30, 2012; and U.S. Design patent application No. 29/440,062, titled "Thin Banded Snap Battery Case for a Mobile Device," and filed Dec. 18, 2012.

BACKGROUND

Field

This application generally relates to covers for mechanical switches, and more particularly to protective cases for mobile electronic devices having switch covers configured to actuate mechanical switches on the mobile electronic devices.

Description of the Related Art

Many mobile devices (e.g., mobile phones, digital assistants, mobile communication devices, handheld video game devices, handheld computing devices, personal music/video/content players, navigation systems, sensors, and storage devices) may be expensive, may have fragile equipment such as breakable glass touchscreens and lenses, may have easily scuffed decorative finishes, may have delicate internal electronic components, and may have easily broken or lost buttons and/or switches. People have also become more and more dependent on the data, contacts, and calendars stored in their mobile devices, even as the devices shrink and incorporate more expensive and more sensitive components. These expensive devices and the critical stored data can be protected with a relatively inexpensive protective case. Additionally as the mobile device form factor shrinks, the mechanical controls can similarly shrink.

Additionally, such mobile devices are typically designed to satisfy the needs of a wide array of consumers. While some consumers are comfortable with no case or decorative cases providing minimal protection, for other consumers, these devices are frequently used in harmful environments such that external covers capable of protecting the internal device from liquid, dust, crushing, and impact are beneficial. Consequently, users who wish to protect their mobile device in harmful environments (e.g., military, law enforcement, construction workers, and outdoors enthusiasts) often protect their cases with bulky, durable cases.

One solution to access buttons through an external case is to include depressible pass-through buttons that do not directly expose the device, thereby providing additional protection without noticeable access ports. However, some mobile devices incorporate switches or toggles, which mechanically move from a first position to a second position. Sometimes the switches or toggles visibly identify the present status, such as through a 1 and 0 or red and green indicator. A depressible pass-through button on a case does not adequately control a switch or toggle on a mobile device and does not provide any visible identifier of the current switch or toggle status. Previous solutions often include pass-through holes in the case or thin, flexible membranes for switches and toggles. Pass-through holes and thin membranes reduce the protection provided by the case, and as the size of mobile devices shrinks, the space available to access a switch or toggle is more and more restricted, and any interference can negatively impact the accessibility of a switch or toggle. Additionally, very small switches sometimes require fingernail operation, and repetitive fingernail access on a membrane can damage or pierce the membrane, reducing the functionality and eliminating and waterproof or protective benefit. Further, pass-through holes and membranes frequently interrupt the aesthetics of the external case.

SUMMARY

According to embodiments disclosed herein, a mobile device peripheral that incorporates a convenient switch cover for a mobile device switch that can protect a switch on the mobile device, and the switch cover can adjust position to fit over the mobile device switch regardless of the mobile device switch's position. The switch cover is capable of moving in the same direction as the mobile device switch and externally indicating the position of the covered mobile device switch.

According to embodiments disclosed herein, a switch cover corresponds to an underlying switch on a mobile device. A switch can be built into a mobile device. A switch cover can be built into a cover for the mobile device. The switch cover can have a switch base with an internal switch guide on an internal surface of the cover and an external feature on the external surface of the cover. The internal switch guide can be shaped to fit over (for example, engage and/or mate with) the mobile device's switch when the mobile device is inserted into a case (or shell) that can house the mobile device. The case can include an additional back-up battery that can transfer electrical charge to the mobile device. The switch cover can be freely movable with minimal resistance, such that when the switch cover is in a relative "up" position while the mobile device's switch is in a relative "down" position, the switch cover will move to slip over the mobile device switch, without adjusting the mobile device switch position. State differently, the up position cover moves into a down position to correspond to the down position of the switch, and the switch does not move from the down position to the up position, when the mobile device is inserted into the case. Such an adjusting movement of the cover can be achieved through the shape of the internal switch guide. The internal switch guide can have two guide rails that sandwich the switch when the mobile device is in the case. One end of the internal switch guide can be open so that the mobile device switch can slide in. In some embodiments, the other end of the internal switch guide can be closed to help position the cover at a desired position relative the switch and/or the mobile device.

The internal switch guide can be substantially u-shaped, and the guiderails of the U can be either parallel or divergent to facilitate switch capture and/or movement of the cover to correspond to the position of the switch. In some embodiments, at the open end of the switch guide, the ends of the guide rails from which the switch would enter the internal switch guide can be angled away from the a centerline between the two guide rails such that when the internal switch guide is slid over the switch, the angled ends contact the switch to move the cover to match a position of the switch as the angled ends slide against the switch without moving the switch, for example, causing the cover to linearly translate at a rate corresponding to the angle of the angled ends.

The switch base can be disposed in a cavity of a shell or case. Edges, walls, and/or flanges (for example, guiding end portions) of the switch base can be sandwiched between an internal wall and an external wall of the shell. The sandwiching of the edges of the switch base with minimal friction can allow the cover to move relatively freely within a desired range and/or plane without the switch base slipping out of the cavity. The linear motion within a plane can be further guided with a guide feature disposed on the switch base, such as an elevated feature that slides within a guide path on an internal wall and/or external wall of the case.

In some embodiments, a shell including a switch cover for use with a switch of a portable electronic device can include one or more of the following: a switch cover configured to move relative to the shell; and/or an opening in the shell engaging the switch cover while allowing the switch cover to move relative to the shell. The switch can include one or more of the following: a base having an inner surface and an outer surface, the inner surface configured to face a switch of a portable electronic device when the portable electronic device is in the shell, the outer surface configured to face away from the switch; and/or a guide on the inner surface of the base, the guide configured to engage the switch of the portable electronic device when the portable electronic device is in the shell. The switch cover is configured such that the guide moves the switch of the portable electronic device when the portable electronic device is in the shell and the switch cover is moved relative to the shell. Stated differently, when the portable electronic device is in the shell and the switch cover is moved relative to the shell, the guide moves the switch of the portable electronic device.

In some embodiments, the shell can include one or more of the following: the shell comprises a cavity about the opening in shell, the cavity engaging the switch cover to allow movement of the switch cover along a desired direction; the shell comprises an outer wall and an inner wall, the outer wall comprising an outer wall recess formed in the outer wall, the inner wall comprising an inner wall recess formed in the inner wall, and wherein the outer wall recess and the inner wall recess form the cavity about the opening in the shell; the cavity engages the base of the switch cover, the cavity shaped to correspond to a shape of the base to allow movement of the base along a desired direction, while inhibiting at least one of movement of the switch cover along other directions or rotational movement of the switch cover; the base comprises a guiding end portion, the cavity engaging the guiding end portion to guide the base along the desired direction; the base comprises two or more guiding end portions, the cavity engaging at least one of the guiding end portions to guide the base along the desired direction and to inhibit movement of the base beyond a perimeter of the cavity; the base comprises a protruding portion configured to engage the shell to guide movement of the switch cover along the desired direction; the protruding portion is on the inner surface of the base, the protruding portion engaging the inner wall of the shell to guide movement of the switch cover along the desired direction; the inner wall comprises a guiding track, and the protruding portion protrudes into the guiding track to guide movement of the switch cover in the desired direction along the guiding tracks; the shell further comprises spacers positioned between the outer wall and the inner walls to maintain a predetermined width of the cavity between the outer wall recess and the inner wall recess; the guide comprises a first guiderail on the inner surface of the base and a second guiderail on the inner surface of the base, the first guiderail corresponding to a first side of the switch of the portable electronic device, the second guiderail corresponding to a second side of the switch of the portable device, the first side of the switch opposite the second side of switch, wherein when the switch cover is moved in a first direction, the first guiderail pushes the first side of the switch to move the switch toward a first switch position, and wherein when the switch cover is moved in a second direction, the second guiderail pushes the second side of the switch to move the switch toward a second switch position; the first and second guiderails form a pathway between the first and second guiderails configured such that the switch slides between the first and second guiderails when the portable electronic device is being inserted into the shell; the first and second guiderails comprise divergent ends, wherein at least one of the divergent ends contact the switch when the portable electronic device is being inserted into the shell, and wherein the divergent ends facilitate positioning the switch cover to correspond to a position of the switch as the portable electronic device is inserted into the shell; the base comprises a back support on the inner surface of the base, wherein the guide and the back support have surfaces facing the portable electronic device when the portable electronic device is in the shell, and wherein the surfaces are on a same plane to position the switch cover at a predetermined distance from the portable electronic device; the predetermined distance from the portable electronic device is constant between positions of the switch cover; the switch cover comprises a handle on the outer surface to allow a user to move the switch cover relative to the shell; the switch cover comprises a switch cover visual indicator that, when the portable electronic device is in the shell, corresponds to a switch visual indicator that indicates an operational mode of the portable electronic device; the switch cover visual indicator is not visible to a user in a first position of the switch cover, and wherein the visual indicator is visible to the user in a second position of the switch cover; the shell houses the portable electronic device and the guide engages the switch of the portable electronic device; movement for the switch is a linear translation; and/or movement for the switch cover is a linear translation.

In some embodiments, a protective case for use with a mobile electronic device having a switch that is configured to move between a first switch position and a second switch position can include one or more of the following: a housing configured to at least partially enclose the mobile electronic device; and/or a switch cover movable between a first position and a second position. The switch cover is configured to move the switch to the first switch position when the switch cover is moved to the first position. The switch cover is configured to move the switch to the second switch position when the switch cover is moved to the second position.

In some embodiments, the protective case can include one or more of the following: the shell comprises a cavity about the opening in shell, the cavity engaging the switch cover to allow movement of the switch cover between the first and second positions; the housing comprises an outer wall and an inner wall, the outer wall comprising an outer wall recess formed in the outer wall, the inner wall comprising an inner wall recess formed in the inner wall, and wherein the outer wall recess and the inner wall recess form the cavity in the housing; the cavity engages a base of the switch cover, the cavity shaped to correspond to a shape of the base to allow movement of the base between the first and second positions corresponding to the first and second switch positions, while inhibiting at least one of movement of the switch cover along other directions or rotational movement of the switch cover; the base comprises a guiding end portion, the cavity engaging the guiding end portion to guide the base between the first and second positions; the base comprises two or more guiding end portions, the cavity engaging at least one of the guiding end portions in the first position or the second position; the base comprises a protruding portion configured to engage the housing to guide movement of the switch cover between the first and second positions; the protruding portion engages the inner wall of the housing to guide movement of the switch cover between the first and second positions; the inner wall comprises a guiding track, and the protruding portion extends into the guiding track to guide movement of the switch cover between the first and second positions along the guiding tracks; the housing further comprises spacers positioned between the outer wall and the inner walls to maintain a predetermined width of the cavity between the outer wall recess and the inner wall recess; the switch cover comprises a first guide on an inner surface of the switch cover and a second guide on the inner surface of the switch cover, the inner surface configured to face the mobile electronic device, the first guide corresponding to a first side of the switch of the mobile electronic device, the second guide corresponding to a second side of the switch of the portable device, the first side of the switch opposite the second side of switch, wherein when the switch cover is moved in a first direction, the first guide pushes the first side of the switch to move the switch toward a first switch position, and wherein when the switch cover is moved in a second direction, the second guide pushes the second side of the switch to move the switch toward a second switch position; the first and second guides form a pathway between the first and second guides configured such that the switch to slide between the first and second guides when the mobile electronic device is being inserted into the housing; the first and second guides comprise divergent ends, wherein at least one of the divergent ends contact the switch when the mobile electronic device is being inserted into the housing, and wherein the divergent ends facilitate positioning the switch cover to correspond to a position of the switch as the mobile electronic device is inserted into the housing; the switch cover comprises a back support facing the mobile electronic device when the mobile device is in the housing, wherein the back support comprises a flat surface to position the switch cover at a predetermined distance from the mobile electronic device; the predetermined distance from the mobile electronic device is constant between the first and second position; the switch cover comprises a handle on the outer surface to allow a user to move the switch cover between the first and second positions; the switch cover comprises a switch cover visual indicator that, when the mobile electronic device is in the housing, corresponds to a switch visual indicator that indicates an operational mode of the mobile electronic device; the switch cover visual indicator is not visible to a user in the first position of the switch cover, and wherein the visual indicator is visible to the user in the second position of the switch cover; the housing at least partially encloses the mobile electronic device and the switch cover operably connects to the switch of the mobile electronic device; movement for the switch between the first switch position and the second switch position is a linear translation; and/or movement for the switch cover between the first position and the second position is a linear translation.

In some embodiments, a cover for a switch can including one or more of the following: a switch base having a first surface facing toward the switch and a second surface facing away from the switch; an internal switch capture guide, on the first surface, with a first guide rail that corresponds to a first side of the switch and a second guide rail corresponding to a second side of the switch when the switch is disposed in the cover; and/or an external feature on the second surface approximately corresponding to the position of the switch.

In some embodiments, the cover can include one or more of the following: an imaginary line from the first guide rail to the second guide rail would align with a direction that the switch moves; the internal switch capture guide has at least one open side; the internal switch capture guide approximates a U-shape; the two guide rails are slightly divergent such that when the internal switch capture guide is slid over a switch, the cover will move to match a position of the switch; the two guide rails are substantially parallel, but the ends are angled in a way that when the internal switch capture guide is slid over a switch, the cover will move to match a position of the switch; the switch base is disposed in a cavity in a shell; a portion of the switch base is sandwiched between an internal wall and an external wall of the shell; the portion of the switch base is the entire outline of the switch base; the switch base can move relative to the shell in the direction that the switch moves; the switch base incorporates a directional guide feature; the directional guide feature is a raised portion on the switch base that corresponds to a path in the shell; the path in the shell is parallel to the direction that the switch moves; the external feature mirrors a shape of the switch; the switch base is substantially planar; and/or the internal switch capture guide adjusts to fit over the switch regardless of switch orientation.

In some embodiments, the cover can include one or more of the following: an imaginary line from the first guide rail to the second guide rail aligns with a direction that the switch is configured to move; the internal switch capture guide has at least one open side for accepting the switch; the internal switch capture guide approximates a U-shape; the first and second guide rails are slightly divergent such that when the internal switch capture guide is slid over the switch, the cover will move to match a position of the switch; the first and second guide rails are substantially parallel, but ends of the first and second guide rails are angled in a way that when the internal switch capture guide is slid over the switch, the cover will move to match a position of the switch; the switch base is disposed in a cavity in a shell; a portion of the switch base is sandwiched between an internal wall and an external wall of the shell; the portion of the switch base is an entire outline of the switch base; the switch base can move relative to the shell in a direction that the switch is configured to move; the switch base incorporates a directional guide feature; the directional guide feature is a raised portion on the switch base that corresponds to a path in the shell; the path in the shell is parallel to the direction that the switch is configured to move; the external feature mirrors a shape of the switch; the switch base is substantially planar; and/or the internal switch capture guide adjusts to fit over the switch regardless of switch orientation.

In some embodiments, a case for a mobile device can incorporate the cover, and the switch can be attached to the mobile device. The internal switch capture guide can adjust to fit over the switch regardless of switch orientation when the mobile device is inserted into the case. The case can include a battery. In some embodiments, the battery of the case can charge the mobile device.

The foregoing is a summary and contains simplifications, generalization, and omissions of detail. Those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of any subject matter described herein.

BRIEF DESCRIPTION OF THE DRAWINGS

The foregoing and other features of the present disclosure will become more fully apparent from the following description, taken in conjunction with the accompanying drawings. Understanding that these drawings depict only some embodiments in accordance with the disclosure and are, therefore, not to be considered limiting of its scope, the disclosure will be described with additional specificity and detail through use of the accompanying drawings.

FIG. 1A is a side, top, perspective view of an example embodiment of a shell or case having a switch cover in a first position.

FIG. 1B is a detailed view of a portion of the shell of FIG. 1A.

FIG. 2A is a side, top, perspective view of an example embodiment of a shell or case having a switch cover in a second position.

FIG. 2B is a detailed view of a portion of the shell of FIG. 2A.

FIGS. 20A-B and 21A-B illustrate an example embodiment of a switch cover incorporated into a shell.

FIGS. 22A-B show an example embodiment of a partial cutout view of a shell with a mobile device being inserted into the shell.

FIGS. 23A-B show an example embodiment of a partial cutout view of a shell with a mobile device being inserted into the shell.

DESCRIPTION

Figure 3A:
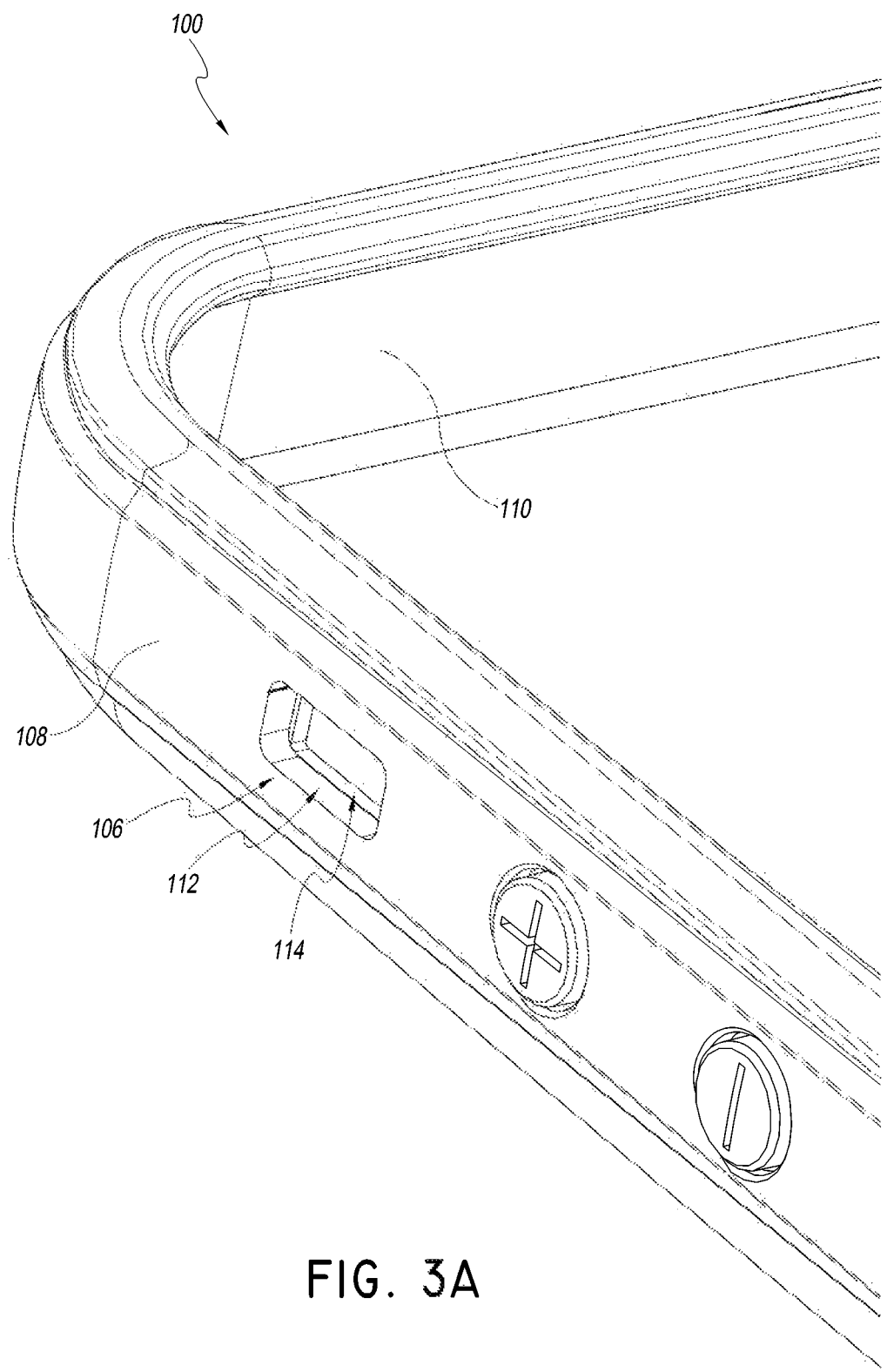
FIG. 3A is a side, top, perspective view of an example embodiment of a shell or case having an opening.

In the following description, reference is made to the accompanying drawings, which form a part hereof. In the drawings, similar symbols typically identify similar components, unless context dictates otherwise. The illustrative embodiments described in the description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made a part of this disclosure.

Further, the following description contains simplifications, generalization, and omissions of detail. Those skilled in the art will appreciate that the description is illustrative only and is not intended to be in any way limiting. This description is not intended to identify key features or essential features of any subject matter described herein.

Various embodiments disclosed in this application generally relate to covers for mechanical switches, particularly to covers for mechanical switches on mobile devices (for example, smart phones). The covers can be incorporated into cases or shells protecting the mobile device. The covers can allow for convenient access to a mobile device switch or toggle (for example, without reducing protection, interrupting aesthetic, and/or reducing performance/accessibility).

FIG. 1A is a side, top, perspective view of an example embodiment of a shell 100 (for example, a case or a battery case). The shell or case 100 can be used to protect a portable electronic device 119 (e.g., see FIG. 6). The portable electronic device can include a mobile device, mobile phone, or tablet. The portable electronic device 119 can have a switch or toggle 121 built into the mobile device 119 (e.g., see FIGS. 6, 22A-B, and 23A-B). A switch cover 102 can be integrated into the shell or case 100. The switch cover 102 can be positioned to engage and/or mate with the switch 121 of the mobile device 119 as discussed herein. The shell 100 can have other features to engage and/or mate with other controls of the mobile device 119. For example, as illustrated in FIG. 1A-B, the shell 100 can have volume buttons and/or rockers 103. The volume buttons 103 can engage and/or mate with volume controls of the mobile device 119.

FIG. 1B is a partial view of an embodiment of a shell 100 illustrating an enlarged view of the switch cover 102. FIG. 1B illustrates the switch cover 102 in a first position. The switch cover 102 can move in a linear fashion or have a linear translational movement as discussed herein. For example, the switch cover 102 can move up and down. In some embodiments, the switch cover 102 can move side to side. The first position as illustrated in FIG. 1B can be considered an up position. References to up and down can refer to an orientation in which the screen (for example, touchscreen) of the mobile device 119 would face upward, even though the case 100 and mobile device 119 could be positioned in various other orientations during use. The up position, or first position, can correspond to the switch cover 102 positioning the switch 121 of the mobile device 119 into a normal (e.g., not silent or auditory) mode of the mobile device 119.

The switch cover 102 can have a handle 104, for example, an extension or protrusion as discussed herein. The handle 104 can be an elongated shape (for example, a bar shape) to provide a lever or gripping portion to facilitate linearly translating the switch cover 102 by the user, although various other shapes can be used. In some embodiments, the handle 104 can protrude beyond a periphery of the shell 100 to facilitate gripping of the switch cover 102 by the user in order to move (e.g., to linearly translate) the switch cover 102 as discussed herein. In some embodiments, the switch cover 102 can be flush with the periphery of the shell 100 or recessed below the periphery of the shell 100, while still allowing the user to engage the cover 102 to move (e.g., linearly translate) the cover 102.

FIG. 2A is a side, top, perspective view of an example embodiment of a shell 100. FIG. 2B is a partial view of an embodiment of the shell 100 illustrating an enlarged view of the switch cover 102. FIG. 2B illustrates the switch cover 102 in a second position. The second position as illustrated in FIG. 2B can be considered a down position. The down position or second position can correspond to the switch cover 102 positioning the switch 121 of the mobile device 119 into a quiet (e.g., vibrate or silent) mode of the mobile device 119. Other configurations are possible. For example, the up position or first position of the switch cover can be configured to position the switch 121 into the quiet (e.g. vibrate or silent) mode, and the down position or second position can be configured to position the switch 121 into the normal (e.g., not silent or auditory) mode.

FIG. 3A is a side, top, perspective view of an example embodiment of an opening 106 in the shell or case 100. The opening (for example, cutout or lumen) 106 can be shaped to house accept, engage, and/or mate with the switch cover 102 as discussed herein. The opening 106 can be generally rectangular or square. In some embodiments, the opening 106 can be other suitable shapes to correspond to the shape or shapes of the switch cover 102. For example, the opening 106 may be generally round, cylindrical, and/or a combination of shapes, such as rectangular and having rounded or circular sides or corners. The opening 106 can have open ends on both sides to accept the switch cover 102. The switch cover 102 can be inserted into the opening 106 and secured while allowing movement of the cover 102 as discussed herein. The opening 106 can be positioned in the shell 100 such that when the opening 106 houses the switch cover 102 and the mobile device 119 is inserted into the shell 100, the switch cover 102 can engage or toggle the switch 121 of the mobile device 119 as discussed herein.

In some embodiments, the shell 100 may be made or formed from two or more walls. As illustrated in FIG. 3A, the shell may comprise an outer wall 108 and inner wall 110. The outer wall 108 may envelope and/or cover wholly or partially the inner wall 110. The outer wall 108 may provide protection for the shell 100, components of the shell 100 (for example, the cover 102), and/or the mobile device 119 inserted therein. The inner wall 110 may be shaped and sized to accept the mobile device 119 and secure the mobile device 119 in a predetermined position within the shell 100.

Figure 3B:
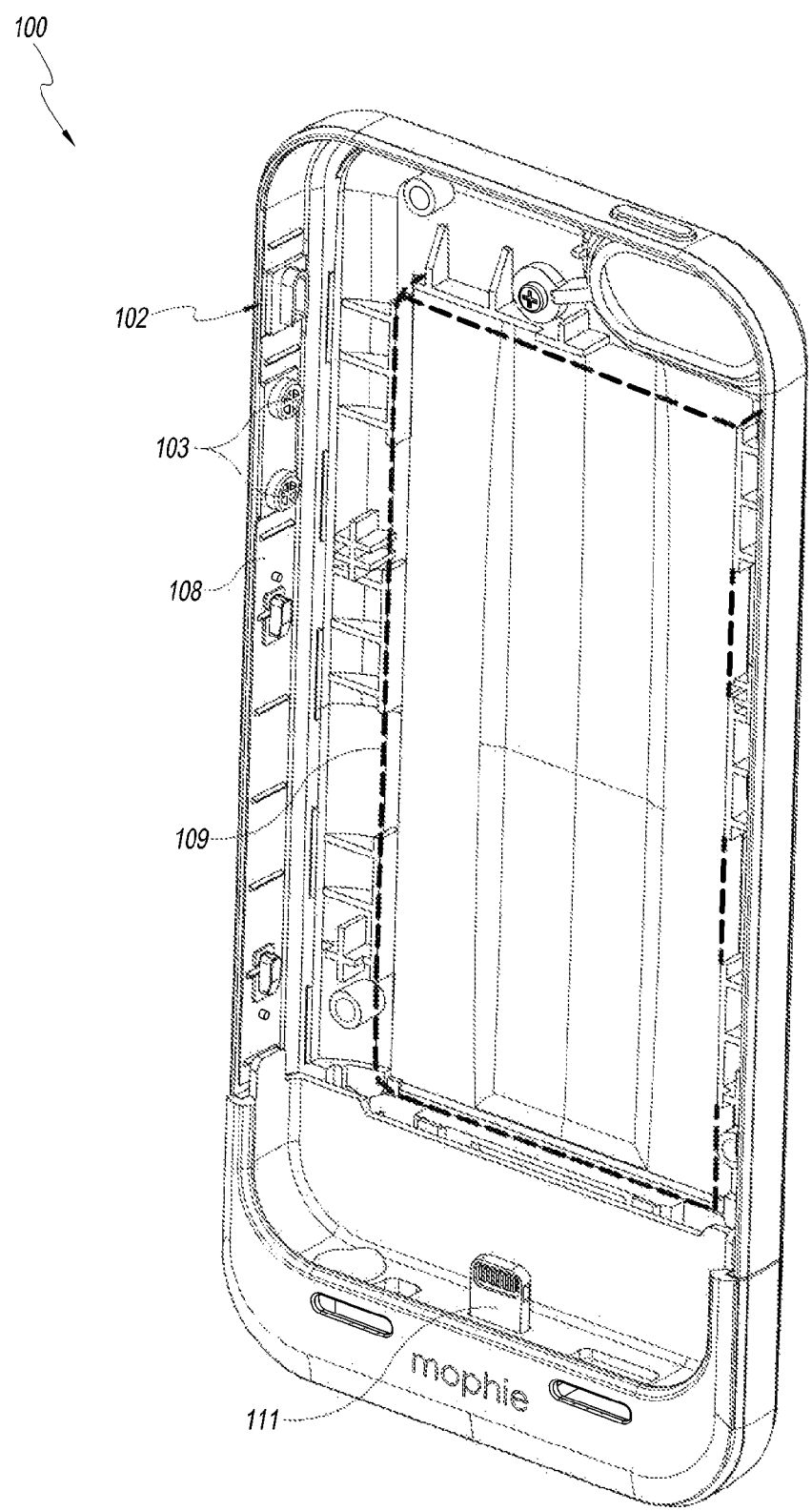
FIG. 3B is a side, top, perspective view of an example embodiment of a shell or case with a battery.

FIG. 3B is a side, top, perspective view of an example embodiment of shell or case 100 with a battery 109. The case 100 can include a battery 109 (e.g., housed between the inner wall 110 and the outer wall 108). The battery 109 is illustrated by dashed lines in FIG. 3B, showing an example location for the battery 109 in the case 100. The case 100 can include an electrical connector 111 that is electrically coupled to the battery 109 and configured to engage a port on the mobile device 119 such that the battery 109 of the case 100 can be electrically connected to the mobile device 121 to selectively charge the mobile device 121 when, for example, an internal battery of the mobile device 121 is depleted of charge or low on power.

Returning to FIG. 3A, the opening 106 can be formed from two corresponding openings in the outer wall 108 and the inner wall 110. The outer wall 108 can have an outer opening (for example, cutout or lumen) 112 to accept and/or engage the switch cover 102 as discussed herein. The outer opening 112 can be sized and shaped to allow a desired motion of the switch 102, and in particular the handle 104, as discussed herein. For example, the outer opening 112 can be sized and shaped to allow and/or permit the movement of the handle 104 by the user to move the cover 102 into a desired position (for example, a first or second position as discussed herein). The outer opening 112 can be generally rectangular or square. In some embodiments, the outer opening 112 can be other suitable shapes to correspond to the shape of the switch cover 102. For example, the outer opening 112 may be generally round, cylindrical, and/or a combination of shapes, such as rectangular and having rounded or circular sides or corners. In some embodiments, the outer opening 112 can be sized and shaped to accept the handle 104 of the cover 102 to protrude through the outer opening 112 and allow movement of the handle 104 to position the cover 102 as discussed herein.

The inner wall 110 can have an inner opening (for example, cutout or lumen) 114 to accept and/or engage the switch cover 102 as discussed herein. The inner opening 114 can be sized and shaped to allow a desired motion of the switch 102, and in particular the internal switch guide 130 (see FIGS. 12-19) as discussed herein. For example, the inner opening 114 can be sized and shaped to allow and/or permit the movement of the internal switch guide 130 to move the switch 121 of the mobile device 119 into a desired position (for example, a first or second position as discussed herein).

Figure 4:
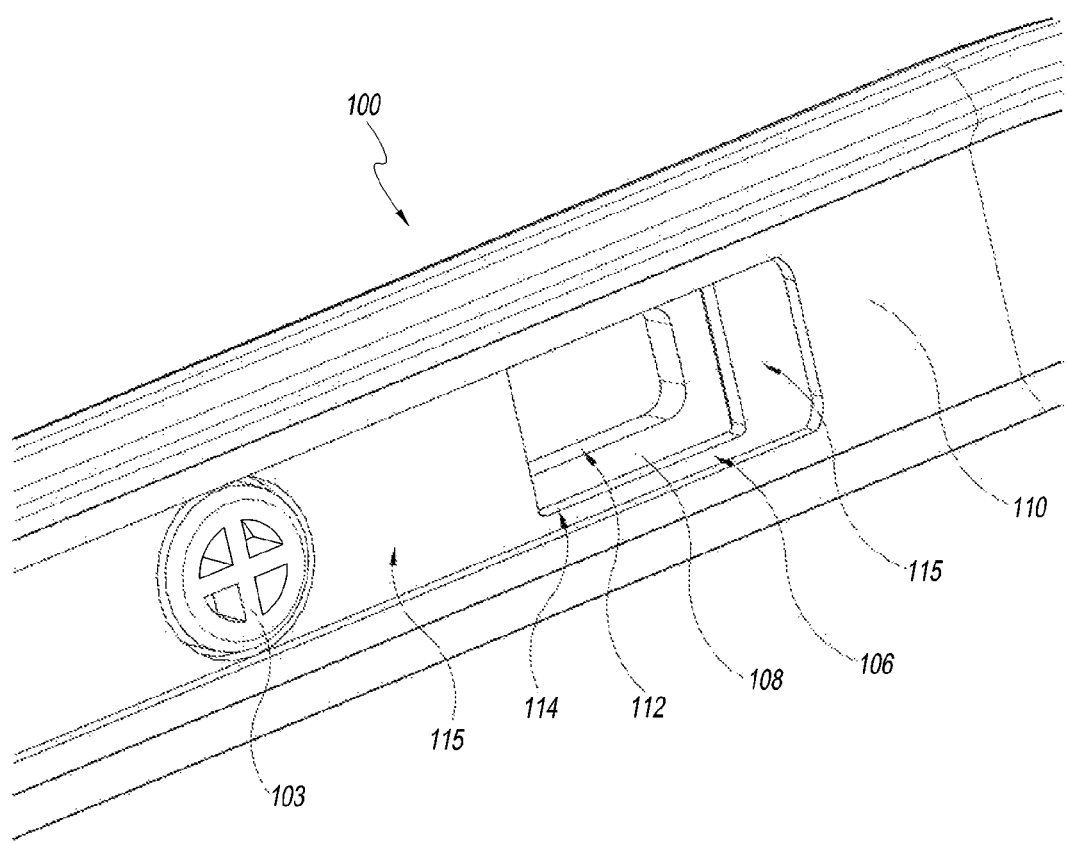
FIG. 4 is an inner, side, top, perspective view of an example embodiment a shell.

FIG. 4 is an inner, side, top, perspective view of an example embodiment a shell or case 100. As discussed in reference to FIG. 3A, the shell 100 can have an outer wall 108 and an inner wall 110 with an outer opening 112 and an inner opening 114, respectively. As illustrated in FIG. 4, the inner opening 114 can be formed in or housed in a channel 115 formed in the inner wall 110. The channel 115 can be a relatively thinned wall region of the inner wall 110. The cannel 115 can be formed in the inner wall 110 along a side of the shell 100. The channel 115 can span a majority of the side of the shell 100. The span of the channel 115 can correspond to aligning the switch 121 and other controls of the mobile device 119 such that the cover 102 can engage the switch 121 as discussed herein and the volume rockers 103 can engage the volume controls of the mobile device 119.

The channel 115 can provide space or clearance between the inner wall 110 and the mobile device 119. The clearance provided by the channel 115 can allow for functionality, engagement, and/or mating of the switch cover 102 and other control element(s) (for example, volume controls 103) with the switch 121 and other control element(s) of the mobile device 119 as discussed herein. For example, the channel 115 can allow and/or facilitate the mobile device 119 to be inserted into the shell 100 when the switch 121 protrudes beyond a periphery of the mobile device 119. Similarly, the channel 115 can allow and/or facilitate insertion of the mobile device 119 into the shell 100 when other mobile control element(s) (for example, volume controls) of the mobile device 119 protrude beyond the periphery of the mobile device 119.

Figure 5:
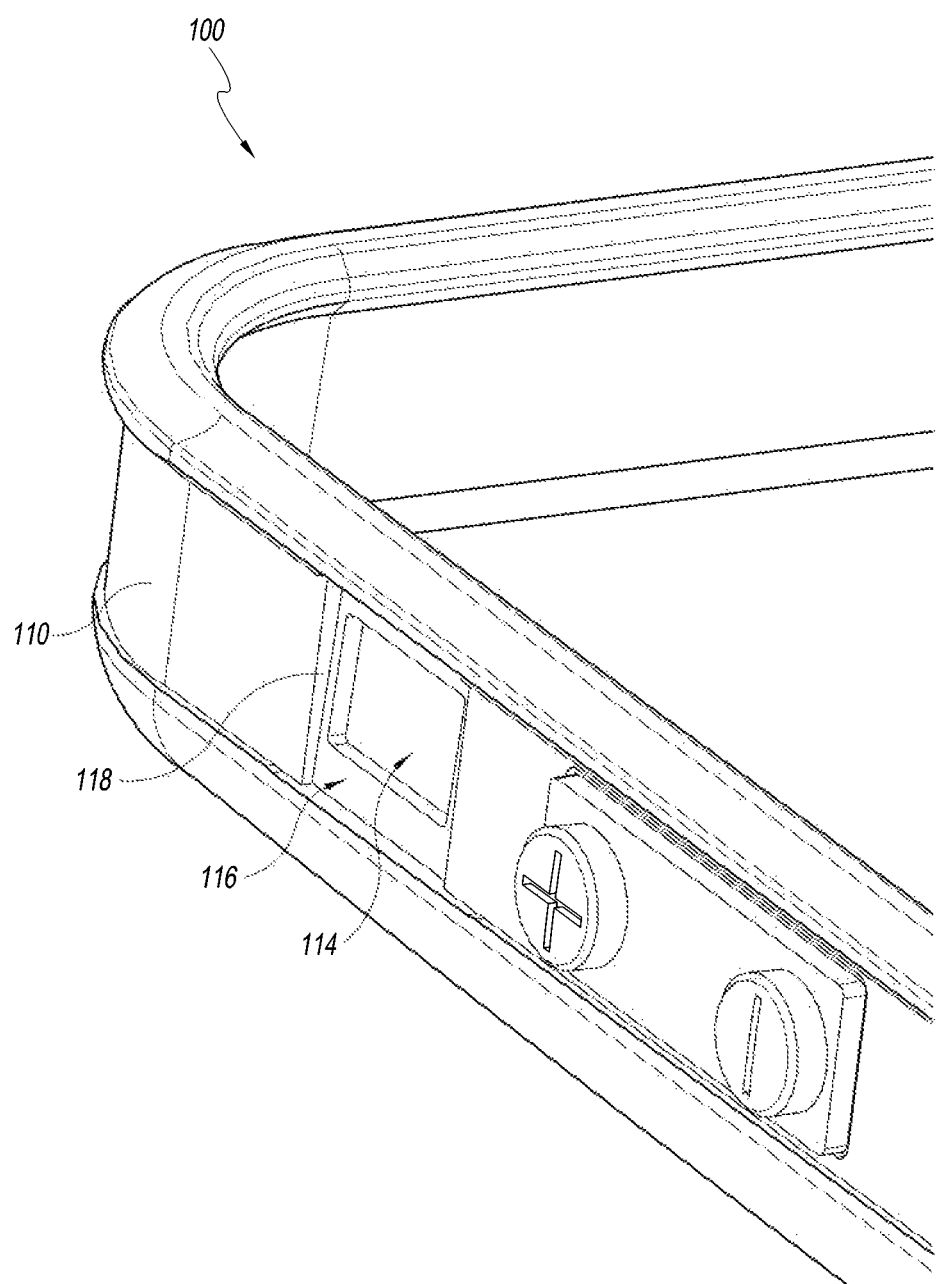
FIG. 5 is a side, top, perspective view of an example embodiment of a shell.

FIG. 5 is a side, top, perspective view of an example embodiment of a shell 100. An inner opening 114 can be formed in the inner wall 110 of the shell 100. The inner opening 114 can be generally rectangular or square. In some embodiments, the inner opening 114 can be other suitable shapes to correspond to the shape of the switch cover 102. For example, the inner opening 114 may be generally round, cylindrical, and/or a combination of shapes, such as rectangular and having rounded or circular sides or corners. As illustrated in FIGS. 3A and 4, the outer opening 112 and inner openings 114 can correspond in shape. Stated differently, the outer opening 112 and inner opening 114 can have similar shapes (for example, rectangular as illustrated). In some embodiments, the outer opening 112 and inner opening 114 may be different shapes to correspond to and accept/allow movement of the handle 104 and/or internal switch guide 130, respectively, as discussed herein.

The inner opening 114 can be formed in the inner wall 110 at a relatively thinned wall region 116 of the inner wall 110. The thinned wall region 116 can also be considered an inner wall recess 116 about or around the inner opening 114. The inner wall recess 116 can correspond with or be positioned at a region corresponding to the channel 115 of the inner wall 114 (e.g., see FIG. 4). In some embodiments, the corresponding positions (directly opposite sides of the inner wall 114) of the channel 115 and the inner wall recess 116 can form a relatively thin or thinnest portion of the inner wall 114 about the periphery of the shell 100. The thin region of the corresponding positions of the channel 115 and the inner wall recess 116 can reduce the size and bulk of the case 100, as well as the switch cover 102 spanning a reduced size of the case 100, while still allowing for the functionality and engagement of switch 121 as discussed herein.

The inner wall recess 116 can be shaped and sized to house accept, engage, and/or mate with a base 126 (see FIGS. 12-19) of the switch cover 102. The inner wall recess 116 can have recess edges or walls 118 that house the base 126 of the switch cover 102. For example, inner wall recess edges 118 can be positioned to permit movement of the cover 102 between the first and second positions (for example, up and down), while substantially restricting or inhibiting movement of the cover 102 in other directions relative to the movement between the first and second positions (for example, substantially restricting or inhibiting side to side or rotational movement of the switch cover 102).

The inner wall recess edge 118 can connect the inner wall recess 116 to the inner wall 110. The inner wall recess edges 118 can be substantially perpendicular to a plane(s) formed by the inner wall 110 and/or the inner wall recess 116. The angle of the inner wall recess edges 118 from the inner wall recess 116 to the inner wall 110 can correspond to an angle of walls or edges of the base 126 of the cover 102.

Figure 6:
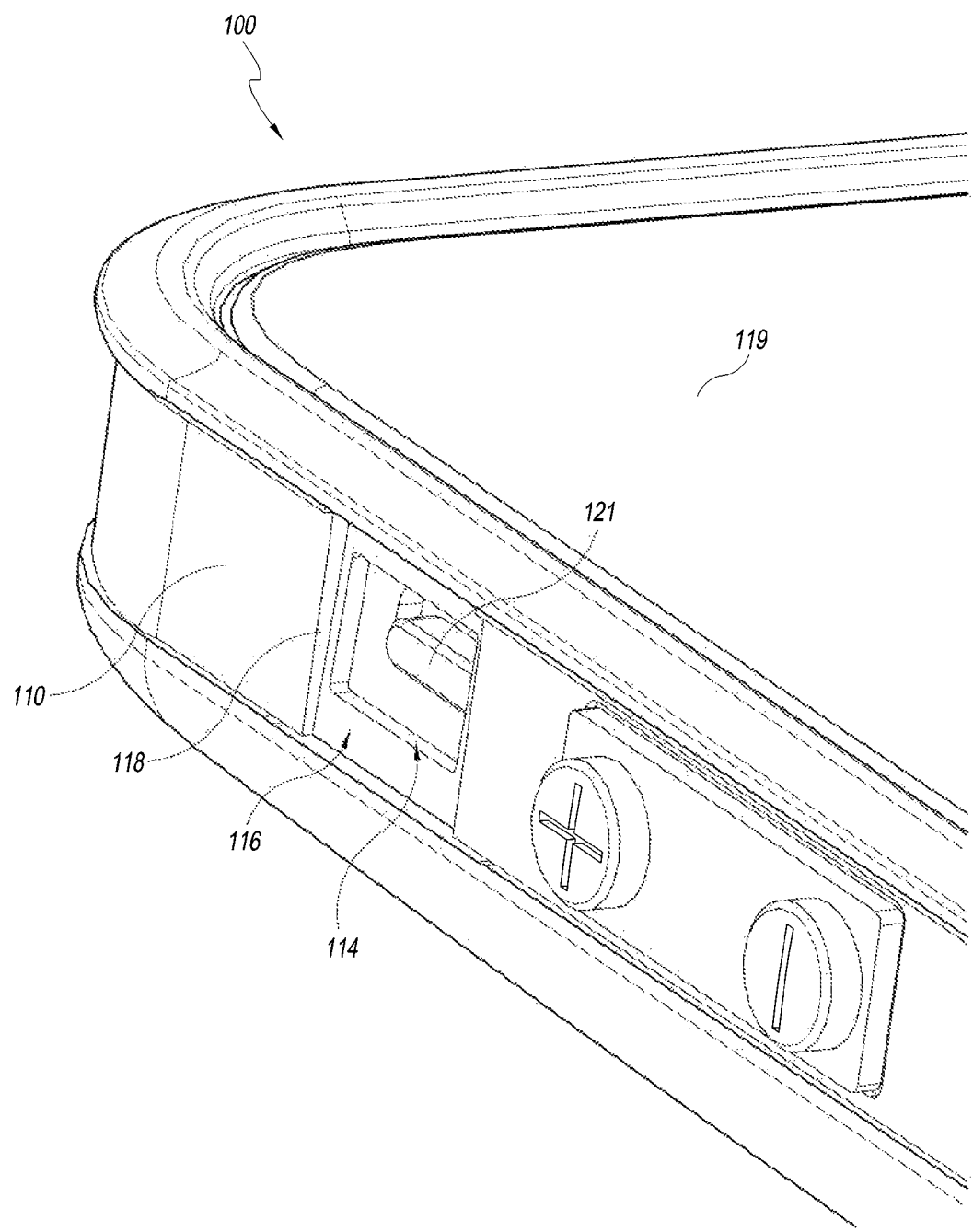
FIG. 6 is a side, top, perspective view of an example embodiment of an inner wall of a shell with a mobile device.

FIG. 6 is a side, top, perspective view of an embodiment of an inner wall 110 of the shell 100 with a mobile device 119 inserted or otherwise coupled thereto. The mobile device 119 can have a switch 121 for controlling mode of the mobile device 119. For example, FIG. 6 illustrates the switch 121 in a down or second position. The down position (for example, the second position) of the switch 121 can correspond to a vibrate (e.g., silent) mode of the mobile device 119, as discussed herein. The up position (for example, the first position) of the switch 121 can correspond to a normal (auditory or non silent) mode of the mobile device 119, as discussed herein. The inner opening 114 of the inner wall 110 can be sized and shaped to allow the switch 121 to be positioned within or be encircled (circumscribed) by a periphery of the inner opening 114. The inner opening 114 can be sized and shaped to allow the switch 121 to move (e.g., slide) between the first and second positions of the switch (e.g., within the periphery of the inner opening 114).

Figure 7:
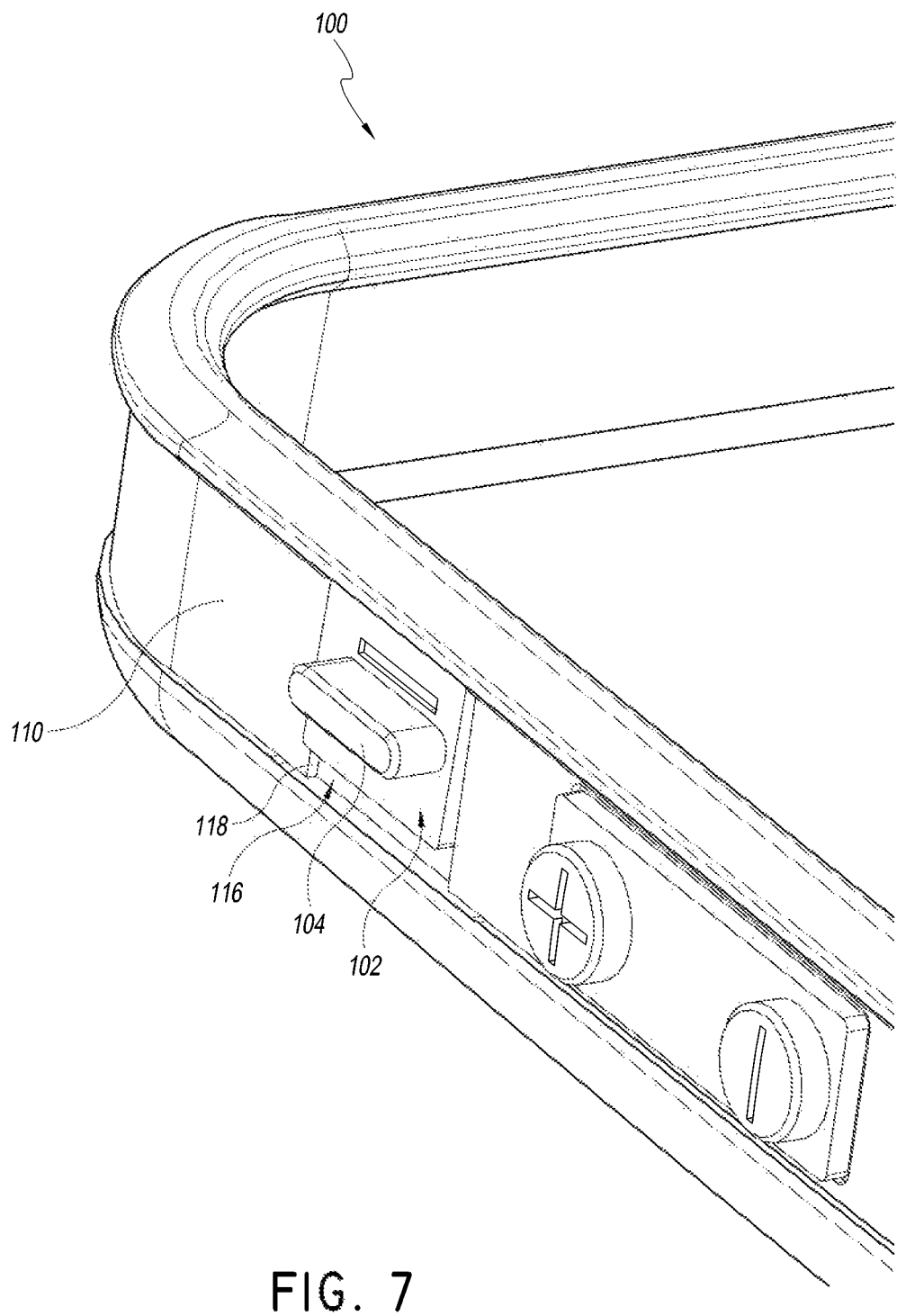
FIG. 7 is a side, top, perspective view of an example embodiment of an inner wall of a shell with a switch cover in a first position.
Figure 8:
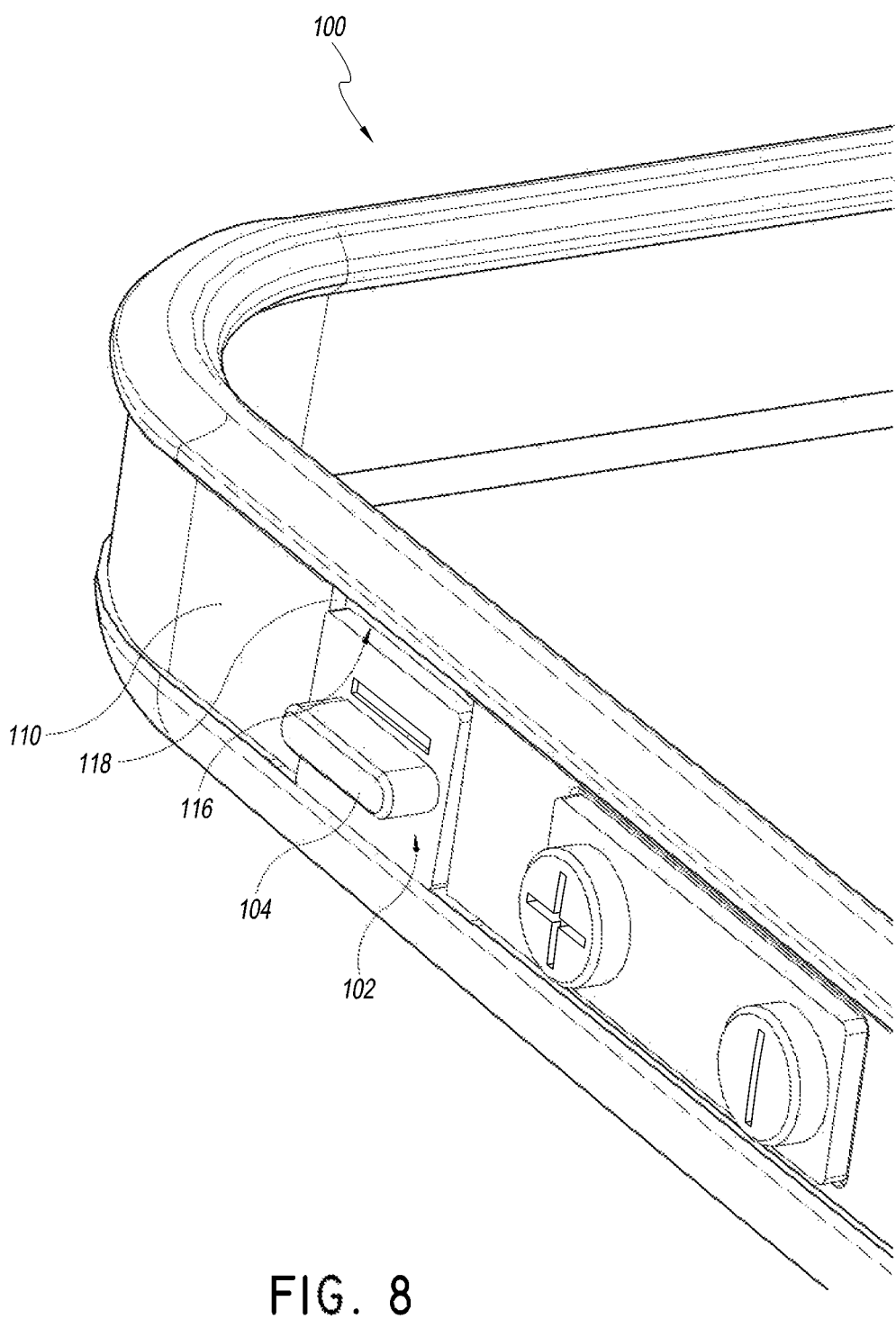
FIG. 8 illustrates an example embodiment of an inner wall of a shell with a switch cover in a second position.

FIG. 7 is a side, top, perspective view of an example embodiment of an inner wall 110 of the shell 100 with a switch cover 102. FIG. 7 illustrates the switch cover 102 in a first position, as discussed herein. FIG. 8 illustrates the switch cover 102 in a second position, as discussed herein. As illustrated in FIGS. 7 and 8, in some embodiments, the switch cover 102 can move in a linear fashion or have a linear translational movement in a plane of the inner wall recess 116. The switch cover 102 can move from the first position (for example, the up position corresponding to the cover 102 illustrated in FIG. 7) to the second position (for example, the down position corresponding to the cover 102 illustrated in FIG. 8) and vice versa. Stated differently, the cover 102 can move between the first position (for example, the up position corresponding to the cover 102 illustrated in FIG. 7) and the second position (for example, the down position corresponding to the cover 102 illustrated in FIG. 8) or any desired position therebetween.

As illustrated in FIGS. 7 and 8, the inner wall recess 116 can be sized and shaped to permit the cover 102 to move up and down while the inner wall recess edge 118 restricts or inhibits movement of the cover 102 side to side. For example, the inner wall recess edges 118 that are parallel (for example, side walls) to the desired linear direction of movement of the cover 102 can be spaced from each other to provide room for the cover 102 to move between the inner wall recess edges 118 that are perpendicular (for example, upper and lower walls) for the cover 102 to move between the first and second positions. The inner wall recess edges 118 that are parallel to the desired direction of movement of the cover 102 (for example, side walls) can be spaced from each other to provide clearance for the cover 102 to substantially freely or with minimal friction move between the upper and lower walls of the inner wall recess edges 118 corresponding to the first and second positions. But the side walls of the inner wall recess edges 118 can be spaced such that side movement of the cover 102 between the side walls of the inner wall recess edges 118 is restricted or inhibited. For example, movement perpendicular to the desired direction of movement between the first and second positions can be restricted or inhibited. Stated differently, the side recess edges 118 can be spaced apart by an amount or distance that is the same or slightly larger than a dimension of the switch cover 102 (for example, horizontal dimension) for the switch cover 102 to move without binding (for example, with minimal friction, while side to side (for example, horizontal) movement is impeded. The upper or lower (or top and bottom) recess edges 118 can be spaced apart by an amount or distance that is larger than the dimension of the switch cover 102 (for example, vertical dimension) to provide clearance for the switch cover to move in the vertical dimension (for example, up and down or between first and second positions, as discussed herein).

Figure 9:
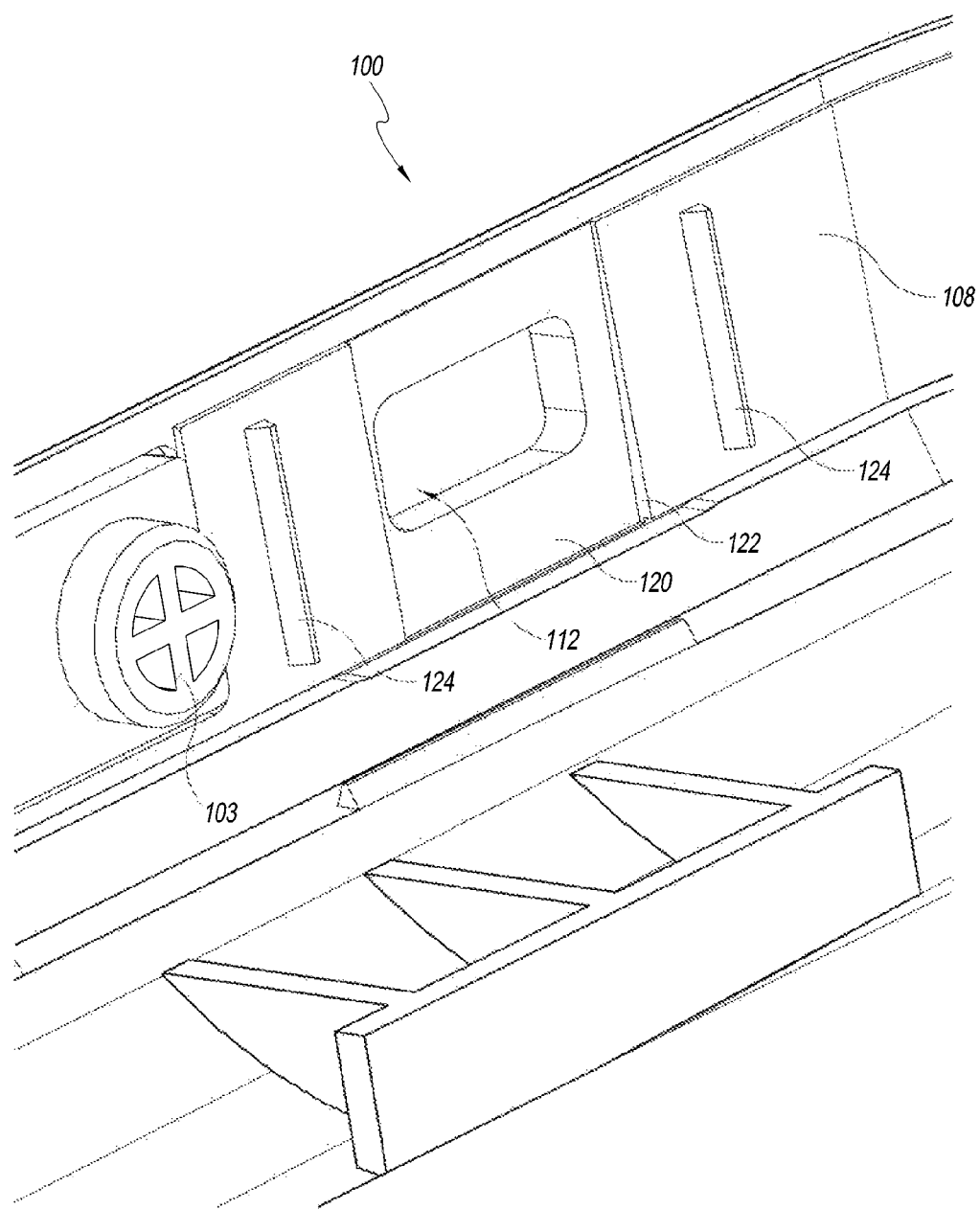
FIG. 9 is an inner side, top, perspective view of an example embodiment of an outer wall of a shell.

FIG. 9 is an inner side, top, perspective view of an example embodiment of an outer wall 108 of the shell 100. An outer opening 112 can be formed in the outer wall 108. The outer opening 112 can be formed in the outer wall 108 at a relatively thinned wall region 120 of the outer wall 108. The thinned wall region 120 can also be considered an outer wall recess 120 about or around the outer opening 112. The outer opening 112 can be generally rectangular or square. In some embodiments, the outer opening 112 can be other suitable shapes to correspond to the shape of the switch cover 102. For example, the outer opening 112 may be generally round, cylindrical, and/or a combination of shapes, such as rectangular and having rounded or circular sides or corners.

The outer wall recess 120 can be shaped and sized to house accept, engage, and/or mate with the base 126 of the switch cover 102. The outer wall recess 120 can have outer wall recess edges or edges 122 (e.g., that house the base 126 of the cover 102). For example, outer wall recess edges 122 can be positioned to permit movement of the cover 102 between the first and second positions (for example, up and down), while substantially restricting or inhibiting movement of the cover 102 in other directions relative to the movement between the first and second positions (for example, substantially restricting or inhibiting side to side or rotational movement of the switch cover 102). The outer wall recess edges 122 can connect the outer wall recess 120 to the outer wall 108. The outer wall recess edges 122 can be substantially perpendicular to a plane(s) formed by the outer wall 108 and/or the outer wall recess 120. The angle of the outer wall recess edges 122 from the outer wall recess 120 to the outer wall 108 can correspond to an angle of walls of the base 126 of the cover 102.

Figure 10:
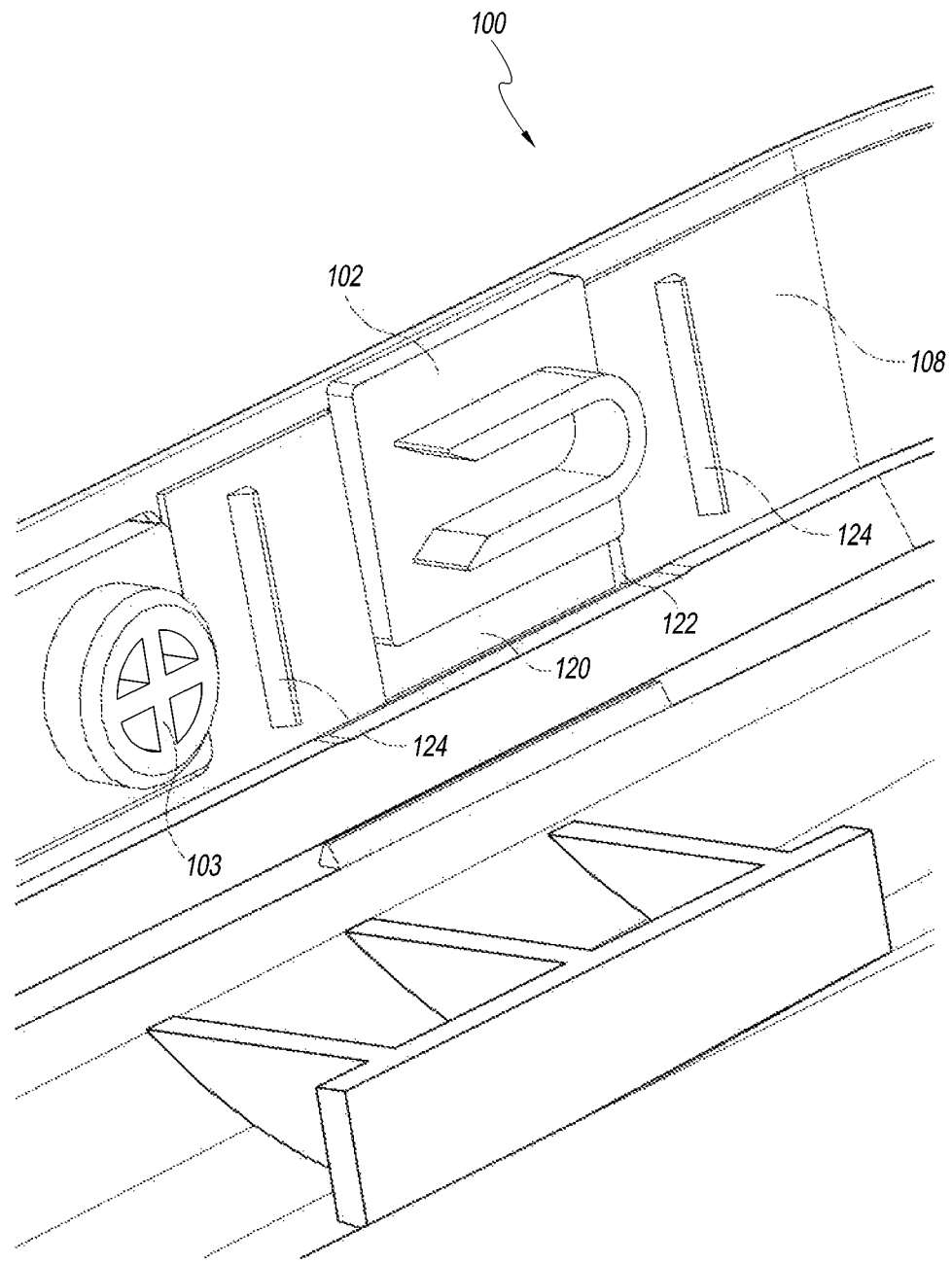
FIG. 10 is an inner side, top, perspective view of an example embodiment of an outer wall of a shell with a switch cover in a first position.
Figure 11:
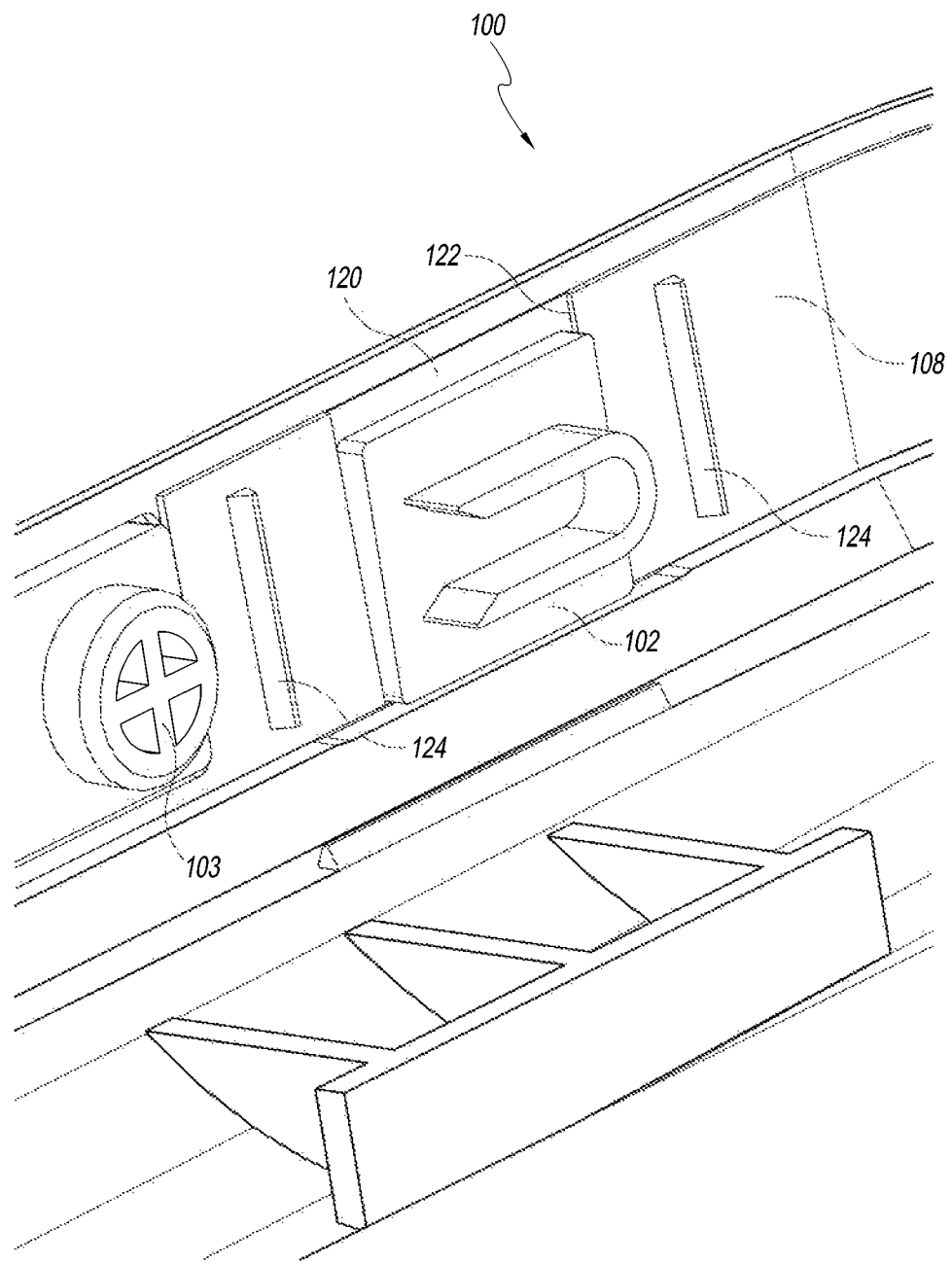
FIG. 11 illustrates an example embodiment of an outer wall of a shell with a switch cover in a second position.

FIG. 10 is an inner side, top, perspective view of an example embodiment of an outer wall 108 of the shell 100 with a switch cover 102. FIG. 10 illustrates the switch cover 102 in a first position, as discussed herein. FIG. 11 illustrates the switch cover 102 in a second position, as discussed herein. As illustrated in FIGS. 10 and 11, in some embodiments, the switch cover 102 can move in a linear fashion or have a linear translational movement in a plane of the outer wall recess 120. The cover 102 can move from the first position (for example, the up position corresponding to the cover 102 illustrated in FIG. 10) to the second position (for example, the down position corresponding to the cover 102 illustrated in FIG. 11) and vice versa. Stated differently, the cover 102 can move between the first position (for example, the up position corresponding to the cover 102 illustrated in FIG. 10) and the second position (for example, the down position corresponding to the cover 102 illustrated in FIG. 11) or any desired position therebetween.

As illustrated in FIGS. 10 and 11, the outer wall recess 120 can be sized and shaped to permit the cover 102 to move up and down while the outer wall recess edge 122 restricts or inhibits movement of the cover 102 side to side. For example, the outer wall recess edges 122 that are parallel (for example, side walls) to the desired linear direction of movement of the cover 102 can be spaced from each other to provide room for the cover 102 to move between the outer wall recess edges 122 that are perpendicular (for example, upper and lower walls) for the cover 102 to move between the first and second positions. The outer wall recess edges 122 that are parallel to the desired direction of movement of the cover 102 (for example, side walls) can be spaced from each other to provide clearance for the cover 102 to substantially freely or with minimal friction move between the upper and lower walls of the outer wall recess edges 122 corresponding to the first and second positions. But the side walls of the outer wall recess edges 122 can be spaced such that side movement of the cover 102 between the side walls of the outer wall recess edges 122 is restricted or inhibited. For example, movement perpendicular to the desired direction of movement between the first and second positions is inhibited or inhibited. Stated differently, the side recess edges 122 can be spaced apart by an amount or distance that is the same or slightly larger than a dimension of the switch cover 102 (for example, horizontal dimension) for the switch cover 102 to move without binding (for example, with minimal friction, while side to side (for example, horizontal) movement is impeded. The upper or lower (or top and bottom) recess edges 122 can be spaced apart by an amount or distance that is larger than the dimension of the switch cover 102 (for example, vertical dimension) to provide clearance for the switch cover to move in the vertical dimension (for example, up and down or between first and second positions, as discussed herein).

A method of assembly of the shell 100 can include placing the switch cover 102 into the inner wall recess 116 of the inner wall 110 or into the outer wall recess 120 of the outer wall 108. The outer wall 108 can be placed over the inner wall 110 such that the inner wall recess 116 of the inner wall 110 corresponds with the outer wall recess 120 of the outer wall 108 to form a cavity 144 (see FIG. 24) within which the switch cover 102 can be housed and allowed to move as discussed herein. The inner wall recess edges 118 can align with the outer wall recess edges 122 to form a periphery or perimeter of the cavity 144 that inhibits certain movement and allows for a desired movement of the switch cover 102 as discussed herein. For example, the aligned recess edges 118, 122 that are parallel to the desired direction of movement of the cover 102 can be spaced to provide clearance for the cover 102 to substantially freely or with minimal friction move between the upper and lower (e.g., perpendicular to the movement of the cover 102) walls of the inner wall recess edges 118, 122 corresponding to the first and second positions, while inhibiting or restricting movement of the switch cover 102 in other directions. In some embodiments, one of the recess 116 or the recess 120 can have a depth sufficient to form the cavity 144, and the other of the recess 116 or 120 can be omitted.

As illustrated in FIGS. 9-11, the outer wall 108 can have spacers or rails 124 to provide a desired spacing or clearance between the outer wall 108 and the inner wall 110. The spacers 124 can help maintain a desired or predetermined size and shape of the cavity 144, including a predetermined width or distance of the cavity 144 between the inner and outer walls 108, 110 to permit movement of the base 126 within the cavity 144. A particular size and shape of the cavity can allow for the cover 102 to move as discussed herein with minimal friction even when pressure may be applied to the shell 100 that would otherwise contort the size and shape of the cavity 144. In some embodiments, the inner wall 110 can have spacers 124 disposed thereon additionally or in lieu of the spacers 124 on the outer wall 108 as discussed herein. In some embodiments, the spacers 124 can rest in, engage, interlock with, and/or mate with corresponding grooves or cutouts in an opposing wall of the shell 100 (e.g., outer wall 108 or inner wall 110) that the spacers 124 protrude or extend toward from the wall of the shell 100 that the spacers 124 are disposed on.

Figure 12:
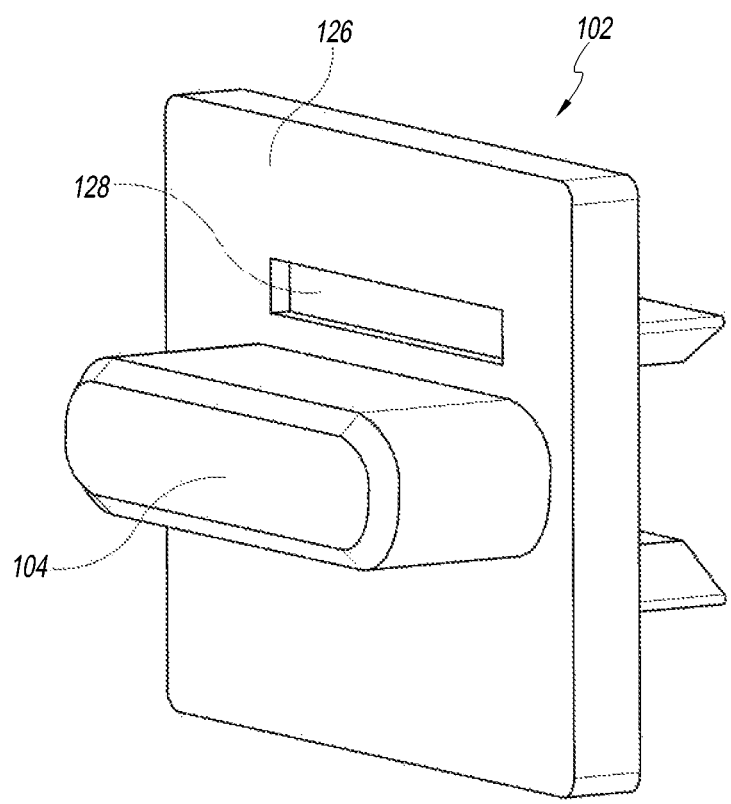
FIGS. 12-15 illustrate an example embodiment of a switch cover.

FIGS. 12-15 illustrate an example embodiment of a switch cover 102. FIG. 12 is an exterior side, perspective view of the switch cover 102. The switch cover 102 can include a handle 104 for a user to move the switch cover 102 as discussed herein. The cover can include a base 126. The handle 104 can be attached, disposed, and/or formed to protrude from the base 126. The handle 104 can be positioned on an exterior surface or outer surface of the base 126 as illustrated in FIG. 12. The exterior or outer surface of the base 126 can be a surface of the cover 102 that faces the exterior of the shell 100 and/or that is configured to face away from the mobile device 119.

The switch cover 102 can include a visual indicator 128 as a status indicator. The visual indicator 128 can indicate the position of the switch 121 on the mobile device 119. The visual indicator 128 can be positioned on the base 126. The visual indicator 128 can be on an exterior or outer surface of the base 126 (e.g., on the same surface of the cover 102 as the handle 104) to be viewed by a user. The visual indicator 128 can be an indentation (for example, a cutout) in the base 126. In some embodiments, the visual indicator 126 can be colored (e.g., red) or can otherwise be visually distinguishable from the area of the base 126 around the visual indicator 128. In some embodiments, a colored dot, colored bar, or other visual indicator can be used instead of a physical indentation or cutout in the base 126 of the cover 102. When the switch cover 102 is in the first position (for example, configured to position the switch 121 in a first state associated with, for example, a normal auditory mode of the mobile device 119), the visual indicator 128 may be covered by a portion of the exterior wall 108, such that the visual indicator 128 is hidden from view. When the switch cover 102 is in the second position (for example, configured to position the switch 121 in a second state associated with, for example, a vibrate mode of the mobile device 119), the visual indicator 128 can be uncovered such that the visual indicator 128 is exposed and visible. In some embodiments, two different visual indicators can be used. A first visible indicator can be visible when the switch cover 102 is in the first position and the second visible indicator can be covered, and the second visible indicator can be visible when the switch cover 102 is in the second position and the first visible indicator can be covered.

Figure 13:
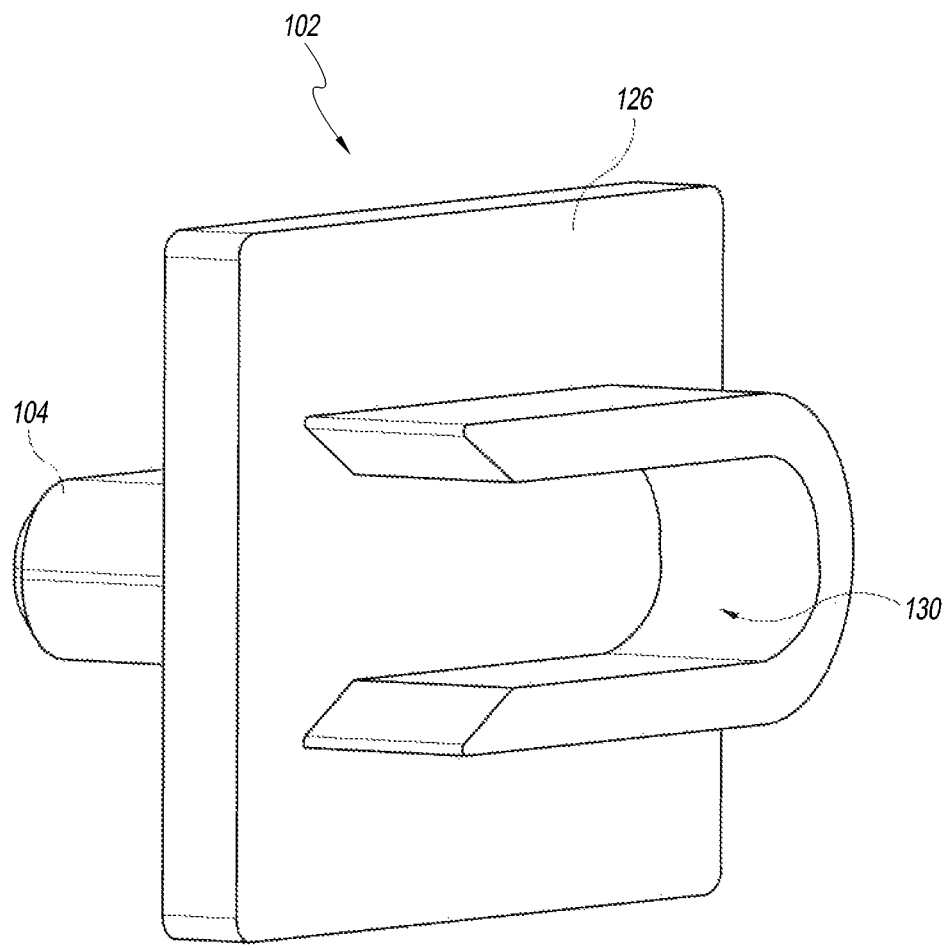

FIG. 13 is an interior side, perspective view of the switch cover 102. The cover 102 can include an internal switch guide 130 to move the switch 121 of the mobile device 119 as discussed herein. The internal switch guide 130 can be attached, disposed, and/or formed to protrude from the base 126. The internal switch guide 130 can be positioned on an interior or inner surface of the base 126 as illustrated in FIG. 13. The interior or inner surface of the base 126 can be a surface of the cover 102 that faces the interior of the shell 100 and/or is configured to face toward the mobile device 119 when the mobile device 119 is inserted into the shell 100. In some embodiments, the position of the internal switch guide 130 on the base 126 can correspond to the position of the handle 104 (e.g., the internal switch guide 130 can have a generally U-shaped configuration that would surround the handle 104 if positioned on the same side of the base 126 as the handle 104). For example, when the internal switch guide 130 engages the switch 121 of the mobile device 119 as discussed herein, the handle 104 can generally represent a same (horizontal) position as the position of the switch 121 on the mobile device 119.

Figure 14:
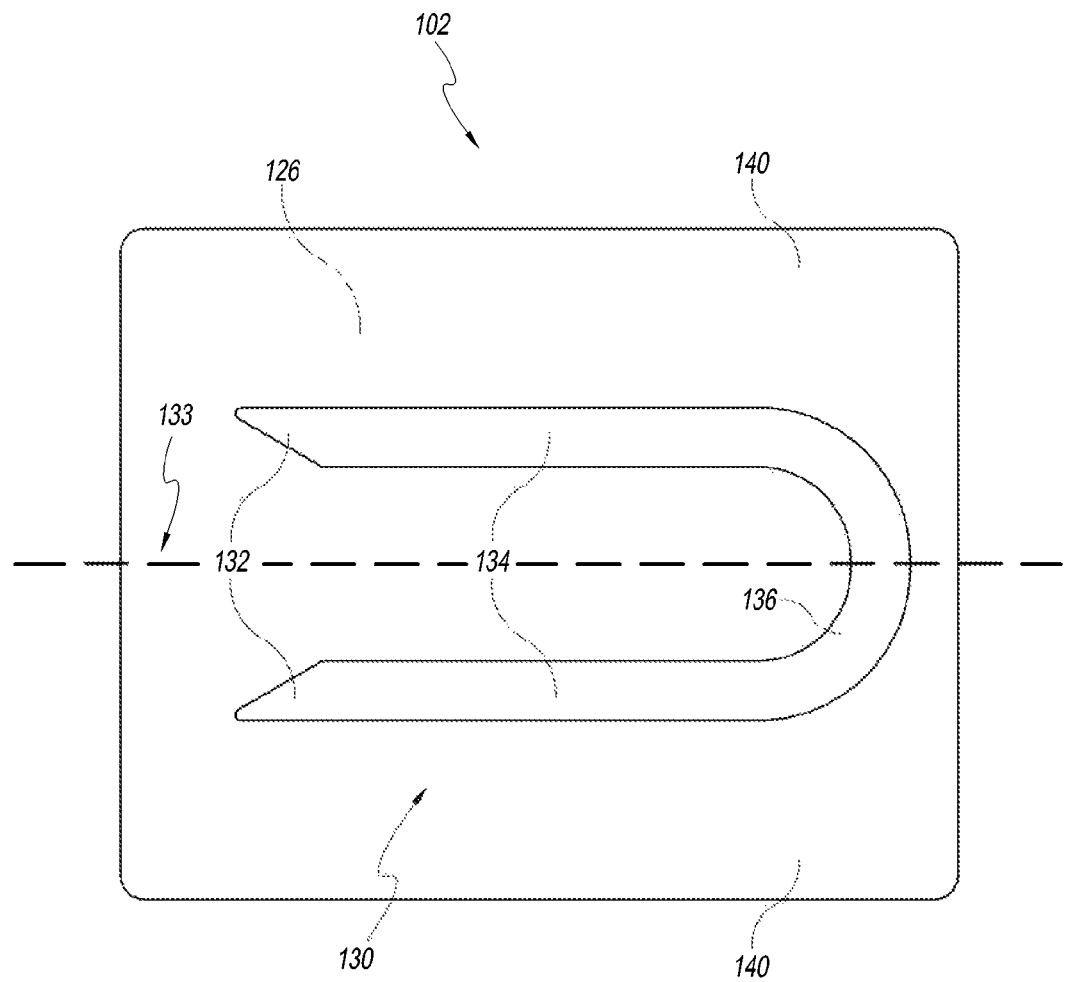

FIG. 14 is an interior side view of the switch cover 102. The internal switch guide 130 can be disposed on the internal or inner surface of the base 126 as discussed herein. One end of the internal switch guide 130 can be open (e.g., the left side of the internal switch guide 130 as illustrated in FIG. 14). The open end of the internal switch guide 130 can comprise divergent ends 132. The divergent ends 132 can include two or more (e.g., a first and a second) divergent ends 132 to engage the switch 121 of the mobile device 119 as discussed herein. The divergent ends 132 can diverge from each other (for example, diverging from a centerline 133 therebetween) toward ends or edges of the base 126, away from an interior or pathway of the internal switch guide 130 as discussed herein. The divergent ends 132 can facilitate or help position the cover 102 to correspond to the position of the switch 121 when the mobile device 119 is initially inserted into the shell 100. For example, if the switch 121 is in a position corresponding to the switch cover 102 being in an up position, but the switch cover 102 is in a down position, one of the divergent ends 132 can move or slide against the switch 121 as the mobile device 119 is inserted into the shell 100 (see FIGS. 22A-B and 23A-B), causing the switch cover 102 to move upward to match the up position of the switch 121. And vice versa, if the switch 121 is in a position corresponding to the switch cover 102 being in a down position, but the switch cover 102 is in an up position, the one of the divergent ends 132 can move or slide against the switch 121 as the mobile device 119 is inserted into the shell 100, causing the cover 102 to move downward to match the down position of the switch 121. Stated differently, as one of the divergent ends 132 contacts a surface of the switch 121 when the mobile device 119 is inserted into the shell 100, the angled surfaces of the divergent ends 132 slide against a surface of the switch and move the switch cover 102 at a rate corresponding to the angle of the divergent ends relative to a centerline 133 therebetween.

The divergent ends 132 can diverge or be spaced such that in any position of the switch cover 102, the divergent ends 132 are spaced or positioned beyond or at a periphery of the switch 121 in any position of switch 121. As such, when the mobile device 119 is inserted into the shell 100, one of the divergent ends 132 can engage the switch 121 of the mobile device 119 to move the switch cover 102 to correspond to the position of the switch 121 as discussed herein. If the position of the switch cover 102 corresponds to the position of the switch 121 upon insertion of the mobile device 119 into the shell 100, then the switch 121 may move past the divergent ends 132 without engaging the divergent ends 132. In some embodiments, the switch cover 102 can be configured to move between the first and second positions in response to a force that is lower than an amount of force that would cause the switch 121 to move between its first and second positions. Thus, when the mobile device 119 is coupled to the case 100 with the switch cover 102 misaligned from the switch 121, the switch cover 102 is moved to correspond to the position of the switch 121 instead of the switch 121 moving to correspond to the position of the switch cover 102.

The divergent ends 132 can be connected to guides such as guiderails (or guides or rails) 134 of the internal switch guide 130. The guiderails 134 can include two or more (a first and second) guiderails 134 to form a pathway therebetween and engage the switch 121 of the mobile device 119 within the pathway. When the mobile device 119 is inserted into the shell 100, the guiderails 134 can engage or contact the switch 121 of the mobile device 119 such that when the switch cover 102 is moved by a user as discussed herein, the guiderails 134 engage or contact the switch 121 to move the switch 121 as the switch cover 102 is moved by a user. In some embodiments, the guiderails 134 are spaced such that when the mobile device 119 is inserted into the shell 100, both of guiderails 134 illustrated in FIG. 14 contact the switch 121 on opposite sides or surfaces of the switch 121. In some embodiments, the guiderails 134 are spaced such that when the mobile device 119 is inserted into the shell 100, one of guiderails 134 illustrated in FIG. 14 contacts the switch 121 on one side or surface of the switch 121. For example, the one guiderail 134 that contacts one side of the switch 121 moves the switch 121 in a desired direction to a desired position (e.g., the guiderail 134 pushing against the switch 121 from a direction and contact side to move the switch 121 into the desired position), while the other guiderail 132 may be spaced apart or have some clearance between the other surface of the switch 121 opposite the surface of the switch 121 being pushed to move the switch 121.

As illustrated in FIG. 14, the guiderails 134 may be straight. In some embodiments, the guiderails 134 may be curved (round, elliptical, etc.) to facilitate the cover 102 moving into the corresponding position of the switch 121 when the mobile device 119 is inserted into the shell 100. For example, rounded guide rails 134 may gradually move the cover 102 into the corresponding position of the switch 121 as the mobile device 119 is inserted into the shell 100. When the mobile device 119 is fully inserted into the shell 100, a main contact point or one or more contact points between the guiderails 134 and the switch 121 may be present (e.g., away from the divergent ends 132), near a center of the guiderails 134 or closer to a cap 136 of the internal switch guide 130.

As illustrated in FIG. 14, guiderails 134 may be parallel to each other. In some embodiments, the guiderails 134 may diverge similarly as the divergent ends 132, away from a center of the internal switch guide 134 or centerline 133 between the guiderails 134. In some embodiments, the internal switch guide 130 may not include divergent ends 132 as illustrated in, for example, FIGS. 20A-B and 21A-B. In some embodiments, the guiderails 134 may sufficiently diverge at the open end of the internal switch guide 130 to engage the switch 121 and move the cover 102 into a corresponding position of the switch 121 as discussed herein without having or necessitating for divergent ends 132. When the mobile device 119 is fully inserted into the shell 100, a main contact point or one or more contact points between the guiderails 134 and the switch 121 may be away from the open end of the internal switch guide 130, such as near a center of the guiderails 134 or closer to the cap 136 of the internal switch guide 130.

As illustrated in FIG. 14, the internal switch guide 136 can include a cap or back support 136. The cap 136 can correspond in shape to a shape of an end of the switch 121. FIG. 14 illustrates the cap 136 being rounded for an inner surface of the cap 136 contacting to switch 121 to correspond to rounded ends of the switch 121 as shown in, for example, FIGS. 6 and 22A-B and 23A-B. The divergent ends 132, guiderails 134, and/or cap 136 can form a generally u-shape of the internal switch guide 130 to correspond to the switch 121 as shown in, for example, FIGS. 6 and 22A-B and 23A-B. The cap 136 can press against or abut a wall or periphery of the mobile device 119 for the cover 102 to stay at a predetermined position or distance relative to the mobile device 119 or wall of the mobile device 119. For example, when the mobile device 119 is inserted into the shell 100, the internal or inner surfaces of the internal switch guide 130, including the divergent ends 132, guiderails 134, and/or cap 136 that face toward the mobile device 119, can abut or press against the wall of the mobile device 119, positioning the cover 102 at a constant distance relative to the wall of the mobile device 119. Maintaining the predetermined position or constant distance of the switch cover 102 relative to the mobile device 119 can help ensure proper engagement of the guiderails 134 with the switch 121 and adequate clearance to move the switch cover 102 in the opening 106 as discussed herein.

Figure 15:
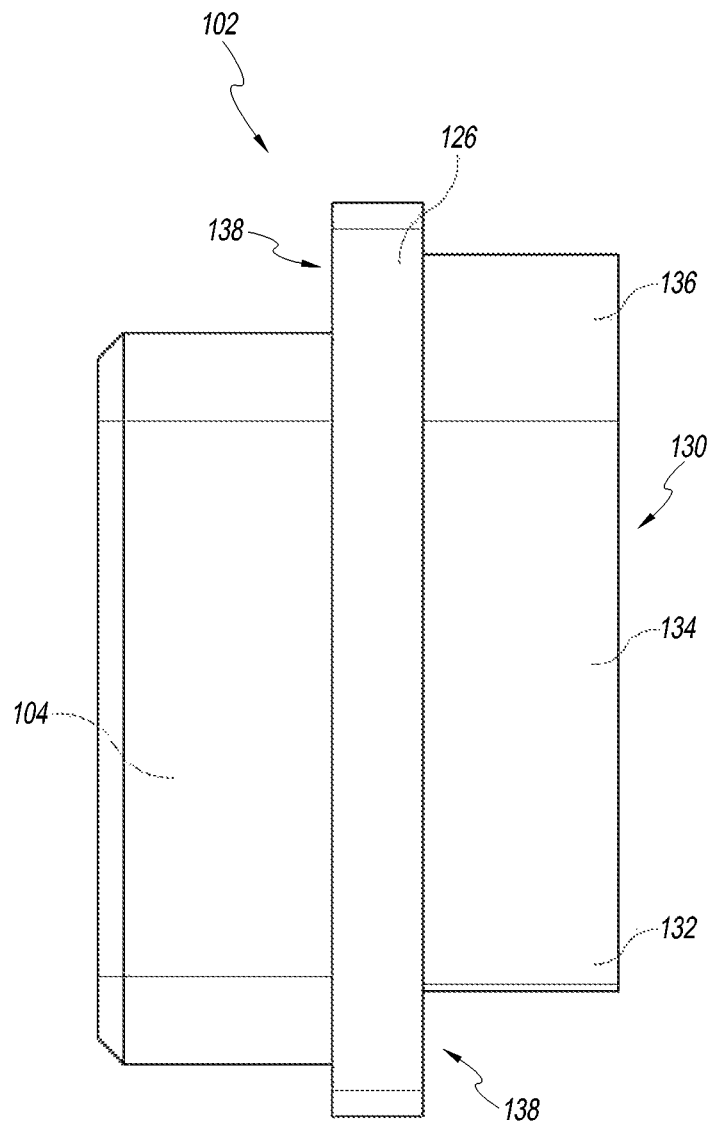
Figure 16:
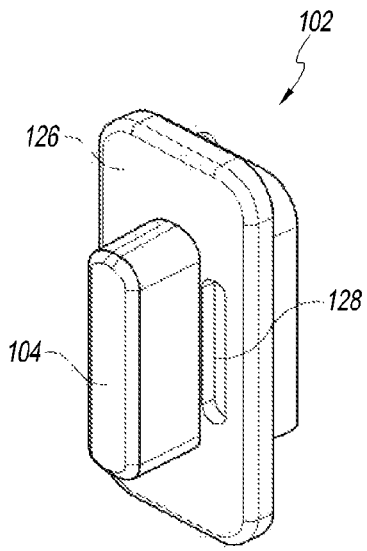
FIGS. 16-19 illustrate another example embodiment of a switch cover.

As illustrated in FIG. 15, some of the internal or inner surfaces of the switch cover 102 facing or contacting the mobile device 119 when inserted into the shell 100 can terminate, end, or lie in a same plane. For example, the surfaces of diverging ends 132, the guiderails 134, and/or cap 136 facing the mobile device 119 can terminate, end, or lie in a same plane. By terminating in the same plane, the cover 102 can remain at a predetermined position relative to the mobile device or walls of the mobile device 119 to, for example, provide clearance for the switch 121 to move as the cover 102 is moved as discussed herein. Further, by terminating in the same plane and the cover 102 remaining at the predetermined position relative to the mobile device or walls of the mobile device 119, the predetermined position provides clearance for the parts or components of the cover 102 (for example, the diverging ends 132, the guiderails 134, and/or cap 136) to move relative to the mobile device 119 in the shell 100 and helps avoid having parts of the switch cover 102 get snagged or stopped against parts of the mobile device 119 (for example, a cavity on the mobile device housing the switch 121).

As illustrated in FIG. 15, the handle 104 can be offset from a center point of the switch cover 102 and/or from a center point of the base 126 and/or from the internal switch guide 130. The internal switch guide 130 can be offset from the center point of the switch cover 102 and/or from the center point of the base 126 and/or from the handle 104. Such offset positioning of the handle 104 and/or the internal switch guide 130 can provide contact points 138 to resist or inhibit rotation or twisting of the cover 102 relative to the shell 100 when the mobile device 119 is being inserted into the shell 100. The contact points can contact or engage the cavity 144 formed by the recesses 116 and 120 of the exterior wall 108 and the inner wall 110 or other points of the shell 100 (for example, the exterior wall 108 and/or the internal wall 110) such that when the mobile device 119 is inserted into the shell 100, rotational movement (e.g., in the counterclockwise direction of the switch cover 102 relative to the illustrated view of FIG. 15) is impeded by the contact points 138.

Returning to FIG. 14, the base 126 can be generally rectangular or square. In some embodiments, the base 126 can be other suitable shapes to correspond to the shape of the cavity 144 formed by the recesses 116 and 120 of the outer wall 108 and inner wall 110. For example, the base 126 may be generally round, cylindrical, and/or a combination of shapes, such as rectangular and having rounded or circular sides or corners. The base 126 can be sized such that the internal switch guide 130 substantially spans a side to side length of the base 126 (left to right of the base 126 shown in FIG. 14 along the centerline 133) or a length along the direction perpendicular to the direction of movement of the cover 102 between the first and second positions.

The base 126 can be sized such that the base 126 comprises guiding end portions 140 (e.g., on opposing sides of the guiderails 134). The guiding end portions 140 can be formed as part of or extend from the base 126 in a direction parallel to the direction of movement of the switch cover 102 between the first and second positions as discussed herein. Positioning the guiding end portions 140 parallel to the desired movement of the switch cover 102 can allow for the switch cover 102 to remain engaged with the shell 100 as the switch cover 102 is moved between the desired positions. For example, at least one of the guiding end portions 140 of the base 126 can remain engaged with an edge of the cavity 144 formed by the external wall 108 and the internal wall 110 in any position of the cover 102 relative to the shell 100.

FIGS. 16-19 illustrate another example embodiment of a switch cover 102. Some or all of the features and functions of the embodiment of the switch cover 102 illustrated in FIGS. 12-15 can be applied to the embodiment of the switch cover 102 illustrated in FIGS. 16-19. Reference numbers for the features of the embodiment of the switch cover 102 illustrated in FIGS. 12-15 are kept the same where applicable for ease of understanding.

FIGS. 16-19 illustrate an embodiment of the switch cover 102 where the base 126 can be sized such that the base 126 comprises guiding end portions 140 corresponding to the open end of the base 126 with diverging ends 132 and the other end of the base 126 with the cap 136. The guiding end portions 140 can be formed or be disposed on the base 126 to extend in a direction perpendicular to the direction of movement of the switch cover 102 between the first and second positions as discussed herein. Positioning the guiding end portions 140 perpendicular to the desired movement of the cover 102 can allow for switch cover 102 to remain engaged with the shell 100 as the cover 102 is moved between the desired positions. For example, at least one of the guiding end portions 140 can remain engaged with the cavity 144 formed by the external wall 108 and the internal wall 110 in any position of the switch cover 102 relative to the shell 100.

Figure 17:
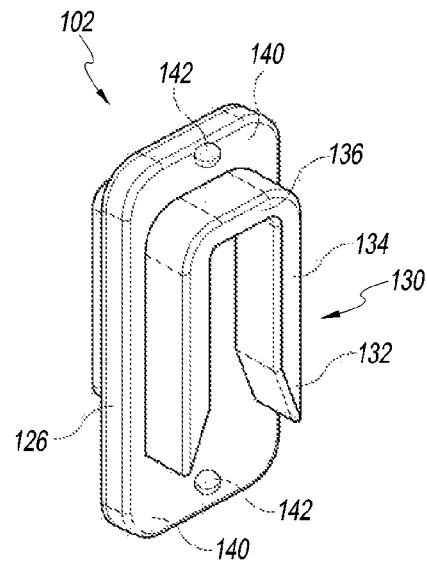
Figure 18:
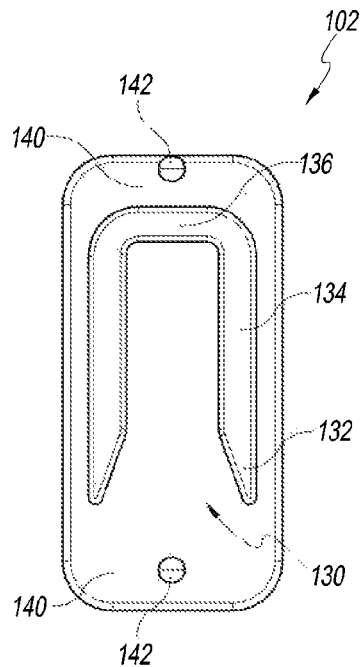
Figure 19:
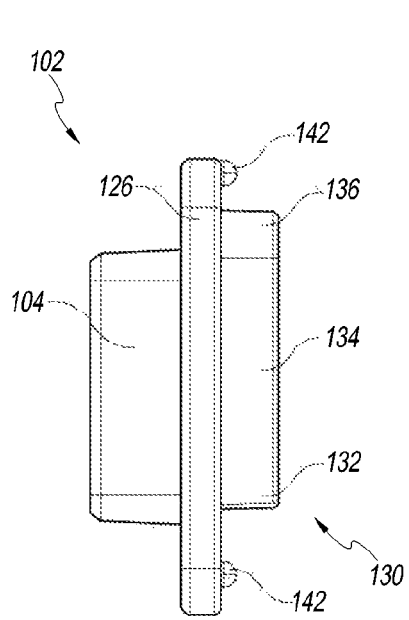

As illustrated in FIGS. 17-19, the cover 102 can have protruding portions 142 (e.g., on the guiding end portions 140 of the base 126). The protruding portions 142 can be attached, disposed, and/or formed to protrude from the base 126 (e.g., protruding inwardly towards the mobile device 119). The protruding portions 142 can engage or mate with one or more guiding tracks 148 (e.g., see FIG. 26), which can be formed in the inner wall 108, for example. The protruding portions 142 can move (e.g., slide) along the guiding tracks 148. The guiding tracks 148 can be disposed in the inner wall 108 and/or outer wall 110 to provide a desired path of movement of the switch cover 102 between the first and second positions as discussed herein. The length of the guiding tracks 148 can be made a desired or predetermined length to restrict or inhibit a length of travel of the switch cover 102 beyond the first and second positions.

As illustrated in FIGS. 17-19, when the protruding portions 142 are disposed on an inner surface of the base 126 facing the mobile device 119, the guiding tracks 148 can be disposed in/on the inner wall 110. In some embodiments, when the protruding portions 142 are disposed on an outer surface of the base 126 facing away from the mobile device 119, the guiding tracks 148 can be disposed in/on the outer wall 108. In some embodiments, the protruding portions 142 can be disposed on both sides or surfaces of the base 126 (e.g., facing toward and away for the mobile device 119).

The guiding tracks 148 can correspondingly be disposed on both the outer wall 108 and inner wall 110 to provide for movement of the cover 102 as discussed herein. In some embodiments, the protruding portions 142 can be disposed on the guiding end portions 140 as illustrated in FIGS. 12-15. The outer wall 108 and/or the inner wall 110 can have corresponding guiding tracks 148 to accommodate and guide the guiding end portions 140 that are illustrated in FIGS. 12-15.

Figures 21A, 21B:
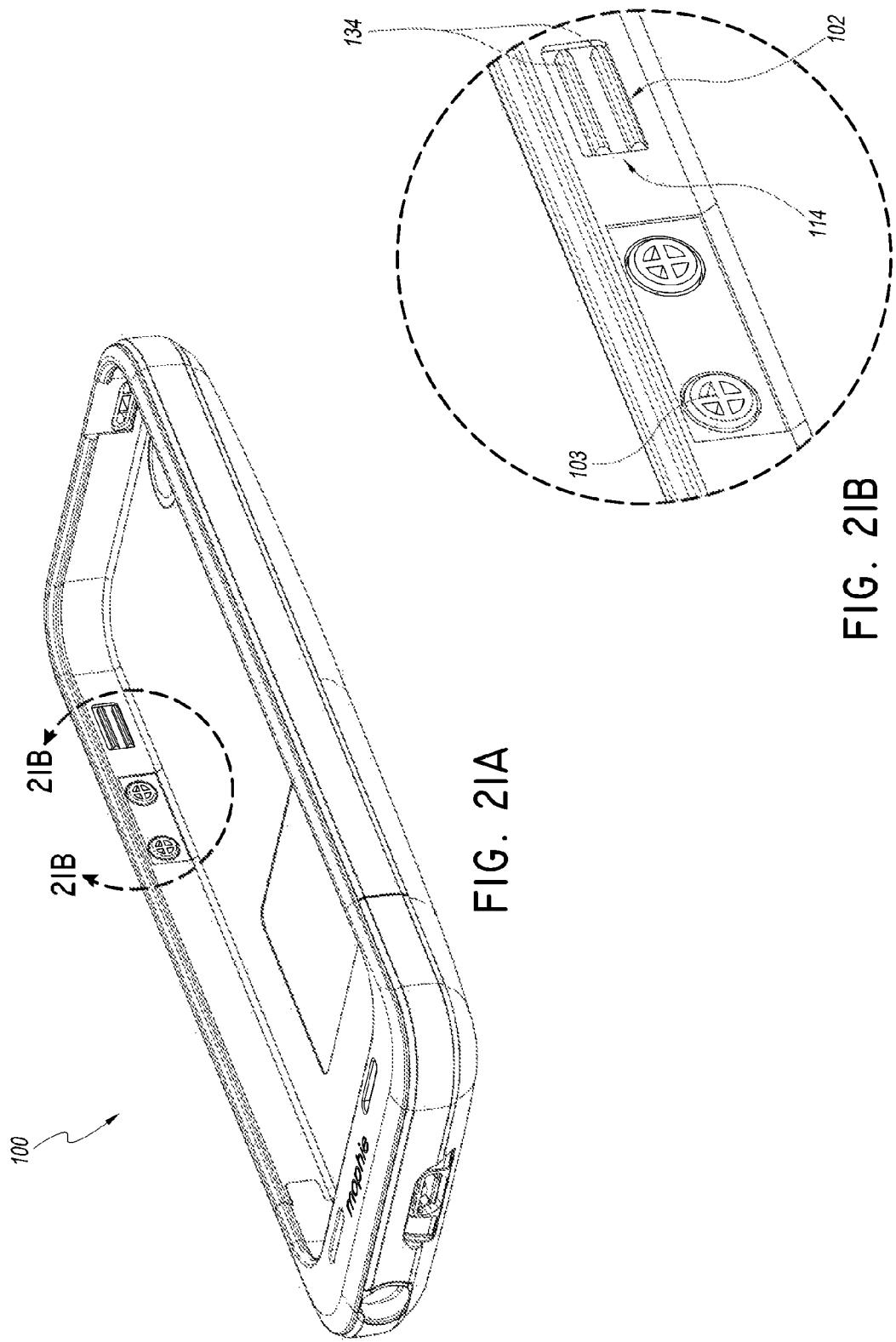

FIGS. 20A-B and 21A-B illustrate an example embodiment of a switch cover 102 in a shell 100. Some or all of the features and functions of the embodiment of the switch cover 102 illustrated in FIGS. 12-19 can be applied to the embodiment of the cover 102 illustrated in FIGS. 20A-B and 21A-B. Reference numbers for the features of the embodiment of the cover 102 illustrated in FIGS. 12-19 are kept the same where applicable for ease of understanding. FIGS. 20A-B illustrate the switch cover 102 in a first position as discussed herein. FIGS. 21A-B illustrate the switch cover 102 in a second position as discussed herein. FIGS. 20A-B and 21A-B illustrate an embodiment of the switch cover 102 without a cap 136 and/or without diverging ends 132. The cover 102 can have guiderails 134 that function to move the switch 121 of a mobile device 119 as discussed herein.

FIGS. 22A-B show an example embodiment of a partial cutout view of a shell 100 with a mobile device 119 being inserted into the shell 100. FIG. 22B illustrates an embodiment of a switch cover 102 in a first (e.g., up) position as discussed herein. FIG. 22B further illustrates a switch 121 of the mobile device 119 being in a corresponding second (e.g., down) position as discussed herein. FIGS. 23A-B illustrate a partial cutout view of the shell 100 with the mobile device 119 inserted into the shell 100. As the illustrated in FIGS. 23A-B, the switch cover 102 moves into the second (e.g., down) position (from the first position as illustrated in FIGS. 22A-B) to match the position of the switch 121 of the mobile device 119 when the mobile device 119 is inserted into the shell 100.

Figure 24:
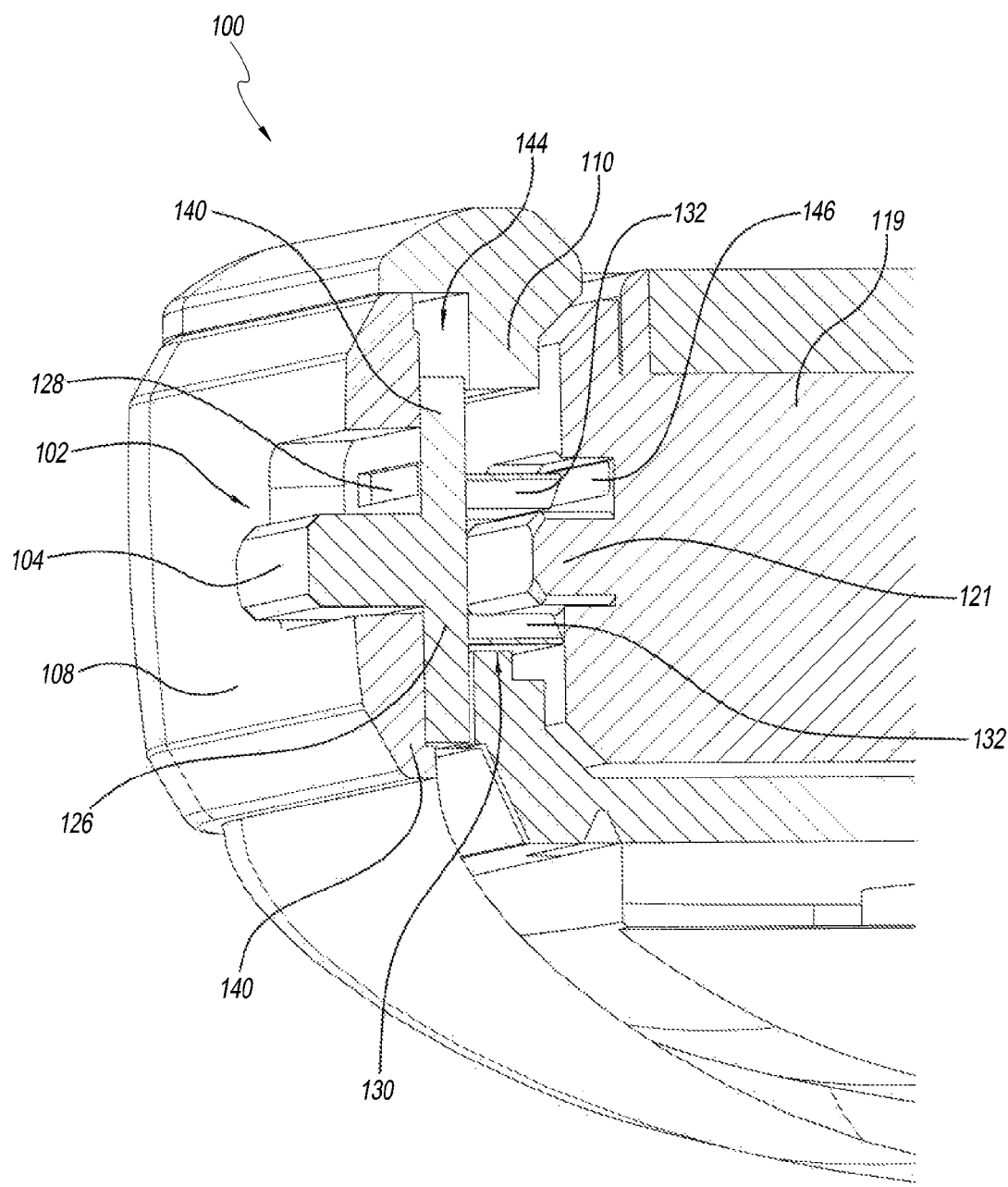
FIG. 24 is a side, perspective cross-sectional view of an example embodiment of a shell with a mobile device.

FIG. 24 is a side, perspective cross-sectional view of an example embodiment of a shell 100 with a mobile device 119. As illustrated in FIG. 24, the switch cover 102 is housed in a cavity 144 formed by the assembly of the outer wall 108 and the inner wall 110. The cavity 144 can be formed by the outer wall recess 120 and/or the inner wall recess 116 formed in the outer wall 108 and inner wall 110, respectively, as discussed herein. The cavity 144 can accept, engage, and/or mate with the switch cover 102 and allow for movement of the switch cover 102 as discussed herein. The switch cover 102 can move (e.g., slide) in the cavity 144 between, for example, the first and second (e.g., up and down) positions as discussed herein. As illustrated in FIG. 24, the cavity 144 accepts, engages, and/or mates with a lower guiding end portion 140 when the cover 102 is in the second position to position and guide the movement of the cover 102 as discussed herein.

The cavity 144 and/or base 126 can be sized and shaped for the cavity 144 to envelop, encase, contain, and/or surround an entire perimeter or periphery of the base 126 in any position of the switch cover 102 to maintain a desired orientation of the switch cover 102 relative to the shell 100 and engagement of the switch cover 102 with the shell 100 (for example, engagement with the cavity 144). As illustrated in FIG. 24, the cavity 144 and/or base 126 can be sized and shaped for the cavity 144 to engage and/or mate with both or all of the guiding end portions 140 of the base 126 in the second position. The cavity 144 and/or base 126 can be sized and shaped for the cavity 144 to engage and/or mate with both or all of the guiding end portions 140 of the base 126 in the first position.

As illustrated in FIG. 24, the switch cover 102 is in the second position (e.g., the down position) to correspond to the second position (e.g., the down position) of the switch 121 of the mobile device 119. In the configuration shown in FIG. 24, the internal switch guide 130 engages the switch 121. In some cases, the divergent ends 132 have engaged the switch 121 upon insertion of the mobile device 119 into the shell 100 and may have moved the switch cover 102 to correspond to the position of the switch 121. The guiderails 134 connected to the divergent ends 132 engage and/or mate with the switch 121 at corresponding upper and lower or opposite ends/surfaces of the switch 121 such that the guiderails 134 can move the switch 121 in a desired direction when the cover 102 is moved by a user as discussed herein.

The switch 121 can have a switch visual indicator 146. The switch visual indicator 146 can indicate a mode of operation of the mobile device 119 as discussed herein. The switch visual indicator 146 can correspond to the visual indicator 128 of the cover 102. Accordingly, when the switch visual indicator 146 indicates that mobile device is in vibrate/silent mode, the visual indicator 128 on the switch cover 102 can indicate the same vibrate/silent mode when the mobile device 119 is inserted into the shell 100.

Figure 25:
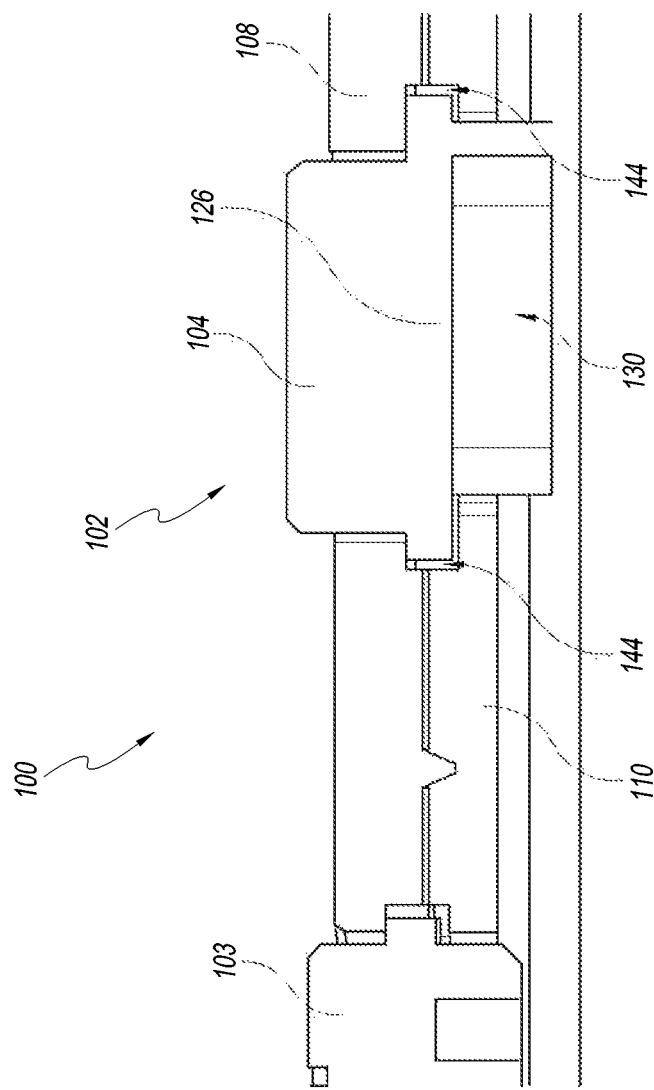
FIG. 25 is a cross-sectional top view of an example embodiment of a switch cover in a shell.

FIG. 25 is a cross-sectional top view of an example embodiment of a switch cover 102 in a shell 100. The cavity 144 can be sized to maintain positions and induce a desired movement of the switch cover 102, while still providing clearance (for example, gaps between the base 126 and recess edges 118, 122 as discussed herein) for the cover 102 to move between desired positions without friction or with minimal friction. The cavity 144 can accept and/or house, for example, the base 126 to control, guide, and restrict/inhibit movement of the cover 102 as discussed herein. The cavity 144 can be sized and shaped to restrict or inhibit movement of the cover 102 from side to side (e.g., perpendicular to the direction of desired movement between the first and second positions) as discussed herein. Side to side can be considered any undesired direction of movement for the cover 102 when, for example, the shell 100 and/or cavity 144 allows for linear (e.g., up and down) movement/translation of the cover 102 as discussed herein. The cavity 144 can also restrict rotational movement of the cover 102 as discussed herein, by for example, the cavity 144 and the base 126 having correspondingly rectangular shapes.

Figure 26:
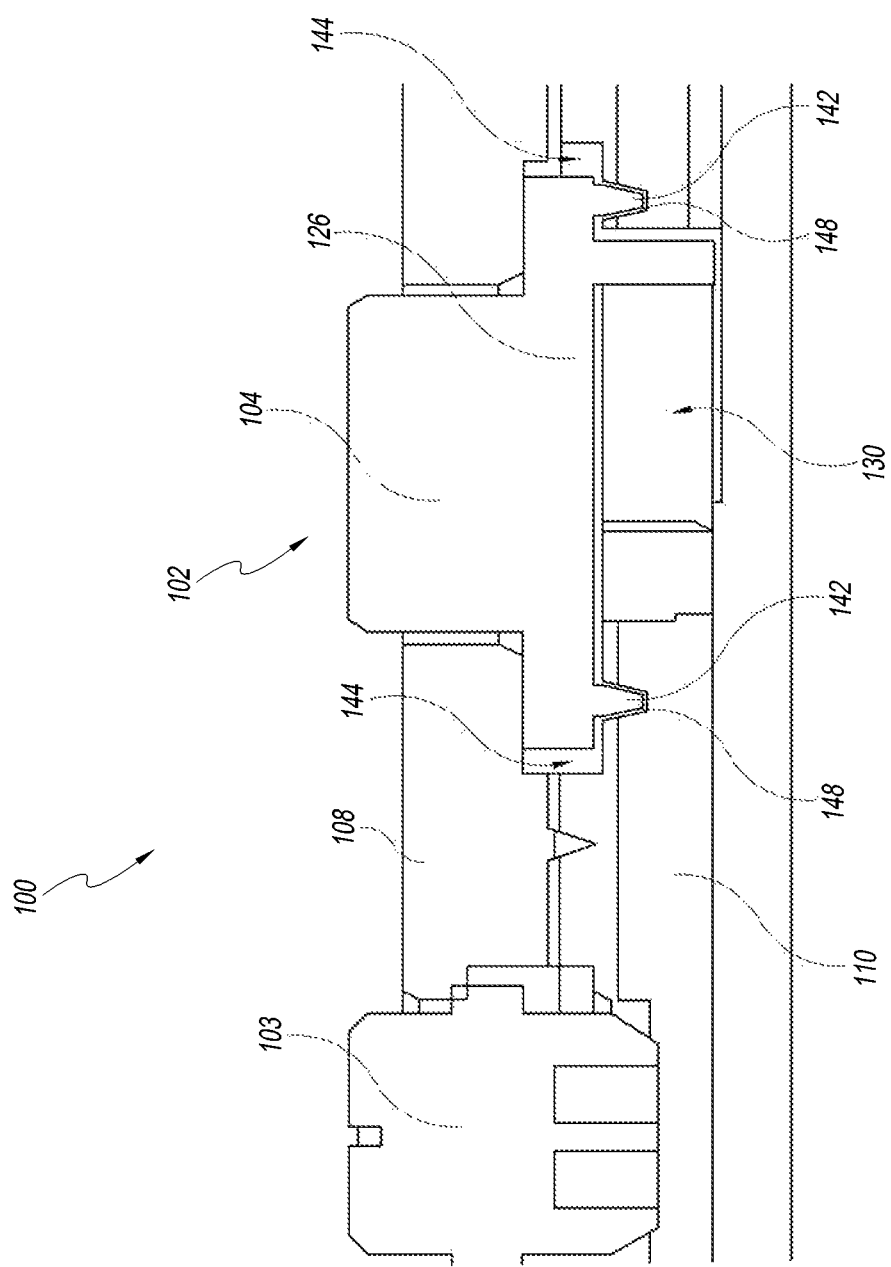
FIG. 26 is a cross-sectional top view of another example embodiment of a switch cover in a shell.

FIG. 26 is a cross-sectional top view of an example embodiment of a switch cover 102 in a shell 100. The cavity 144 can be sized and shaped to restrict to movement of the switch cover 102 from side to side as discussed herein, and in particular, in reference to FIG. 25. As illustrated in FIG. 26, the base 126 of the switch cover 102 can include protruding portions 142 as discussed herein. The inner wall 110 can have guiding tracks 148. The guiding tracks 148 can accept, engage, and/or mate with the protruding portions 142 to control, guide, and restrict/inhibit movement of the switch cover 102 as discussed herein.

The following is a list of example embodiments. The features recited in the below list of example embodiments can be combined with additional features disclosed herein. Furthermore, additional inventive combinations of features are disclosed herein, which are not specifically recited in the below list of example embodiments and which do not include the same features as the specific embodiments listed below. For sake of brevity, the below list of example embodiments does not identify every inventive aspect of this disclosure. The below list of example embodiments are not intended to identify key features or essential features of any subject matter described herein.

1. A shell comprising a switch cover for use with a switch of a portable electronic device, the shell comprising:
   a switch cover configured to move relative to the shell, the switch cover comprising:
      a base having an inner surface and an outer surface, the inner surface configured to face a switch of a portable electronic device when the portable electronic device is in the shell, the outer surface configured to face away from the switch; and
      a guide on the inner surface of the base, the guide configured to engage the switch of the portable electronic device when the portable electronic device is in the shell; and
   an opening in the shell engaging the switch cover while allowing the switch cover to move relative to the shell, wherein the switch cover is configured such that the guide moves the switch of the portable electronic device when the portable electronic device is in the shell and the switch cover is moved relative to the shell.

2. The shell of Embodiment 1, wherein the shell comprises a cavity about the opening in shell, the cavity engaging the switch cover to allow movement of the switch cover along a desired direction.

3. The shell of Embodiment 2, wherein the shell comprises an outer wall and an inner wall, the outer wall comprising an outer wall recess formed in the outer wall, the inner wall comprising an inner wall recess formed in the inner wall, and wherein the outer wall recess and the inner wall recess form the cavity about the opening in the shell.

4. The shell of any one of Embodiments 2 to 3, wherein the cavity engages the base of the switch cover, the cavity shaped to correspond to a shape of the base to allow movement of the base along a desired direction, while inhibiting at least one of movement of the switch cover along other directions or rotational movement of the switch cover.

5. The shell of any one of Embodiments 2 to 4, wherein the base comprises a guiding end portion, the cavity engaging the guiding end portion to guide the base along the desired direction.

6. The shell of any one of Embodiments 2 to 5, wherein the base comprises two or more guiding end portions, the cavity engaging at least one of the guiding end portions to guide the base along the desired direction and to inhibit movement of the base beyond a perimeter of the cavity.

7. The shell of any one of Embodiments 2 to 6, wherein the base comprises a protruding portion configured to engage the shell to guide movement of the switch cover along the desired direction.

8. The shell of Embodiment 7, wherein the protruding portion is on the inner surface of the base, the protruding portion engaging the inner wall of the shell to guide movement of the switch cover along the desired direction.

9. The shell of Embodiment 8, wherein the inner wall comprises a guiding track, and the protruding portion protrudes into the guiding track to guide movement of the switch cover in the desired direction along the guiding tracks.

10. The shell of any one of Embodiments 3 to 9, wherein the shell further comprises spacers positioned between the outer wall and the inner walls to maintain a predetermined width of the cavity between the outer wall recess and the inner wall recess.

11. The shell of any one of Embodiments 1 to 10, wherein the guide comprises a first guiderail on the inner surface of the base and a second guiderail on the inner surface of the base, the first guiderail corresponding to a first side of the switch of the portable electronic device, the second guiderail corresponding to a second side of the switch of the portable device, the first side of the switch opposite the second side of switch, wherein when the switch cover is moved in a first direction, the first guiderail pushes the first side of the switch to move the switch toward a first switch position, and wherein when the switch cover is moved in a second direction, the second guiderail pushes the second side of the switch to move the switch toward a second switch position.

12. The shell of Embodiment 11, wherein the first and second guiderails form a pathway between the first and second guiderails configured such that the switch slides between the first and second guiderails when the portable electronic device is being inserted into the shell.

13. The shell of any one of Embodiments 11 to 12, wherein the first and second guiderails comprise divergent ends, wherein at least one of the divergent ends contact the switch when the portable electronic device is being inserted into the shell, and wherein the divergent ends facilitate positioning the switch cover to correspond to a position of the switch as the portable electronic device is inserted into the shell.

14. The shell of any one of Embodiments 1 to 13, wherein the base comprises a back support on the inner surface of the base, wherein the guide and the back support have surfaces facing the portable electronic device when the portable electronic device is in the shell, and wherein the surfaces are on a same plane to position the switch cover at a predetermined distance from the portable electronic device.

15. The shell of Embodiment 14, wherein the predetermined distance from the portable electronic device is constant between positions of the switch cover.

16. The shell of any one of Embodiments 1 to 15, wherein the switch cover comprises a handle on the outer surface to allow a user to move the switch cover relative to the shell.

17. The shell of any one of Embodiments 1 to 16, wherein the switch cover comprises a switch cover visual indicator that, when the portable electronic device is in the shell, corresponds to a switch visual indicator that indicates an operational mode of the portable electronic device.

18. The shell of Embodiment 17, wherein the switch cover visual indicator is not visible to a user in a first position of the switch cover, and wherein the visual indicator is visible to the user in a second position of the switch cover.

19. The shell of any one of Embodiments 1 to 18, wherein the shell houses the portable electronic device and the guide engages the switch of the portable electronic device.

20. The shell of any one of Embodiments 1 to 19, wherein movement for the switch is a linear translation.

21. The shell of any one of Embodiments 1 to 20, wherein movement for the switch cover is a linear translation.

22. A protective case for use with a mobile electronic device having a switch that is configured to move between a first switch position and a second switch position, the case comprising:
 a housing configured to at least partially enclose the mobile electronic device; and
 a switch cover movable between a first position and a second position, wherein the switch cover is configured to move the switch to the first switch position when the switch cover is moved to the first position, and wherein the switch cover is configured to move the switch to the second switch position when the switch cover is moved to the second position.

23. The protective case of Embodiment 22, wherein the shell comprises a cavity about the opening in shell, the cavity engaging the switch cover to allow movement of the switch cover between the first and second positions.

24. The protective case of Embodiment 23, wherein the housing comprises an outer wall and an inner wall, the outer wall comprising an outer wall recess formed in the outer wall, the inner wall comprising an inner wall recess formed in the inner wall, and wherein the outer wall recess and the inner wall recess form the cavity in the housing.

25. The protective case of any one of Embodiments 23 to 24, wherein the cavity engages a base of the switch cover, the cavity shaped to correspond to a shape of the base to allow movement of the base between the first and second positions corresponding to the first and second switch positions, while inhibiting at least one of movement of the switch cover along other directions or rotational movement of the switch cover.

26. The protective case of Embodiment 25, wherein the base comprises a guiding end portion, the cavity engaging the guiding end portion to guide the base between the first and second positions.

27. The protective case of any one of Embodiments 25 to 26, wherein the base comprises two or more guiding end portions, the cavity engaging at least one of the guiding end portions in the first position or the second position.

28. The protective case of any one of Embodiments 25 to 27, wherein the base comprises a protruding portion configured to engage the housing to guide movement of the switch cover between the first and second positions.

29. The protective case of Embodiment 28, wherein the protruding portion engages the inner wall of the housing to guide movement of the switch cover between the first and second positions.

30. The protective case of Embodiment 29, wherein the inner wall comprises a guiding track, and the protruding portion extends into the guiding track to guide movement of the switch cover between the first and second positions along the guiding tracks.

31. The protective case of any one of Embodiments 24 to 30, wherein the housing further comprises spacers positioned between the outer wall and the inner walls to maintain a predetermined width of the cavity between the outer wall recess and the inner wall recess.

32. The protective case of any one of Embodiments 22 to 31, wherein the switch cover comprises a first guide on an inner surface of the switch cover and a second guide on the inner surface of the switch cover, the inner surface configured to face the mobile electronic device, the first guide corresponding to a first side of the switch of the mobile electronic device, the second guide corresponding to a second side of the switch of the portable device, the first side of the switch opposite the second side of switch, wherein when the switch cover is moved in a first direction, the first guide pushes the first side of the switch to move the switch toward a first switch position, and wherein when the switch cover is moved in a second direction, the second guide pushes the second side of the switch to move the switch toward a second switch position.

33. The protective case of Embodiment 32, wherein the first and second guides form a pathway between the first and second guides configured such that the switch to slide between the first and second guides when the mobile electronic device is being inserted into the housing.

34. The protective case of any one of Embodiments 32 to 33, wherein the first and second guides comprise divergent ends, wherein at least one of the divergent ends contact the switch when the mobile electronic device is being inserted into the housing, and wherein the divergent ends facilitate positioning the switch cover to correspond to a position of the switch as the mobile electronic device is inserted into the housing.

35. The protective case of any one of Embodiments 22 to 34, wherein the switch cover comprises a back support facing the mobile electronic device when the mobile device is in the housing, wherein the back support comprises a flat surface to position the switch cover at a predetermined distance from the mobile electronic device.

36. The protective case of Embodiment 31, wherein the predetermined distance from the mobile electronic device is constant between the first and second position.

37. The protective case of any one of Embodiments 22 to 36, wherein the switch cover comprises a handle on the outer surface to allow a user to move the switch cover between the first and second positions.

38. The protective case of any one of Embodiments 22 to 37, wherein the switch cover comprises a switch cover visual indicator that, when the mobile electronic device is in the housing, corresponds to a switch visual indicator that indicates an operational mode of the mobile electronic device.

39. The protective case of Embodiment 38, wherein the switch cover visual indicator is not visible to a user in the first position of the switch cover, and wherein the visual indicator is visible to the user in the second position of the switch cover.

40. The protective case of any one of Embodiments 22 to 39, wherein the housing at least partially encloses the mobile electronic device and the switch cover operably connects to the switch of the mobile electronic device.

41. The protective case of any one of Embodiments 22 to 40, wherein movement for the switch between the first switch position and the second switch position is a linear translation.

42. The protective case of any one of Embodiments 22 to 41, wherein movement for the switch cover between the first position and the second position is a linear translation.

The foregoing description has set forth various embodiments of the systems and/or methods via the use of figures and/or examples. Insofar as such figures and/or examples contain one or more functions and/or operations, it will be understood by those within the art that each function and/or operation within figures or examples can be implemented individually and/or collectively. The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced embodiment recitation is intended, such an intent will be explicitly recited in the embodiment, and in the absence of such recitation no such intent is present. For example, as an aid to understanding, the disclosure may contain usage of the introductory phrases "at least one" and "one or more" to introduce embodiment recitations. However, the use of such phrases should not be construed to imply that the introduction of an embodiment recitation by the indefinite articles "a" or "an" limits any particular embodiment containing such introduced embodiment recitation to embodiments containing only one such recitation, even when the same embodiment includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, embodiments, or drawings, should be understood to contemplate the possibilities of including one of the terms, either of the terms, or both terms. For example, the phrase "A or B" will be understood to include the possibilities of "A" or "B" or "A and B."

Although the present subject matter has been described herein in terms of certain embodiments, and certain exemplary methods, it is to be understood that the scope of the subject matter is not to be limited thereby. Instead, the Applicant intends that variations on the methods and materials disclosed herein which are apparent to those of skill in the art will fall within the scope of the disclosed subject matter.

What is claimed is:
1. A case for a mobile device, the case comprising:
a cover for a switch, the cover comprising:

a switch base having a first surface directly facing toward the switch and a second surface facing away from the switch;
an internal switch capture guide, on the first surface, with a first guide rail that corresponds to a first side of the switch and a second guide rail corresponding to a second side of the switch when the switch is disposed in the cover; and
an external feature on the second surface approximately corresponding to the position of the switch;
an opening engaging the cover while allowing the switch base to move relative to the case,
wherein the switch is attached to the mobile device; and
a battery separate from the mobile device, wherein the battery is configured to charge the mobile device via an electrical connector capable of electrically coupling with the mobile device when the mobile device is in the case.

2. The case of claim 1, wherein the internal switch capture guide adjusts to fit over the switch regardless of switch orientation when the mobile device is inserted into the case.

3. The case of claim 1, wherein an imaginary line from the first guide rail to the second guide rail aligns with a direction that the switch is configured to move.

4. The case of claim 3, wherein the internal switch capture guide has at least one open side.

5. The case of claim 4, wherein the internal switch capture guide approximates a U-shape.

6. The case of claim 4, wherein the first and second guide rails are slightly divergent such that when the internal switch capture guide is slid over the switch, the cover will move to match a position of the switch.

7. The case of claim 4, wherein the first and second guide rails are substantially parallel, but ends of the first and second guide rails are angled in a way that when the internal switch capture guide is slid over the switch, the cover will move to match a position of the switch.

8. The case of claim 1, wherein the switch base is disposed in a cavity in a shell.

9. The case of claim 8, wherein a portion of the switch base is sandwiched between an internal wall and an external wall of the shell.

10. The case of claim 9, wherein the portion of the switch base is an entire outline of the switch base.

11. The case of claim 8, wherein the switch base can move relative to the shell in a direction that the switch is configured to move.

12. The case of claim 11, wherein the switch base incorporates a directional guide feature.

13. The case of claim 12, wherein the directional guide feature is a raised portion on the switch base that corresponds to a path in the shell.

14. The case of claim 13, wherein the path in the shell is parallel to the direction that the switch is configured to move.

15. The case of claim 1, wherein the external feature mirrors a shape of the switch.

16. The case of claim 1, wherein the switch base is substantially planar.

17. The case of claim 1, wherein when the cover is moved in a first direction, the first guide rail pushes the first side of the switch to move the switch toward a first switch position, and wherein when the cover is moved in a second direction, the second guide rail pushes the second side of the switch to move the switch toward a second switch position, wherein movement for the cover is a linear translation parallel to the second surface.

18. The case of claim 1, wherein the cover comprises a back support facing the mobile device when the mobile device is in the case, wherein the back support comprises a flat surface to position the cover at a predetermined distance from the mobile device.

19. The case of claim 1, wherein the cover further comprises a cover visual indicator that, when the mobile device is in the case, corresponds to a switch visual indicator that indicates an operational mode of the mobile device.

20. The case of claim 1, further comprising a cavity about the opening of the case, the cavity engaging the cover to allow movement of the cover along a predetermined direction.

21. The case of claim 1, wherein the cover is configured to linearly translate to move the switch of the mobile device.

22. A protective case for use with a mobile electronic device having a switch that is configured to move between a first switch position and a second switch position, the protective case comprising:
a housing configured to at least partially enclose the mobile electronic device; and
a switch cover comprising a switch cover visual indicator that, when the mobile electronic device is in the housing, corresponds to a switch visual indicator that indicates an operational mode of the mobile electronic device,
wherein the switch cover is movable between a first position and a second position, and
wherein the switch cover is configured to move the switch to the first switch position when the switch cover is moved to the first position, and wherein the switch cover is configured to move the switch to the second switch position when the switch cover is moved to the second position.

23. The protective case of claim 22, wherein the switch cover visual indicator is not visible to a user in the first position of the switch cover, and wherein the switch cover visual indicator is visible to the user in the second position of the switch cover.

24. The protective case of claim 22, wherein the switch cover further comprises a first guide rail that corresponds to a first side of the switch and a second guide rail that corresponds to a second side of the switch when the mobile electronic device is in the housing.

25. The protective case of claim 24, wherein the first and second guide rails are slightly divergent such that when the mobile electronic device is positioned into the housing, the switch cover will move to match a position of the switch.

26. The protective case of claim 24, wherein the first and second guide rails are substantially parallel, but ends of the first and second guide rails are angled in a way that when the mobile electronic device is positioned into the housing, the switch cover will move to match a position of the switch.

27. The protective case of claim 22, further comprising a battery separate from the mobile electronic device, wherein the battery is configured to charge the mobile electronic device via an electrical connector capable of electrically coupling with the mobile electronic device when the mobile electronic device is in the housing.

28. The protective case of claim 22, further comprising an outer wall and an inner wall, the outer wall comprising an outer wall recess formed in the outer wall, the inner wall comprising an inner wall recess formed in the inner wall, and wherein the outer wall recess and the inner wall recess form a cavity engaging the switch cover, the cavity configured to allow movement of the switch cover between the first and second positions.

29. The protective case of claim 28, wherein the cavity engages a base of the switch cover, the cavity shaped to correspond to a shape of the base to allow movement of the base between the first and second positions corresponding to the first and second switch positions, while inhibiting at least one of movement of the switch cover along other directions or rotational movement of the switch cover.

30. The protective case of claim 22, wherein the movement for the switch cover is a linear translation.

* * * * *